United States Patent
Gupta et al.

(10) Patent No.: US 6,581,187 B2
(45) Date of Patent: Jun. 17, 2003

(54) AUTOMATIC DESIGN OF VLIW PROCESSORS

(75) Inventors: Shail Aditya Gupta, Sunnyvale, CA (US); B. Ramakrishna Rau, Los Altos, CA (US); Vinod K. Kathail, Cupertino, CA (US); Michael S. Schlansker, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/068,723

(22) Filed: Feb. 6, 2002

(65) Prior Publication Data

US 2002/0133784 A1 Sep. 19, 2002

Related U.S. Application Data

(62) Division of application No. 09/378,395, filed on Aug. 20, 1999.

(51) Int. Cl.[7] ............................................. G06F 17/50
(52) U.S. Cl. ....................................................... 716/1
(58) Field of Search ................................ 716/1, 17, 18, 716/2

(56) References Cited

U.S. PATENT DOCUMENTS 5,537,580 A * 7/1996 Giomi et al. ................. 716/18
5,774,368 A * 6/1998 Chen et al. .................... 716/7

FOREIGN PATENT DOCUMENTS

JP 407319928 * 12/1995 ........... G06F/17/50

OTHER PUBLICATIONS

Aditya, Shail, et al., "Elcor's machine description system, version 3", Hewllett Packard, Oct. 1998, pp. 1–76.*

Leupers, Rainer, et al., "Retargetable generation of code selectors from HDL Processor models", 1997. IEEE. pp. 140–144.*

* cited by examiner

Primary Examiner—John F. Niebling
Assistant Examiner—Stacy A Whitmore

(57) ABSTRACT

A VLIW processor design system automates the design of programmable and non-programmable VLIW processors. The system takes as input an opcode repertoire, the I/O format of the opcodes, a register file specification, and instruction-level parallelism constraints. With this input specification, the system constructs a datapath, including functional units, register files and their interconnect components from a macrocell database. The system uses the input and the datapath to generate an instruction format design. The instruction format may then be used to construct the processor control path. The abstract input and datapath may be used to extract a machine description suitable to re-target a compiler to the processor. To optimize the processor for a particular application program, the system selects custom instruction templates based on operation issue statistics for the application program generated by the re-targeted compiler.

22 Claims, 23 Drawing Sheets

FIG. 10A  "Pr ? gpr, gpr: gpr"

| Cycle | Resource Usages | | | | | |
|---|---|---|---|---|---|---|
| | ALU | pr0 | dr0 | dr1 | dw0 | lit |
| 0 | x | | x | x | | |
| 1 | | x | | | | |
| 2 | | | | | x | |

FIG. 10B  "Pr ? gpr, s: gpr"

| Cycle | Resource Usages | | | | | |
|---|---|---|---|---|---|---|
| | ALU | pr0 | dr0 | dr1 | dw0 | lit |
| 0 | x | | | x | | x |
| 1 | | x | | | | |
| 2 | | | | | x | |

FIG. 11

SQRT Opcode Reservation Table

"Pr ? gpr : gpr"

| Clock Cycle | SQRT | dr1 | dw0 |
|---|---|---|---|
| 0 | x | x | |
| 1 | x | | |
| 2 | x | | |
| 3 | x | | x |

891  893  894

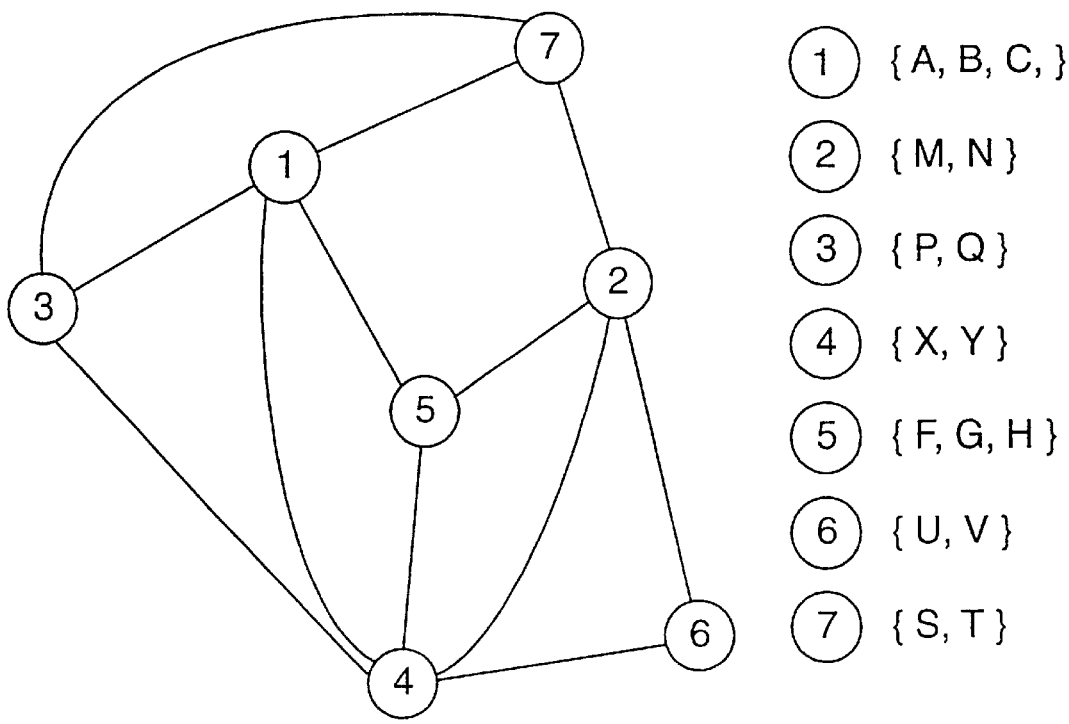
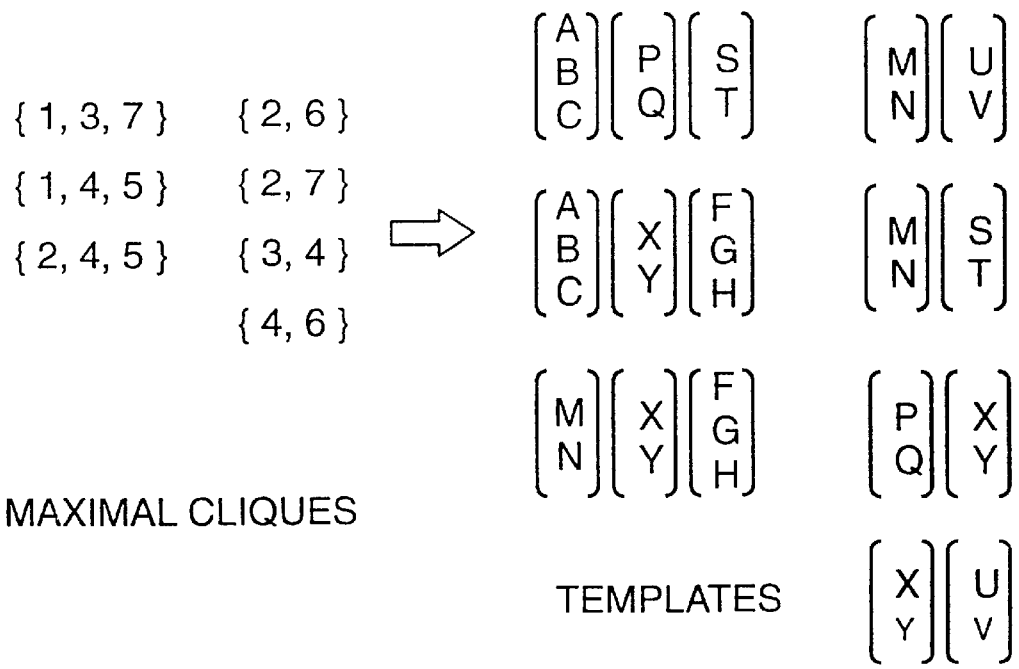
MAXIMAL CLIQUES     TEMPLATES
FIG. 17

AUTOMATIC DESIGN OF VLIW PROCESSORS

CROSS REFERENCE TO RELATED APPLICATION(S)

This is a divisional of application Ser. No. 09/378,395 filed on Aug. 20, 1999, which is hereby incorporated by reference herein.

RELATED APPLICATION DATA

This patent application is related to the following U.S. Pat. patent applications, Commonly assigned and filed concurrently with this application:

U.S. patent application Ser. No. 09/378,596, entitled AUTOMATIC DESIGN OF PROCESSOR DATAPATHS, by Shail Aditya Gupta and Bantwal Ramakrishna Rau;

U.S. patent application Ser. No. 09/378,293, entitled AUTOMATIC DESIGN OF VLIW INSTRUCTION FORMATS, BY Shail Aditya Gupta, Bantwal Ramakrishna Rau, Richard Craig Johnson, and Michael S. Schlansker; now U.S. Pat. No. 6,457,173.

U.S. patent application Ser. No. 09/378,601, entitled PROGRAMMATIC SYNTHESIS OF A MACHINE DESCRIPTION FOR RETARGETTING A COMPILER, by Shail Aditya Gupta; now U.S. Pat No. 6,298,471.

U.S. patent application Ser. No. 09/378,298 PROGRAMMMATIC SYNTHESIS OF PROCESSOR ELEMENT ARRAYS by Robert S. Schreiber, Bantwal Ramakrishna Rau, Shail Aditya Gupta, Vinod Kumar Kathail, Sadun Anik; and U.S. patent application Ser. No. 09/378,290, entitled AUTOMATED DESIGN OF PROCESSOR SYSTEM USING FEEDBACK FROM INTERNAL MEASUREMENTS OF CANDIDATE SYSTEMS, by Michael S. Schlansker, Vinod Kumar Kathail, Greg Snider, Shail Aditya Gupta, Scott A. Mahlke and Santosh G. Abraham; now U.S. Pat No. 6,408,428.

The above patent applications are hereby incorporated by reference.

TECHNICAL FIELD

The invention relates to programmable and non-programmable processors having Explicitly Parallel Instruction Computing Architectures (EPIC).

BACKGROUND

As the workstation and personal computer markets are rapidly converging on a small number of similar architectures, the embedded systems market is enjoying an explosion of architectural diversity. This diversity is driven by widely-varying demands on processor performance and power consumption, and is propelled by the possibility of optimizing architectures for particular application domains. Designers of these application specific instruction-set processors (ASIPs) must make tradeoffs between cost, performance, and power consumption. In many instances, the demands for a particular application can be well served by using an ASIP having an Explicitly Parallel Instruction Computing (EPIC) architecture. One form of EPIC processor is a very long instruction word (VLIW) processor. Throughout this document, references to a VLIW processor are intended to broadly encompass EPIC processors.

VLIW processors exploit instruction-level parallelism (ILP) by issuing several operations per instruction to multiple functional units. A VLIW processor design specifies the processor's datapath and control path. The datapath includes the functional units for executing operations, registers for storing the inputs and outputs of the operations, and the interconnect for transferring data between the functional units. The control path provides control signals to the control ports in the datapath based on a program, which is either read from memory or hardwired into the control logic.

VLIW processors can be grouped into two categories: "programmable" and "non-programmable" depending on how their control logic is implemented. Programmable VLIW processors are processors that can be programmed by users. The instruction set of these processors is visible to the programmer/compiler so that a programmer can write programs either directly in the machine code or in a high level language that is then compiled to the machine code. These processors are connected to a "program memory" that is used to store the program to be executed. Typically, the program memory is part of the memory system that stores both data and programs, and it is implemented using RAM (random access memory) that can be both read and written.

Non-programmable VLIW processors are designed to execute a specific application or a fixed set of applications.

In the context of our design flow, the difference between the design of programmable and non-programmable processors lies in the way control logic is designed. There are the following two broad approaches for designing the control logic.

1. Finite state machine (FSM) based control: In this approach, there is no program stored in memory; the processor contains all the control logic in the form of a finite state machine. The FSM can be implemented using hard-wired logic in which case the processor is non-programmable and can execute only one program. It can also be implemented using "reconfigurable" hardware such as FPGAs or certain types of PLAs. In this case, the processor can be re-configured to execute a different program.

2. Program counter based control: In this approach, the control is expressed in the form of a program consisting of a sequence of instructions stored in a program memory. The processor contains a program counter (PC) that contains the memory address of the next instruction to execute. In addition, the processor contains control logic that repeatedly performs the following sequence of actions:

A. Fetch instruction from the address in the PC.
B. Decode the instruction and distribute the control to the control points in the processor datapath.
C. Update the PC as follows. If the instruction just executed contains either an implicit or explicit branch and the branch was taken, then the new value of the PC is the branch target address specified in the instruction. In all other cases, the next value of the PC is the address of the next instruction in the program.

Instruction representation in this approach can take the following two forms:

1. Horizontal instructions: In this approach, the value of each control point is specified directly. A (micro-) program consists of a sequence of wide words, each of which specifies the values for all the control points for an execution cycle. The main advantage of this approach is that the instruction format and the logic in the processor to decode the instruction are very simple. Processors with this type of control are referred to as horizontally micro-programmed processors.

2. Encoded instructions: This approach uses some form of encoding to reduce the size of instructions. It may group control points in easily identifiable groups such as opcode, source and destination register specifiers, etc. Since control is now encoded, the instruction format and the decode logic become more complex. The degree of encoding varies from processor to processor and directly affects the complexity and the cost of the decode logic. General-purpose microprocessors use this type of control.

The program to be executed can be stored in either RAM or ROM (i.e., read only memory). In the first case, the processor can be made to execute different programs at different times by loading the appropriate program in the program memory. Thus, such systems can be called programmable systems. In the latter case, there is only one program stored in the memory. Thus, the processor can execute only a single program and is non-programmable.

The following table summarizes the various ways in which control can be implemented.

| Control Philosophy | Program memory/ logic implementation | Programmability |
| --- | --- | --- |
| Finite state machine | Hard-wired logic | Non-programmable Can execute only a single program |
| | Reconfigurable logic | Reconfigurable Can execute multiple programs |
| Program counter based | RAM | Programmable Can execute multiple programs |
| | ROM | Non-programmable Can execute only a single program |

In designing a VLIW processor, a number of cost/performance trade-offs need to be made. Each of these trade-offs can have a substantial impact on the overall system cost and performance. Unfortunately, designing a VLIW processor today is a fairly cumbersome manual process which must carefully weigh cost and performance tradeoffs in the light of resource sharing and timing constraints of the given micro-architecture. Optimizations and customizations of the processor, if any, with respect to a set of applications or an application domain must also be determined and applied manually.

Manual design of ASIPs is time consuming, and thus, it is not very conducive to the widespread use of ASIPs, since time to market is very important. To reduce the design time, designers of embedded systems need a system that can generate ASIPs from functional or algorithmic description of applications in an automatic way.

SUMMARY OF THE INVENTION

The invention provides a method and system for automatic and "programmatic" design of VLIW processors. The features of the invention may be used to design general purpose and application-specific processors as well as subcomponents of these processor designs. These subcomponents include the processor's datapath, control path, and in the case of a programmable processor, its instruction format.

The method may be used to design programmable and non-programmable VLIW processors. For both programmable and non-programmable processors, the method builds the processor's datapath from an abstract Instruction Set Architecture (ISA) specification and a macrocell library of hardware components. The abstract ISA specifies the processor's desired operations (e.g., an opcode repertoire), instruction level parallelism (ILP) constraints among the operations, the I/O format of the operations and the number and type of register files in the processor. The method builds a description of the datapath by selecting instances of functional units that satisfy the ILP constraints. It then allocates register file ports to data ports of the functional units and synthesizes the interconnect between these ports using components from the macrocell library. The resulting datapath specification includes functional unit instances, register file instances, and the interconnect between the functional units and register files.

For programmable processors, the method programmatically generates the processor's instruction format based on information from the datapath design and the abstract ISA specification. The method selects instruction templates representing the processor's VLIW instructions based on the ILP constraints. It then sets up a bit allocation problem specification that sets forth the instruction field bit width requirements and the mapping of each instruction field to the control ports in the datapath. Finally, the method allocates bit positions in the processor's instruction register to each of the instruction fields. The instruction format specifies the processor's VLIW instructions, the instruction fields for each of the instructions, and bit positions and encodings for the instruction fields.

The design of the control path depends on whether the processor is programmable or non-programmable. For a programmable processor, the method programmatically generates a hardware description of the control path using information from the processor's instruction format and its datapath. In particular, it programmatically generates a description of the macrocell instances in the instruction unit's datapath from the instruction cache to an instruction register. It also computes logic tables that specify the control logic coupling an instruction sequencer to the instruction unit's datapath and the decode logic coupling the instruction register to the control ports in the datapath. For non-programmable processors using a micro-program control approach, the design flow of the control path is similar. For non-programmable processors using hard-wired control, the design flow does not create an instruction format, and instead, synthesizes the control logic (e.g., a finite state machine) from a scheduled application program.

This VLIW design method can be used in many different ways. It can be used as an automatic system to design ASIPs from application programs. It can be used as an assistant in the process of the manual design of general-purpose and application-specific processors, or for optimizing or customizing existing architectures to new application domains. It also enables automated design-space exploration of processor architectures by providing a much faster turnaround in designing and evaluating the cost and performance of processor designs for each point in the design-space.

The VLIW design process is implemented as a collection of program modules, which together form a VLIW design system. The functional components of the system include a datapath synthesizer for building the datapath, an instruction format designer for designing the instruction format, a control path synthesizer for constructing the control path, and a machine description (MDES) extractor for extracting a description suitable for re-targeting a compiler.

In some design scenarios, the system uses the extracted MDES to re-target a compiler. The re-targeted compiler schedules an application program (or set of application programs) based on the MDES and provides operation issues statistics. The system uses these statistics to select custom instruction templates that optimize the instruction format design for the application program or set of programs. The MDES may be extracted from the abstract ISA, or from a combination of the abstract ISA and the datapath. The former approach enables the system to optimize an instruction format or concrete ISA specification based on the abstract ISA specification. The latter approach enables the system to design an instruction format using both the constraints in the abstract ISA specification as well as resource sharing constraints in the datapath.

The modules in the VLIW system may be used individually or in a variety of combinations for unique VLIW processor design scenarios. In one such scenario, the datapath synthesizer takes an abstract Instruction Set Architecture (ISA) specification and programmatically generates a datapath in a hardware description language using hardware macrocells from the macrocell library. The instruction format designer then programmatically generates the processor's instruction format. The control path synthesizer may be used to construct a hardware description of the components in the processor's instruction unit.

In another scenario, the system extracts the abstract ISA specification from a concrete ISA specification of a VLIW processor, including the instruction format and register files specification of the processor. By extracting the abstract ISA specification, the system may then proceed to build the datapath, extract an MDES, and build a control path based on the abstract ISA specification. The system may also optimize the instruction format using operation issue statistics to select custom templates for an application program or set of applications.

In another scenario, the system extracts the abstract ISA specification from a VLIW datapath description. Using the abstract ISA, the system may then proceed to generate the instruction format, extract an MDES, and construct the control path. As above, the system may also use the MDES to select custom templates.

Further advantages and features will become apparent with reference to the following detailed description and accompanying drawings.

BRIEF DESCRIPTION OF THE DRAWINGS

FIGS. 10A–B are two distinct operation format and reservation table combinations for the ALU shown in FIG. 9.

FIG. 11 is a reservation table for a SQRT operation.

FIG. 17 is a diagram illustrating the process of selecting instruction templates.

DETAILED DESCRIPTION 1.0 Introduction

Figure 1:
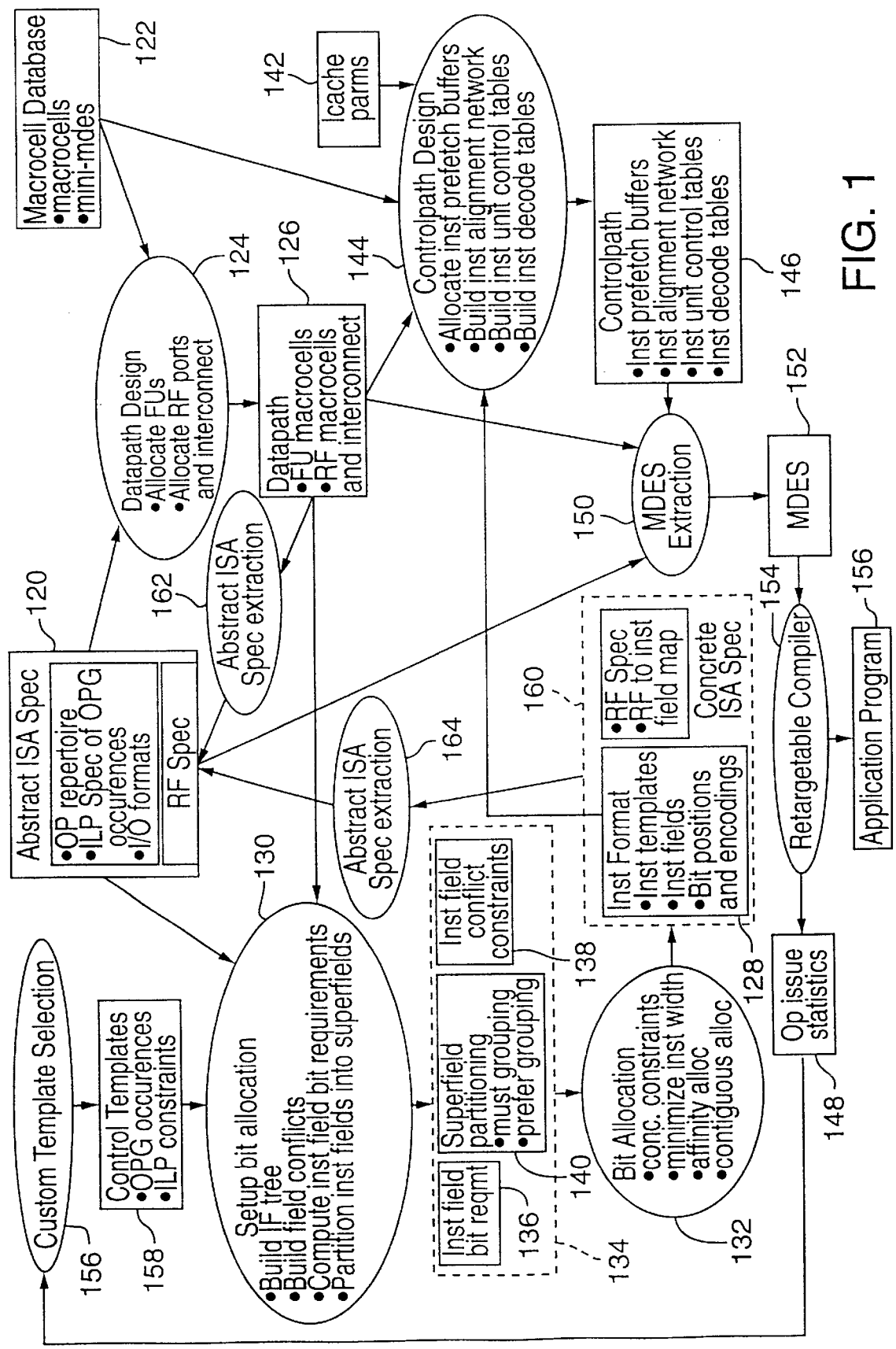
FIG. 1 illustrates the design flow of VLIW processor in an implementation of the invention.

FIG. 1 is a block diagram illustrating the design flow in a VLIW design system. The system is implemented in collection of program modules written in the $C^{++}$ programming language. While the system may be ported to a variety of computer architectures, the current implementation executes on a PA-RISC workstation or server running under the HP-UX 10.20 operating system. The system and its components and functions are sometimes referred to as being "programmatic." The term "programmatic" refers to a process that is performed by a program implemented in software executed on a computer, in hardwired circuits, or a combination of software and hardware. In the current implementation, the programs as well as the input and output data structures are implemented in software stored on the workstation's memory system. The programs and data structures may be implemented using standard programming languages, and ported to a variety of computer systems having differing processor and memory architectures. In general, these memory architectures are referred to as computer readable media.

Before outlining the design flow, it is helpful to begin by defining terms used throughout the description.

2.0 Definitions

VLIW

VLIW refers to very long instruction word processors. In the context of this document, VLIW also refers more generally to an explicitly parallel instruction computing (EPIC) architecture that explicitly encodes multiple independent operations within each instruction.

Operation Set

An operation set is a set of opcodes that are mutually exclusive or cannot be issued concurrently. The ability to represent opcodes in an operation set is only a convenience and is not required to implement the system. While each operation set can consist of a single opcode, it is more convenient to specify opcodes with similar properties as a set. This approach simplifies the input specification because the user (or another program module) need only specify desired concurrency and/or exclusion relationships among sets of operations, as opposed to each individual operation. Though not required, the opcodes in an operation set may share similar properties, such as latency and data type. For example, integer arithmetic operations such as ADD and SUBTRACT might be organized in an operation set. In the description that follows, we use the notation, ops ( ) to represent an operation set in textual form.

Operation Group

An operation group is an instance of an operation set. Operation groups make it possible to specify that multiple instances of the same operation be issued concurrently. For example, one may want a processor to be able to execute three integer ADD operations concurrently. Thus, the designer could specify that the input specification will include three operation groups, A, B, C, each representing an instance of the operation set, ops (ADD SUB).

Operation Group Occurrence

An operation group occurrence is an occurrence of an operation group in a particular concurrency set or exclusion set. The operation group occurrence enables the processor designer to identify concurrency or exclusion relationships among operation groups explicitly in the input specification. For example, consider an operation group A that is an instance of the operation set ops (ADD SUB). This operation group may be issued concurrently with many different combinations of other operation groups. In order to specify these concurrency relationships, the input specification allows a different "occurrence" (e.g., $A_1$, $A_2$, etc.) of the same operation group to be member of each of these concurrency sets.

Concurrency Set

A concurrency set is a set of operation group occurrences that may be issued concurrently.

Exclusion Set

An exclusion set is a set of operation group occurrences that are mutually disjoint. In other words, the exclusion set specifies a set of operation groups, each having operations that cannot be executed concurrently with any of the operations in each of the other groups in the exclusion set. When specifying ILP constraints in terms of an exclusion set, the exclusion sets may be expressed as a set of operation groups or operation group occurrences.

Abstract Instruction Set Architecture Specification

An Abstract Instruction Set Architecture (ISA) Specification is an abstract specification of a processor design and may include the following:

- an opcode repertoire, possibly structured as operation sets;
- a specification of the I/O format for each opcode;
- a register file specification, including register files and specifying their types and the number of registers in each file;

In our implementation, the register file specification includes the following:

1. Register file types—e.g., integer, floating-point, predicate, branch, etc.
2. The number of register files of each type.
3. The number of registers in each file. Registers are divided into static and rotating. Thus, it specifies the number of static registers and number of rotating registers.
4. The bit-width of registers in a file.
5. Presence or absence of speculative tag bit.

- a specification of the desired ILP constraints, making use of some form of concurrency sets, exclusion sets or a combination of concurrency and exclusion sets, that specifies which sets of operation groups/opcodes can be issued concurrently; and
- other optional architecture parameters, e.g., presence/absence of predication, speculation, etc.

There are a variety of ways to represent the ILP constraints. The user (or another program module) may specify the desired ILP by specifying exclusion and concurrency relationships among operation group occurrences. One way to specify exclusion and concurrency relationships is to construct a data structure representing AND-OR relationships among operation group instances, such as a multi-level AND-OR tree. In such a structure, an AND relationship represents a concurrency relationship among operation group occurrences. Conversely, an OR relationship represents an exclusion relationship among operation group occurrences. Another way to specify exclusion and concurrency relationships is through a graph data structure where the nodes represent operation group occurrences, for example, and the edges connecting the nodes represent exclusion or concurrency relationships among the nodes. Yet another way is to specify pairwise exclusions between operation group occurrences. It is important to note that our approach of organizing operations into operation sets, operation groups, and operation group occurrences is just one way to facilitate expression of ILP constraints. Other ways to organize operations and to express ILP constraints among these operations may be used as well.

ArchSpec

The ArchSpec is a textual, external file format for the Abstract ISA specification. The Archspec may be converted to an abstract ISA spec data structure, which is then processed further to synthesize a processor design. While the specific format of the ArchSpec is a textual file, it is not critical that the input be specified in this form. For example, the input could be specified via a graphical user interface and converted into an abstract ISA data structure.

Instruction Format Specification

The instruction format specifies the instructions capable of being executed in a VLIW processor design. These instructions are represented as instruction templates in the current implementation. The instruction format also includes the instruction fields within each template, and the bit positions and encodings for the instruction fields.

Concrete ISA Specification

The concrete ISA specification includes the instruction format specification and a register file specification of a processor design.

Register File Specification

A register file specification of a processor includes register files, the types of these register files, and the number of registers in each file. It also includes a correspondence between each operand instruction field type and a register file.

As explained above, the register file specification may be provided as part of the abstract ISA.

The register file specification may also be taken from the data path specification, or in some applications, it may be taken from a concrete ISA specification.

Macrocell Library

A macrocell library is a collection of hardware components specified in a hardware description language. It includes components such as gates, multiplexors (MUXes), registers, etc. It also includes higher level components such as ALUs, multipliers, register files, instruction sequencers, etc. Finally, it includes associated information used for synthesizing hardware components, such as a pointer to a synthesizable VHDL/Verilog code corresponding to the component, and information for extracting a machine description (MDES) from the functional unit components.

In the current implementation, the components reside in a macrocell database in the form of Architecture Intermediate Representation (AIR) stubs. During the design process, various control path design program modules instantiate hardware components from the AIR stubs in the database. The MDES and the corresponding information in the functional unit component (called mini-MDES) are in the form of a database language called HMDES Version 2 that organizes information into a set of interrelated tables called sections containing rows of records called entries, each of which contain zero or more columns of property values called fields. For more information on this language, see John C. Gyllenhaal, Wen-mei W. Hwu, and B. Ramakrishna Rau. HMDES version 2.0 specification. Technical Report IMPACT-96-3, University of Illinois at Urbana-Champaign, 1996.

Architecture Intermediate Representation

The Architecture Intermediate Representation (AIR) is a hardware description representation in a machine-readable form. The form of AIR used in the automated control path design is similar to VHDL, but is implemented in a computer language that makes hardware components described in AIR format easier to manipulate with the program routines.

AIR provides a number of $C^{++}$ classes that represent hardware components such as registers, ports and wiring. An AIR design consists of objects instantiated from these classes. For example, an AIR representation of the control path may include a number of macrocell objects representing hardware components such as a register, a FIFO buffer, multiplexor, a tri-state buffer, and wiring. Each of the macrocells may have a number of control and data ports in AIR format and may be interconnected via an AIR wiring data structure.

Data Path Specification

The data path specification is a data structure specifying functional units, register files and interconnections between the data ports of the functional units and register files. The data path also specifies control ports, such as the opcode inputs of the functional units and the register file address inputs. However, the task of connecting these control ports to the decode logic in the control path is left to the control path design process.

In the implementation, the data path specification is a set of related object instantiations in AIR format, enumerating the macrocell instances of functional units and their interconnect components, such as multiplexors, tri-state buffers, buses, etc.

Instruction Unit

The instruction unit includes a control path and an instruction sequencer. The control path has three principal components: 1) the data path of an instruction from the instruction cache to the instruction register (IR) (the IUdatapath), 2) the control logic for controlling the IUdatapath, and 3) the instruction decode logic for decoding each instruction.

In the current implementation, the IUdatapath starts at the instruction cache and ends at an instruction register that interfaces with the instruction decode logic. It includes instruction prefetch buffers and an instruction alignment network for aligning the instruction in the instruction register. Connected between the sequencer and IUdatapath, the IU control logic is combinational logic used to control the instruction prefetch buffers, and the alignment network.

The control logic also provides information to the instruction sequencer that is used to initiate the fetching of the next instruction from the ICache. For example in the current implementation, the control logic processes information from the instruction that specifies the width of the current instruction and indicates whether the next instruction is aligned to a known address boundary (e.g., an instruction packet boundary). The width of the current instruction is derived from an instruction identifier called the template ID. The packet boundary information is specified in the instruction as a consume-to-end-of-packet bit indicating whether the next instruction directly follows the current instruction or starts at the next packet boundary. This bit is used to align certain instructions (e.g., branch targets) to known address boundaries. The instruction may also include spare bits that encode the number of no-op cycles to follow the current instruction.

Instruction Sequencer

The instruction sequencer is the control logic that interfaces with the control logic of the IUdatapath and specifies the sequence of instructions to be fetched from the instruction cache. It manages a memory address register (MAR) that holds the memory address of the next instruction to be fetched from the instruction cache, and the Program Counter, identifying the next instruction to be executed in the processor. The control ports of the sequencer interface with the control ports of the IUdatapath control logic. The sequencer is also responsible for interfacing with the branch functional unit and for managing events such as interrupts and exceptions. The sequencer is a generic macrocell.

Control Path Protocol

The control path protocol provides a structural and procedural model of the control path. The structural model identifies the types of macrocells used to construct the control path, as well as the parameters of these components. Examples of these components may include a prefetch buffer that covers the latency of sequential instruction fetch, an instruction register for storing the next instruction to be issued to the decode logic, and an alignment network made of multiplexors for aligning the next instruction to be issued in the processor.

The procedural model generally specifies the method for fetching instructions from an instruction cache and issuing them to the control ports in the data path.

The automated design system described below is programmed to design a specific instance of a control path based on a predefined control path protocol. The design process includes assigning specific values to the control path parameters in the structural model, and converting the procedural model into a specification of the control logic for controlling instruction fetching.

3.0 Outline of the Design Flow

As summarized above, the VLIW design system may be used in a variety of different design scenarios. In some scenarios, the VLIW developer may use the system to generate a portion or all of the VLIW processor design programmatically. In others, the developer may use the system to optimize an existing VLIW design or part of an existing VLIW processor design. As such, there are many different possible starting and stopping points in the design flow.

FIG. 1 depicts data structures as boxes and programmatic processes as ovals. The data structures represent starting points, stopping points, and, in some cases, both potential starting and stopping points of VLIW design processes. The data structures may be provided in an external form; such as a text file, suitable for input by or output to the user. In addition, the data structures may be provided in an internal form, meaning that it is primarily accessed and manipulated by program routines. Whether in external or internal form, the data structures are "computer-readable" in the sense that the program modules in the system may read or write these data structures.

Below, we outline the design flow from an abstract specification of the processor to a complete description of the processor in a hardware description language. In addition, we cite some alternative design scenarios. A number of design scenarios are possible and should be apparent from the detailed description of the system's implementation.

The design flow shown in FIG. 1 begins with an abstract ISA specification 20 and a macrocell database 22. The datapath design process 24 programmatically generates a datapath in a hardware description language by reading the abstract ISA specification and building the datapath 26 using instances of register files, functional units and interconnect components from the macrocell database.

The system may then create an instruction format specification 28 based on the data path 26 and abstract ISA spec 20. The IF design process includes two primary components: 1) setup bit allocation process 30; and 2) a bit allocation process 32. The first component sets up a bit allocation problem specification 34, which is used by the second component. The setup process initially selects instruction templates based on the ILP specification. The instruction templates each specify operation group occurrences that may be issued concurrently. It then builds the IF-tree data structure containing instruction fields, corresponding to various datapath control points, that need to be assigned bit positions within each instruction template. To set up the bit allocation problem, the process extracts instruction field bit requirements 36. It then identifies instruction field conflict relationships 38, specifying which fields must not share bit positions in the instruction format. Finally, it partitions instruction fields into groups based on instruction field to control port mappings. Instruction fields that map to the same control port are grouped together in a "superfield." Instruction fields in a group may share bit positions but are not forced to share. The user may additionally specify that certain instruction fields in a group must share bit positions. This process creates "preferred" and "must" superfield partitionings 40.

The bit allocation process 32 operates on the bit allocation problem specification 34 to allocate bit positions to each of the instruction fields of the instruction templates. The output of this process is the instruction format specification 28.

Using the instruction format and datapath specifications 28, 26 and selected instruction cache parameters 42, a control path design process 44 generates a control path design 46. In the implementation shown in FIG. 1, the system generates a hardware description of the processor's control path by selecting instances of hardware components from the macrocell database 22. The system designs the control path based on a predefined, parameterized control path protocol. The protocol specifies the general approach for fetching instructions from an instruction cache, buffering these instructions, and aligning them in an instruction register. The control path design process augments the hardware description of the datapath by specifiying instances of the control path hardware and specifying how these hardware components are connected to the control ports in the datapath.

At this stage in the design flow, the processor design includes the instruction format specification and a hardware description of the datapath and control path. In some scenarios, the processor design may be optimized further. One form of optimization used in the system is the customization or optimization of the processor design based on internal usage statistics, such as operation issue statistics 48.

The system shown in FIG. 1 includes software modules for extracting a machine description called MDES at varying stages of the VLIW design flow. These modules are labeled generally as MDES extraction 50. The MDES extraction process programmatically generates an MDES description 52 for driving a retargetable compiler 54. The MDES 50 is represented in database tables that provide the op code repertoire of the processor, their IO formats, their latencies and resource sharing constraints of the operations. For each operation, the resource sharing constraints specify the times at which the operation uses certain resources (e.g., register file ports, data path interconnect buses, etc.). The retargetable compiler queries the database tables to obtain the constraints used to schedule an application program 56. The retargetable compiler 54 provides a schedule of the program from which the operations issue statistics 48 may be gathered. These statistics indicate the combinations of the operations that are issued concurrently as well as their frequency of issuance.

In a process called "custom template selection" 56 the system uses the operation issue statistics to select custom instruction templates 58. In general, the custom templates specify operation group occurrences and their ILP constraints. The system optimizes the instruction format for the application program 56 by using the custom templates as well as the ILP constraints in the abstract ISA specification to set up the bit allocation problem specification.

Since the MDES may be extracted at various points in the design flow, the custom templates based on this MDES may be used at various points in the design process as well. In particular, the system may perform MDES extraction based solely on the abstract ISA specification, based on a combination of the abstract ISA specification and the datapath, and finally, based on a combination of the abstract ISA, the datapath and the control path. As the system specifies additional hardware for the processor, such as the datapath and control path hardware, it can augment the resource reservation tables used to retarget the compiler.

In some design scenarios, the system may not start with an abstract ISA specification. Instead, it may derive it from an existing datapath specification 26 or concrete ISA specification 60. In the first case, the datapath specification may have been specified by hand, or may have been generated in a previous design pass through the VLIW design flow. In the second case, the concrete ISA specification may be provided as input based on some existing processor design. For example, the developer may want to create the next generation of a processor based on the concrete ISA specification for the current generation. Alternatively, the developer may wish to optimize an existing concrete ISA specification for a particular application or application program.

To support these design scenarios, the system includes modules 62, 64 for extracting an abstract ISA specification from an existing datapath and concrete ISA specification, respectively. Once the abstract ISA specification is extracted, the system or the user may alter the abstract ISA specification before using it as input to the VLIW design flow. One particular example is the use of custom templates based on operation issue statistics. Many other scenarios are possible. For example, the system or user may alter the opcode repertoire and ILP constraints to achieve an optimized design based on cost/performance trade-offs.

3.1 Non-Programmable Processors

The types of program modules and data structures used in the design flow will vary for the design of programmable and non-programmable processors. In the context of the VLIW design flow, the design of programmable and non-programmable processors differs in the way the control logic is designed. The system illustrated in FIG. 1 may be adapted to design processors having the following types of control logic:

1. Program Counter based; and
2. Finite state machine.

Each of these forms of control is described in the background section. In the first case, the design flow generates the control path based on parameterized control path and control path protocol, based in part on an instruction format specification. The design flow may generate the instruction format programmatically, or it may be specified by hand.

In the second case, the control logic is in the form of hard-wired logic, such as a finite state machine. To design a processor that employs this form of control logic, the design flow may be adapted as follows. First, the components and data structures used to design the instruction format are unnecessary (processes 30, 32, 56, and 64; and data structures 34, 48, 58, and 60). Next, the control path design would be replaced with an NPA logic design process and the output of this process would be a hardware description of the finite state machine. As before, an MDES would be extracted from the datapath and used to retarget the compiler. The retargetable compiler would then be used to generate a scheduled program, which in turn, would be provided as input to the NPA logic design process.

In each of the three approaches, the hardware technology used to implement the processor, including the datapath and control logic, may be any of a variety of hardware methodologies such as FPGA, custom logic design, gate arrays, etc.

4.0 Implementation of the Abstract ISA

4.1 ArchSpec

The ArchSpec is an abstract textual description of a specific VLIW machine drawn from a generic architecture family, such as the HPL-PD family of architectures. (See Vinod Kathail, Michael Schlansker, Bantwal Ramakrishna Rau. HPL PlayDoh Architecture Specification: Version 1.0. Technical Report HPL-93-80. Hewlett-Packard Laboratories, February, 1994.) In the context of this document, the term VLIW is construed broadly to encompass Explicitly Parallel Instruction Computing (EPIC) Architectures. The architecture family specifies a superset of opcodes (e.g., the HPL-PD family instruction set), a set of logical register files to store various types of operands, and a specification of which logical files each opcode can source/sink its operands from/to—its (logical) operation format. The specification further specifies the semantics of important architectural mechanisms that may be included or excluded, such as predication, speculation, support for modulo-scheduling etc.

At an abstract level, the ArchSpec need only specify the functionality of the hardware implementation in terms of its opcode repertoire and the desired performance level. In general, the ArchSpec enumerates the set of opcode instances that are to be implemented by the target machine, and provides a description of the amount of ILP that is to exist among them.

For convenience, the various instances of the opcodes for a given machine are grouped into Operation Groups, each of which is a set of opcode instances that are similar in nature in terms of their latency and connectivity to physical register files and are to be mutually exclusive with respect to operation issue. For example, since add and subtract operations require similar operand types and execute on the same ALU, their respective opcode instances may be placed in the same operation group. By definition, all opcode instances within an operation group are mutually exclusive, while those across operation groups are allowed to execute in parallel.

The parallelism of the machine may be further constrained by placing two or more operation groups into a form of an exclusion set called an Exclusion Group, which makes all their opcode instances mutually exclusive and allows them to share resources. For instance, an exclusion group may include multiply and add operations that reside on separate functional units yet share the same result bus.

As an example, a simple 2-issue machine is specified below. This example specification is expressed in a database language called HMDES Version 2. See John C. Gyllenhaal, Wen-mei W. Hwu, and Bantwal Ramakrishna Rau. HMDES version 2.0 specification. Technical Report IMPACT-96-3, University of Illinois at Urbana-Champaign, 1996. This language organizes the information into a set of interrelated tables called sections containing rows of records called entries. Each entry contains zero or more columns of property values called fields.

```
SECTION Operation Group {
        OG_alu_0 (ops (ADD SUB) format (OF_intarith2));
        OG_alu_1 (ops (ADD SUB) format (OF_intarith2));
        OG_move_0 (ops (MOVE) format (OF_intarith1));
        OG_move_1 (ops (MOVE) format (OF_intarith1));
        OG_mult_0 (ops (MPY) format (OF_intarith2));
        OG_shift_1 (ops (SHL SHR) format (OF_intarith1));
}
SECTION Exclusion_Group {
        EG_0 (opgroups (OG_alu_0 OG_move_0 OG_mult_0));
        EG_1 (opgroups (OG_alu_1 OG_move_1 OG_shift_1));
}
```

This example specifies two ALU operation groups (OG_alu_0, OG_alu_1), two move operation groups (OG_move_0, OG_move_1), one multiply group (OG_mult_0), and one shift group (OG_shift_1). These operation groups are further classified into two exclusion groups (EG_0, EG_1) consistent with a two-issue machine. The multiply group shares resources with one ALU group, while the shift group shares resources with the other. Each operation group also specifies one or more operation formats shared by all the opcodes within the group. Additional operation properties such as latency and resource usage may also be specified, as shown below.

```
SECTION Operation_Group {
    OG_alu_0        (ops(ADD SUB) format("OF_intarith2")
                     latency (OL_int)
                     resv (RT_OG_alu_1)
                     alt_priority(0));
    ...}
```

The "resv" parameter provides an abstraction for specifying user-defined sharing. The "alt_priority" parameter provides the priority of the operation group in the MDES, which the retargetable compiler uses to schedule the operations. There is a similar set of parameters for each operation group.

The ArchSpec additionally includes information to describe the physical register files of the machine and the desired connectivity of the operations to those files. A Register File entry defines a physical register file of the machine and identifies its width in bits, the registers it contains, and a virtual file specifier corresponding to the type of data (operands) it is used to carry. The virtual specifier assumes an implied connectivity between the opcodes and the register file, e.g., a floating point opcode would need to connect to a floating point-type register file, etc. As an alternative to implied connectivity, the user may specify an explicit connectivity by specifying a mapping between each operation and the type of register file associated with it.

The register file entry may also specify additional properties such as whether or not the file supports speculative execution, whether or not the file supports rotating registers, and if so, how many rotating registers it contains, and so on. The immediate literal field within the instruction format of an operation is also considered to be a (pseudo) register file consisting of a number of "literal registers" that have a fixed value.

The Operation Format (IO format) entries specify the set of choices for source/sink locations for the various operations in an operation group. Each operation format consists of a list of Field Types (IO Sets) that determine the set of physical register file choices for a particular operand. For predicated operations, the input specification may also specify a separate predicate input field type containing a predicate register file.

The code listing below provides an example of the register file and operation format inputs sections of an ArchSpec:

```
SECTION Register_File {
    gpr(width(32) regs(r0 r1 ... r31) virtual(I));
    pr(width(1) regs(p0 p1 ... p15) virtual(P));
    lit(width(16) intrange(-32768 32767) virtual(L));
}
SECTION Field_Type {
    FT_I (regfile (gpr));
    FT_P) regfile (pr));
    FT_L (regfile (lit));
    FT_IL(compatible_with(FT_I FT_L));
}
```

```
SECTION Operation_Format{
    OF_intarith1(pred(FT_P) src(FT_I) dest (FT_I));
    OF_intarith2(pred(FT_P) src(FT_IL FT_I) dest(FT_I));
}
```

The example shows that the above machine has a 32-bit general purpose register file "gpr", a 1-bit predicate register file "pr" and a 16-bit literal (pseudo) register file "lit". Each register file can be used alone or in conjunction with other files in a field type specification as a source or sink of an operand. The field types for the predicate, source and destination operands are combined to form the valid operation formats for each operation group. For example, the 2-input ALU operation group "OG_alu0" (See "SECTION Operation_Group" above) has an operation format "OF_intarith2", which specifies that its predicate comes from the predicate register file "pr", its left input is an integer from either a literal register file or from a general purpose register file "gpr", its right input is from "gpr" and its output is written to the general purpose register file "gpr".

The specification may also contain information defining additional architecture parameters:

```
SECTION Architecture_Flag {
            predication_hw(intvalue(1));
            speculation_hw(intvalue(0));
            systolic_hw (intvalue(1));
            technology_scale (doublevalue (0.35));
}
```

This section lists processor parameters indicating whether the processor architecture supports predication, speculation, and a systolic coprocessor. The last parameter is a technology scale, specifying a desired manufacturing level (e.g., 0.35 micron). The technology scale can be used to calculate the area of silicon required to manufacture the processor. For instance, when the silicon area is a design constraint on datapath synthesis, the synthesis process uses this information to evaluate the cost (e.g., chip area) of a particular design. The synthesis process may select functional units, for example, that satisfy a constraint on the silicon area.

4.2 Converting the ArchSpec to Internal Form

The system converts the ArchSpec into an internal form that is easier to manipulate and traverse programmatically. The program module called the reader 14 reads the ArchSpec and generates the internal form of the abstract ISA specification.

In the implementation, the internal form of the abstract ISA specification provides a normalized representation of the ArchSpec in terms of ILP constraints. In particular, both exclusion and concurrency sets are expressed in terms of opgroup occurrences. To generate this normalized representation, the reader extends the ILP constraints as follows. For each opgroup occurrence in a concurrency group (if any), the reader gives the opgroup occurrence a unique name. The reader then collects all opgroups occurrences of one opgroup into a new exclusion group. Next, it expands each opgroup in an exclusion group by its set of all opgroup occurrences.

The reader also carries over all other properties from the ArchSpec including register files, field types, operation formats, and architecture flags. In the abstract ISA specification, each opgroup occurrence behaves like an opgroup. Therefore, the terms "opgroup" and "opgroup occurrence" may be treated synonymously in the subsequent discussion.

Figure 2:
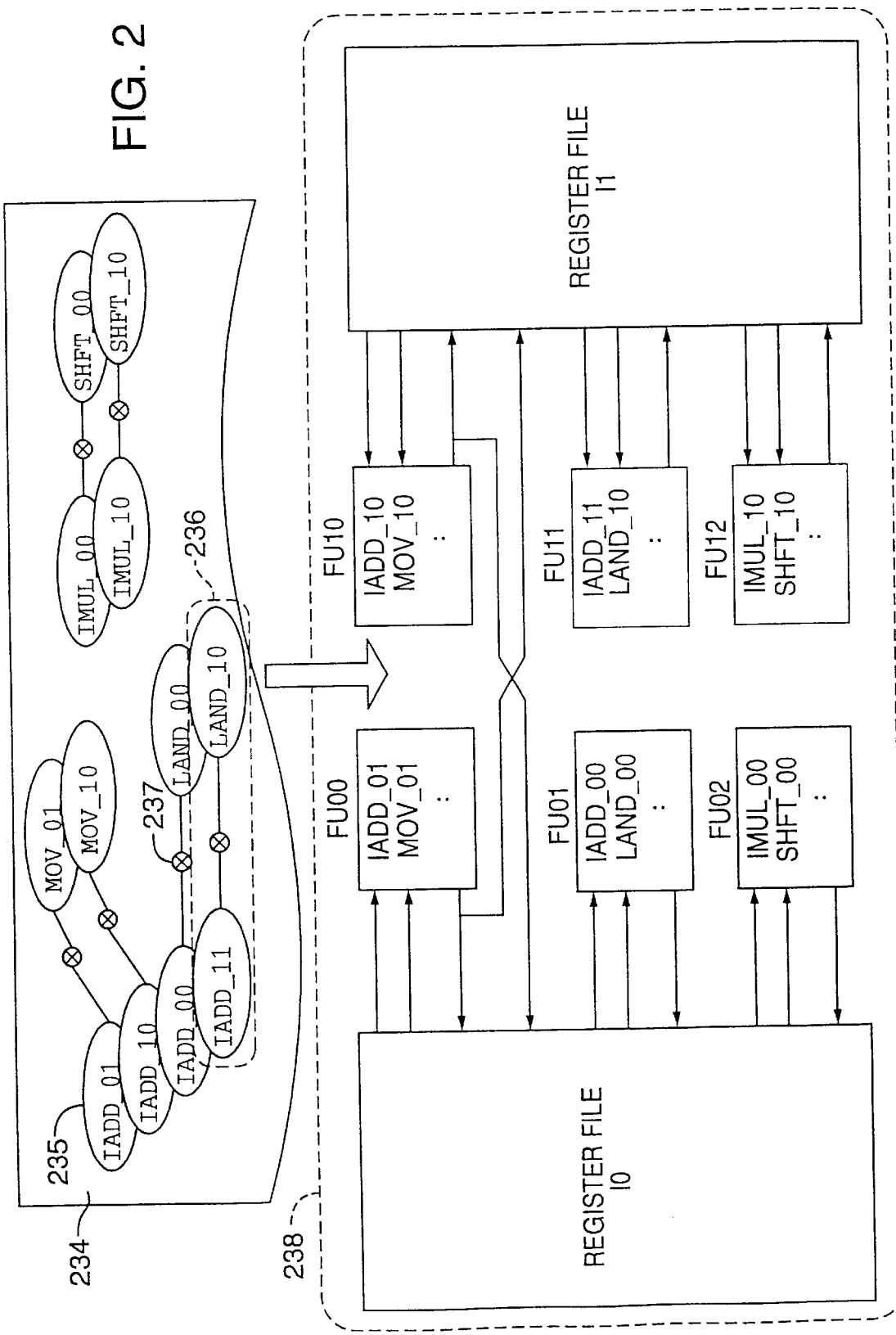
FIG. 2 shows an example of how the system might assign functional units and allocate register file ports based on a high level specification of operation groups and resource sharing constraints among these groups.

To illustrate the relationship between the abstract input and the corresponding datapath output, FIG. 2 graphically depicts an example of an input specification 234 and a corresponding datapath design 238. The datapath synthesizer 124 (FIG. 1) processes an input specification like the one graphically depicted in FIG. 2 (e.g., Item 234) to create a physical datapath representation 238, which is shown as a set of functional units (FU00–FU12), register files (I0–I1), and the interconnect topology between them. As shown in this example, the input specification 234 provides the desired operation groups 235, and specifies the instruction level parallelism among these groups as "exclusion groups" (e.g., IADD__11 and LAND__10 are related as an exclusion group 236). Each operation group includes one or more opcode instances; for simplicity, only a single opcode instance is shown for each operation group. Each operation group typically contains opcodes that have similar resource requirements and latency. Each exclusion group 236 comprises two or more operation groups (only two are shown here) whose opcode instances are mutually exclusive, as illustrated by exclusion marker 237 connecting the op groups together. For instance, the opcode instances in operation group IADD__11 are mutually exclusive with the opcode instances in operation group LAND__10. When operation groups are marked as mutually exclusive, the datapath synthesizer may force them to share processor resources by, for example, assigning them to the same functional unit. When these opgroups share a hardware resource, the compiler will not schedule them to issue concurrently. If operation group occurrences are marked as being concurrent (e.g., in a concurrency set), the datapath synthesizer will synthesize the datapath so that these operations may be issued concurrently. When the opgroup occurrences are specified as part of a concurrency set, the compiler may schedule the corresponding operations to issue concurrently.

The datapath synthesizer 124 (FIG. 1) converts the abstract input specification into a machine-readable datapath representation. The datapath representation is a set of related classes that define instances of functional units, register files, etc., and their interconnect, in the form of data buses, muxes, etc. The datapath representation may then be processed to produce a hardware description of the datapath in a hardware description language, e.g., a structural VHDL or Verilog description, which can be further processed to produce a physical datapath, such as that shown in FIG. 2.

A principal objective of datapath synthesis is to maximize processor functionality and throughput without requiring excess duplication of opcode instances and/or functional unit instances. Since operation groups with no exclusion relationship can be issued concurrently, the opcode instances within these operation groups must be placed on separate functional units. Conversely, the opcode instances of operation groups that are marked as mutually exclusive may be placed on the same functional unit. With these design guidelines, the datapath synthesizer attempts to assign a single functional unit to operation groups that are exclusive, and places concurrent operations on different functional units, as shown in the physical datapath representation 238.

The physical datapath 238 in FIG. 2 includes six functional units, FU00, FU01, FU02, FU10, FU11, and FU12, and two register files, I0 and I1. The synthesis process selects each functional unit to meet the requirements of the opcode instances, such as IADD, MOV, SHFT, etc. Next, the process allocates the register ports of register files I0 and I1 to satisfy the port requests of the opcode instances. Finally, the process creates the interconnect based on the port allocation. The lines leading into the register files are write lines, while the lines leading out of the register files are read lines. In an actual design, the number and type of functional units, I/O lines, register files, etc., will depend on the architecture specification for a particular target machine.

The process of assigning functional units to opcode instances directly follows the constraints specified in the abstract input 234. For example, the opcode instances of the IADD, MOV, LAND, IMUL, and SHFT operation groups, which are not mutually exclusive, are placed on separate functional units. The pairwise exclusion relationships between the IMUL and SHFT operation groups causes the synthesizer to place IMUL__00 and SHFT__00 on the same functional unit, if possible. In general, the datapath representation 238 shows that the opcode instances of mutually exclusive pairs of operation groups from the input specification 234 share functional units.

The remaining components of the datapath 238, namely the register files and their interconnect to the functional units, are synthesized on the basis of the register file and operation format specification present in the abstract ISA specification. For example, the operation format for IADD-01 and MOV-01 operation groups must specify that their inputs are drawn from register file I0 and its output is deposited in register file I1. Similarly, the operation format for IADD-10 and MOV-10 operation groups must specify that their inputs are drawn from I1 and outputs go to either I0 or I1. This gives rise to the cross-connected function units FU-00 and FU-10.

An example of the textual description of these register files and operation format specifications is provided below.

---

SECTION Field Type {
  FT__I0 (regfile (I0));
  FT__I1 (regfile (I1));
}
SECTION Register File {
  I0(width (32) regs (I0r$_1$ ... I0r$_{31}$) virtual(I));
  I1(width (32) regs (I1r$_1$ ... I1r$_{31}$) virtual(I));
}
SECTION Operation__Format {
  OF__intarith2__I0__I0 (pred( )src(FT__I0 FT__I0) dest (FT__I0));
  OF__intarith2__I0__I0 (pred( )src(FT__I0 FT__I0) dest(FT__I0 FT__I1));
}

---

5.0 Datapath Design

Figure 3:
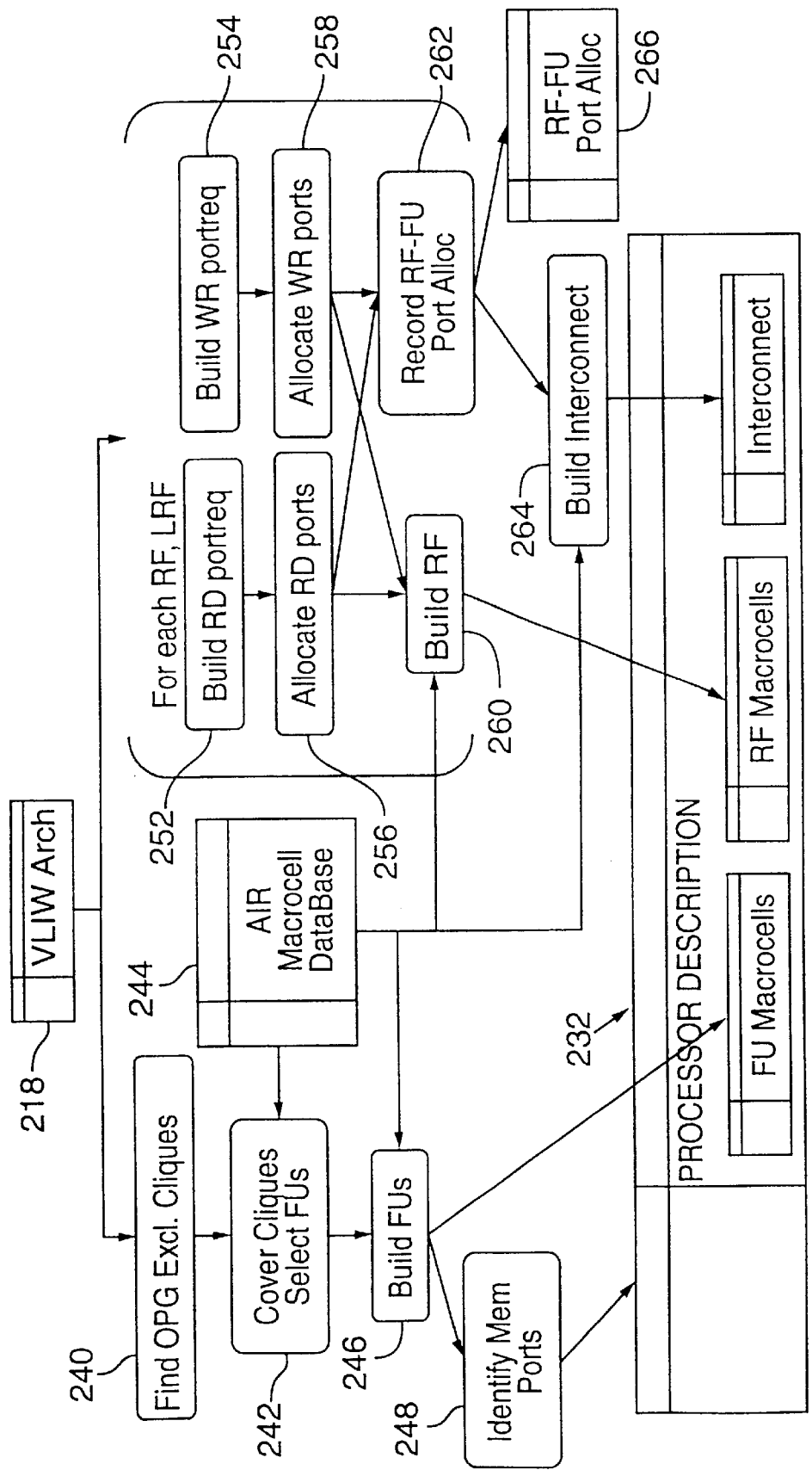
FIG. 3 is a flow diagram illustrating an implementation of the datapath synthesis process shown in FIG. 1.

FIG. 3 is a flowchart of an implementation of the datapath synthesis process shown in FIG. 1. The abstract ISA spec 218 is a machine-readable data structure that specifies register files, operation groups, ILP constraints, and architecture parameters. The datapath synthesis includes two primary phases: 1) synthesis of the functional unit instances (see steps 240, 242, 244, 246, and 248) and 2) register file and interconnect synthesis (see steps 252, 254, 256, 258, 260, 262, 264, and 266).

5.1 Functional Unit Synthesis

In the synthesis of the functional units, the first step is to determine the maximal sets of mutually-exclusive operations based on the ILP constraints. In the current implementation, the datapath synthesizer finds these sets of exclusive operations by setting up a graph of the exclusion relations among operation groups and then finding cliques in the graph. A clique is a well-known computer science term for a maximal set of nodes in a graph, where each node in the set connects with every other node in that set. In the context of an exclusion graph, the cliques represent a maximal set of operation group nodes where the operation groups are exclusive with every other operation group in the set. The connections among the nodes in the graph represent exclusion relationships between the operation groups.

Figure 4:
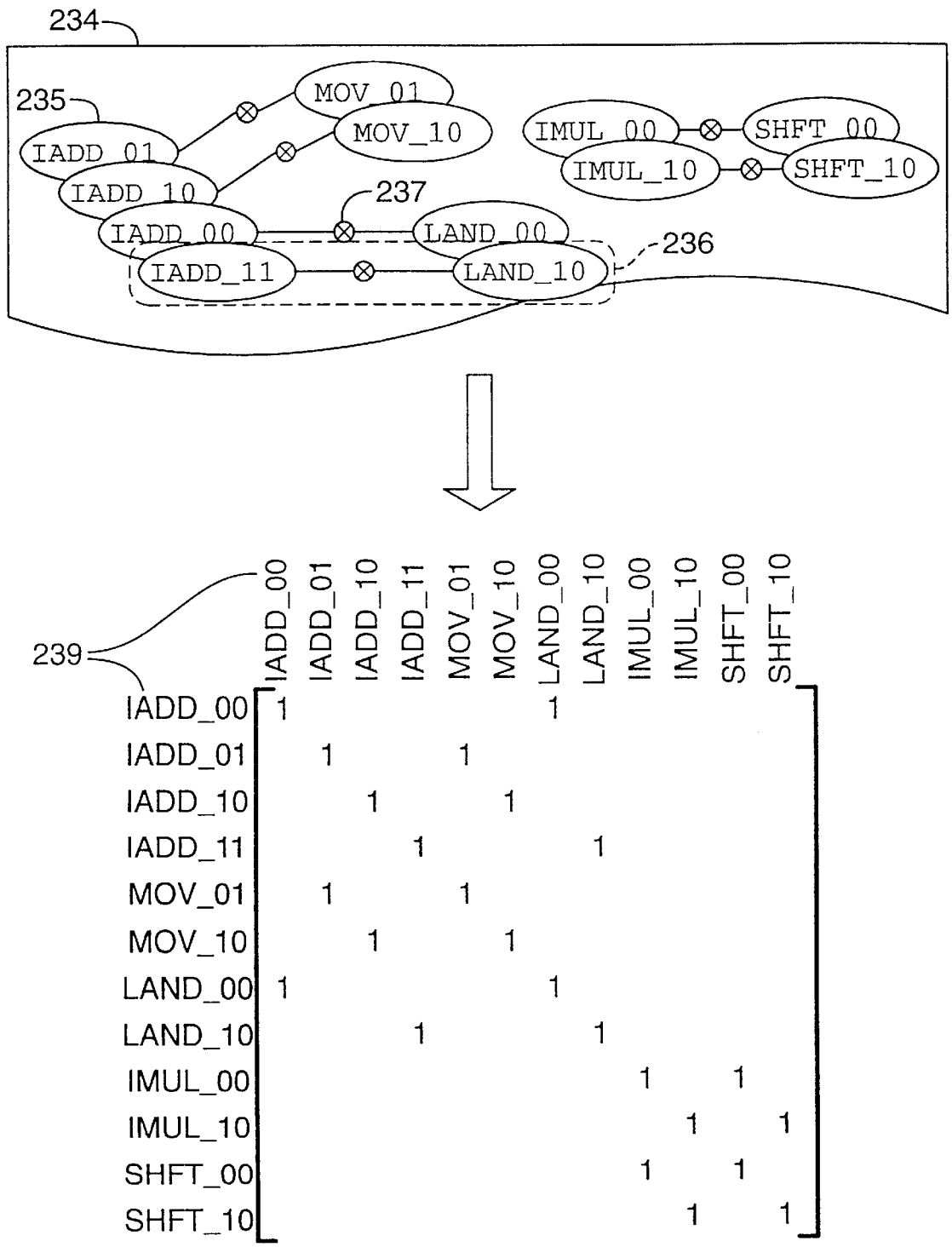
FIG. 4 is an example of a data structure used to represent resource sharing constraints in the datapath synthesis process.

Exclusion cliques represent sets of operation groups that cannot be executed concurrently. In the current implementation, the process of finding cliques begins by generating a Boolean exclusion matrix that identifies the exclusion relationships between operation groups based on the ILP constraints. FIG. 4 illustrates an example of an exclusion matrix corresponding to the abstract specification 234 from FIG. 2. The exclusion matrix for a given set of N operation groups will comprise an N×N matrix, where the rows and columns are both labeled with the same operation group identifier 39. Operation groups that are mutually exclusive are then marked with a "1", while all other values are "0" (not shown here for clarity). By default, all of the values along the diagonal of the matrix are set to 1s, since an operation group is assumed to be mutually exclusive with itself. The exclusion matrix values will always mirror about the diagonal, so that only one half of the matrix is actually needed for processing.

It is possible to reduce the size of the problem by collapsing nodes that are equivalent in terms of exclusion/concurrency relations.

After building the exclusion matrix, the datapath synthesizer executes a recursive algorithm on the matrix data to find the exclusion cliques. The exclusion graph naturally follows from the exclusion relationship expressed in the matrix. The recursive algorithm operates on this graph according to the following pseudocode:

```
RecursiveFindCliques (currentClique, candidateNodes)

1:   // Check if any candidate remains
2:   if (candidateNodes is empty) then
3:      // Check if the current set of clique nodes is maximal
4:      if (currentClique is maximal) then
5:         Record(currentClique);
6:      endif
     else
8:      StartNodes = Copy(candidateNodes);
9:      while (StartNodes is not empty) do
10:        H1: if (currentClique ∪ candidateNodes ⊆ some previous
               Clique) break
11:        node = pop(StartNodes);
12:        candidateNodes = candidateNodes - [nodes];
13:        if (currentClique ∪ {node} is not complete) continue;
14:        H2: prunedNodes = candidateNodes ∩ NeighborsOf(node);
15:        RecursiveFindCliques(currentClique ∪ {node}, prunedNodes);
16:        H3: if (candidateNodes ⊆ NeighborsOf(node)break;
17:        H4: if (this is first iteration) startNodes = startNodes -
               NeighborsOf(node);
16:     endwhile
17:  endif
```

The algorithm recursively finds all cliques of the graph starting from an initially empty current clique by adding one node at a time to it. The nodes are drawn from a pool of candidate nodes which initially contain all nodes of the graph. The terminating condition of the recursion (line 2) checks to see if the candidate set is empty. If so, the current set of clique nodes is recorded if it is maximal (line 4), i.e. there is no other node in the graph that can be added to the set while still remaining complete.

If the candidate set is not empty, then the algorithm proceeds to grow the current clique with the various candidates as potential starting points. An exponential search is performed at this point. Various heuristics have been published for growing the maximal cliques quickly and to avoid examining sub-maximal and previously examined cliques repeatedly. (See Ellis Horowitz and Sartaj Sahni, "Fundamentals of Computer Algorithms," Computer Science Press, Rockville, Md., 1984.) The first heuristic (H1) checks to see whether the current clique and the candidate set is a subset of some previously generated clique. If so, the current procedure call cannot produce any new cliques and is pruned. Otherwise, the algorithm continues to grow the current clique with the candidates one by one.

Each candidate node is processed for inclusion into the current clique as follows. If the selected candidate forms a complete graph with the current clique (line 13), the algorithm adds it to the current clique and calls the procedure recursively with the remaining candidates (line 15). The second heuristic (H2) is to restrict the set of remaining candidates in the recursive call to just the neighbors of the current node since any other node will always fail the completeness test within the recursive call. After the recursive call returns, if the remaining candidate nodes are found to be all neighbors of the current node, then the algorithm can also prune the remaining iterations within the current call (H3) since any clique involving any of those neighbors must include the current node and all such cliques were already considered in the recursive call. Finally, if non-neighboring candidates are present, we can still drop the neighbors of the current node as starting points for the first iteration only (H4).

While we have illustrated a specific example of finding cliques in a graph, there are other algorithms for accomplishing this task. In addition, there alternative approaches for finding sets of mutually exclusive operations that do not involve cliques. It is also possible to identify sets of concurrent operation group occurrences, and then assign FUs so that the operation group occurrences in each set are assigned to different FUs.

After finding maximal sets of mutually exclusive operation groups, the datapath synthesizer selects functional units from a standard or user-specified macrocell library so that all of the opcodes occurring in each set are covered, i.e., able to be executed on the selected functional units. As shown in FIG. 3, the current implementation selects functional units to cover the exclusion cliques (see step 242). Next, the datapath synthesizer instantiates the selected functional units as shown (step 246). In building the functional units in this manner, the objective is to optimize the selection of functional unit instances so that all of the required opcodes are still supported while maintaining the exclusion requirements defined by the cliques. In some cases, it may not be possible to map individual cliques to a single functional unit, thereby necessitating the use of multiple functional units to support the opcode requirements of the clique. Pseudocode for covering the cliques and building the functional units is listed below:

```
BuildFUs (VLIWArch, listOfCliques)

1:    foreach (OPG ∈ VLIWArch)
2:       build valid ListOfFUs(Opset(OPG)) from Database;
3:       // match opcodes, latency
4:    foreach (OPG ∈ VLIWArch)
5:       foreach (usedFU ∈ ListOfFUs(Opset(OPG)))
6:          ListOfOpsets(usedFU) += Opset(OPG);
7:    while (listOfCliques is not empty)
8:       find (bestFU ∈ usedFUs) such that
9:          forsome (clique ∈ listOfCliques)
10:            maxCoveredOPGs = { OPG | OPG ∈ clique,
11:               Opset(OPG) ∈ ListOfOpsets(bestFU) }
12:         H1: size(maxCoveredOPGs) is maximum
13:         H2: area(bestFU) is minimum
```

| BuildFUs (VLIWArch, listOfCliques) |
| --- |
| 14:     instantiate (bestFU); record (maxCoveredOPGs); |
| 15:     foreach (clique ∈ listOfCliques) |
| 16:         clique −= maxCoveredOPGs; |

The first task is to build a valid list of functional units from the macrocell database that will support the opcode and latency requirements of each of the operation groups of the VLIW architecture specification (line 1–2). And conversely, for each function unit, the code identifies the list of operations that it can possibly cover (line 4–6). For example, if the database contains an ALU0 functional unit that can perform ADD, SUBTRACT, and MOVE opcodes, and an ALU1 functional unit that can perform ADD and MOVE opcodes, then

```
ListOfOpsets(ALU0) = {ADD, SUBTRACT, MOVE};
ListOfOpsets(ALU1) = {ADD, MOVE};
ListOfFUs(ADD) = {ALU0, ALU1};
ListOfFUs (SUBTRACT) = {ALU0};
ListOfFUs(MOVE) = (ALU0, ALU1}.
```

At each iteration of the while loop starting at line 7, a FU is selected that best covers the operation groups of a remaining clique. The criteria for selection in this implementation use two heuristics. First, heuristic H1 favors FUs that cover the maximum number of remaining operation groups out of any remaining clique. The second heuristic H2 selects the FU that is of minimum area. Other heuristics may be used to optimize timing, power consumption, routability, geometry (for hard macros), etc.

The rest of the algorithm selects a set of FUs to be instantiated in the datapath, one by one, by looking at the requirements of the operation group cliques provided. Once the FU has been selected, it is instantiated in the datapath and the operations that it covers are recorded. Finally, the covered operation groups are eliminated from each of the remaining cliques and the cycle repeats until all cliques are covered and eliminated.

The next step 248 identifies which FUs out of the selected set require a memory port by checking their properties stored in the macrocell database. This step is necessary in order to identify the number of ports required to connect to the memory hierarchy. The memory hierarchy refers to the processor's memory design. The memory hierarchy may include, for example, a level 1 (L1) data cache, a level 2 (L2) data cache and global memory.

5.2 Register File and Interconnect Synthesis

Referring again to FIG. 3, the right side of this diagram illustrates the process of synthesizing the register files and inter-connect topology. Using the architecture specification as input, this process allocates register file ports and builds the interconnect to the functional units. As shown in steps 252 and 254, the datapath synthesizer builds a set of read/write port connection requirements for connecting the functional units to the register files for each type of register file in the VLIW specification, including literal register files (LRFs). The datapath synthesizer extracts these requirements from the format specification of source/sink operands of various operations mapped to the corresponding functional units.

Many of these register file port connections may be shared based upon the mutual exclusion specification of the corresponding operation groups. As an example, assume that we want to build read/write port requirements for a machine specified by the following description:

```
SECTION Operation_Group {
    OG_alu_0(ops(ADD SUB) format(OF_intarith2));
    OG_alu_1(ops(ADD SUB) format(OF_intarith2));
    OG_move_0(ops(MOVE) format(OF_intarith1));
    OG_move_1(ops(MOVE) format(OF_intarith1));
}
SECTION Exclusion Group {
    EG_0(opgroups(OG_alu_0 OG_move_0)
    EG_1(opgroups(OG_alu_1 OG_move_1)
}
SECTION Register_File {
    gpr(width(32) regs(r0 r1 . . . r31) virtual(I));
    pr(width(1) regs(p0 p1 . . . p15) virtual(P));
    lit(width(16) intrange(−32768 32767) virtual(L));
}
SECTION Field_Type {
    FT_I (regfile (gpr));
    FT_P) regfile (pr));
    FT_L (regfile (lit));
    FT_IL(compatible_with(FT_I FT_L));
}
SECTION Operation_Format {
    OF_intarith1(pred(FT_P) src(FT_I) dest (FT_I));
    OF_intarith2(pred(FT_P) src(FT_IL FT_I) dest(FT_I));
}
```

In this example, there are four operation groups that require two operation formats: OF_intarith1, and OF_intarith2. The Operation_Format section provides the register file port requests for each of these operation formats. First, the datapath synthesizer translates operation group port requests to FU port requests based on the mapping of operation groups to FU instances decided earlier.

There are alternative ways to map operation group port requests to FU port requests. One approach is to map all opgroup port requests to corresponding FU port requests and then have one RF port request per FU port request. In an alternative approach, each opgroup occurrence is mapped to its own RF port request. In this case, the datapath synthesizer applies affinity allocation of RF port requests to FU port requests. Affinity allocation is described further below.

Next, the datapath synthesizer builds a conflict graph where the nodes are the resource requests (e.g., register file port requests) and the edges in the graph are conflict relationships among the requests. In the implementation, the datapath synthesizer builds a concurrency matrix between each of the FU port requests, while taking into account the exclusion relationships among the operation groups. The rows and columns of the concurrency matrix correspond to the port requests, and each element in the matrix corresponds to a pair of port requests. At each element, the matrix stores a binary value reflecting whether or not there is a resource conflict between the pair of port requests.

The next step is to allocate the read and write ports as shown in steps 256 and 258. To allocate these ports, the datapath synthesizer executes a resource allocation algorithm. In particular, the resource allocation algorithm in the current implementation uses a technique based on graph coloring to allocate the minimum number of read/write ports for each register file that will satisfy all connection requests.

Pseudo code for this resource allocation algorithm is listed below.

```
ResourceAlloc (nodeRequests, conflictGraph)
    // compute resource request for each node + neighbors
    foreach (node ∈ conflictGraph) do
        Mark(node) = FALSE;
        TotalRequest (node) = Request(node) +
        Request (NeighborsOf(node));
        AllocatedRes(node) = empty
    endforeach
    // sort nodes by increasing remaining total resource request
    // compute upper-bound on resources needed by allocation
    resNeeded = 0; Stack = EMPTY;
    for (k from 0 to NumNodes(conflictGraph)) do
        find (minNode ∈ unmarked nodes) such that
        TotalRequest(minNode) is minimum;
        Mark(minNode) = TRUE;
        push (minNode, Stack);
        resNeeded = max(resNeeded, TotalRequest(minNode));
        foreach (nhbr ∈ NeighborsOf(minNode)) do
            TotalRequest (nhbr) -= Request (minNode);
        Endforeach
    endfor
    // process nodes in reverse order (i.e., decreasing total
    request)
    while (Stack is not EMPTY) do
        node = pop(Stack);
        AllResources ={0 . . . resNeeded-1};
        // available resources are those not already allocated to any
        neighbor
        AvailableRes(node) = AllResources -
        AllocatedRes (NeighborsOf(node));
        // select requested number of port requests from available
        ports
        // according to one or several heruristics
        AllocatedRes(node) = Choose Request(node) resources from
        AvailableRes (node)
        ☒  H1: Contiguous Allocation
        ☒  H2: Affinity Allocation
    end
    return resNeeded;
```

The allocation heuristic is a variant of Chaitin's graph coloring register allocation heuristic. See, Chaitin, G., J., *Register Allocation & Spilling Via Graph Coloring*, ACM 1982. Chaitin made the following observation. Suppose G is a conflict graph to be colored using k colors. Let n be any node in G having fewer than k neighbors, and let G' be the graph formed from G by removing node n. Now suppose there is a valid k-coloring of G'. This coloring can be extended to form a valid k-coloring of G by simply assigning to n one of the k colors not used by any neighbor of n; an unused color is guaranteed to exist since n has fewer than k neighbors. Stated another way, a node and its w neighbors can be colored with w+1 or fewer colors.

In the current implementation, each FU port is viewed as an independent resource requestor, requesting a single resource, namely, a register file data port. In an alternative implementation, each FU could request multiple ports for a given register file that correspond to the various operation groups mapped to that FU. In that case, these multiple requests would be defined to have affinity between them to allow them to be preferably allocated to the same register file port. This would reduce the interconnect needed to connect the FU port to the RF ports.

In the above pseudocode, the total resource request for a node and its neighbors is computed by the first loop. The heuristic repeatedly reduces the graph by eliminating the node with the current lowest total resource request (node plus remaining neighbors). At each reduction step, we keep track of the worst-case resource limit needed to extend the coloring. If the minimum total resources required exceeds the current value of k, we increase k so that the reduction process can continue. The graph reduction is performed by the second loop. Nodes are pushed onto a stack as they are removed from the graph. Once the graph is reduced to a single node, we begin allocating register ports (resources) to nodes. Nodes are processed in stack order, i.e. reverse reduction order. At each step, a node is popped from the stack and added to the current conflict graph so that it conflicts with any neighbor from the original graph that is present in the current conflict graph. The existing allocation is extended by assigning register ports to satisfy the current node's request, using register ports disjoint from ports assigned to the current node's neighbors. This process is shown in the third loop.

One heuristic used in the implementation favors 'contiguous allocation'. This heuristic simplifies interconnect layout by allocating register ports to contiguous positions. Another heuristic is 'affinity allocation'. The affinity allocation attempts to assign port requests to the same register port coming from same FU port for different operation groups.

The following heuristics pseudo code illustrates affinity allocation. Each node has a set of affinity siblings. The implementation attempts to assign the same port to affinity siblings as follows:

```
if node is tentatively allocated then
    make tentative allocation permanent, if possible
if node is (still) not allocated then
    try to use a sibling allocation
if node is (still) not allocated then {
    allocate contiguously,
    for each sibling of node {
        if sibling is allocated then
            try to use node's allocation in place of existing allocation
        else
            tentatively allocate sibling, using node's allocation
    } // for
}
```

After allocating the register file ports, the datapath synthesizer builds the register files by selecting appropriate register file macrocells from the macrocell database 244 to satisfy the read/write port allocation. The synthesizer selects from a macrocell database individual register file instances (general purpose register files, predicate register files, etc.) each with a number of ports which correspond to the read/write port allocation to build the register file(s) of the machine. It then stores the resultant register file instances as a set of classes in the processor description 232.

As shown in step 262, the datapath synthesizer records the register file to functional unit port allocation as an internal data structure 266. Next, the datapath synthesizer builds the interconnect as shown in step 264. In building the interconnect, the synthesizer selects macrocell instances of wires, buses, muxes, tri-states, etc., so as to satisfy the register file to functional unit port allocation.

Figure 5:
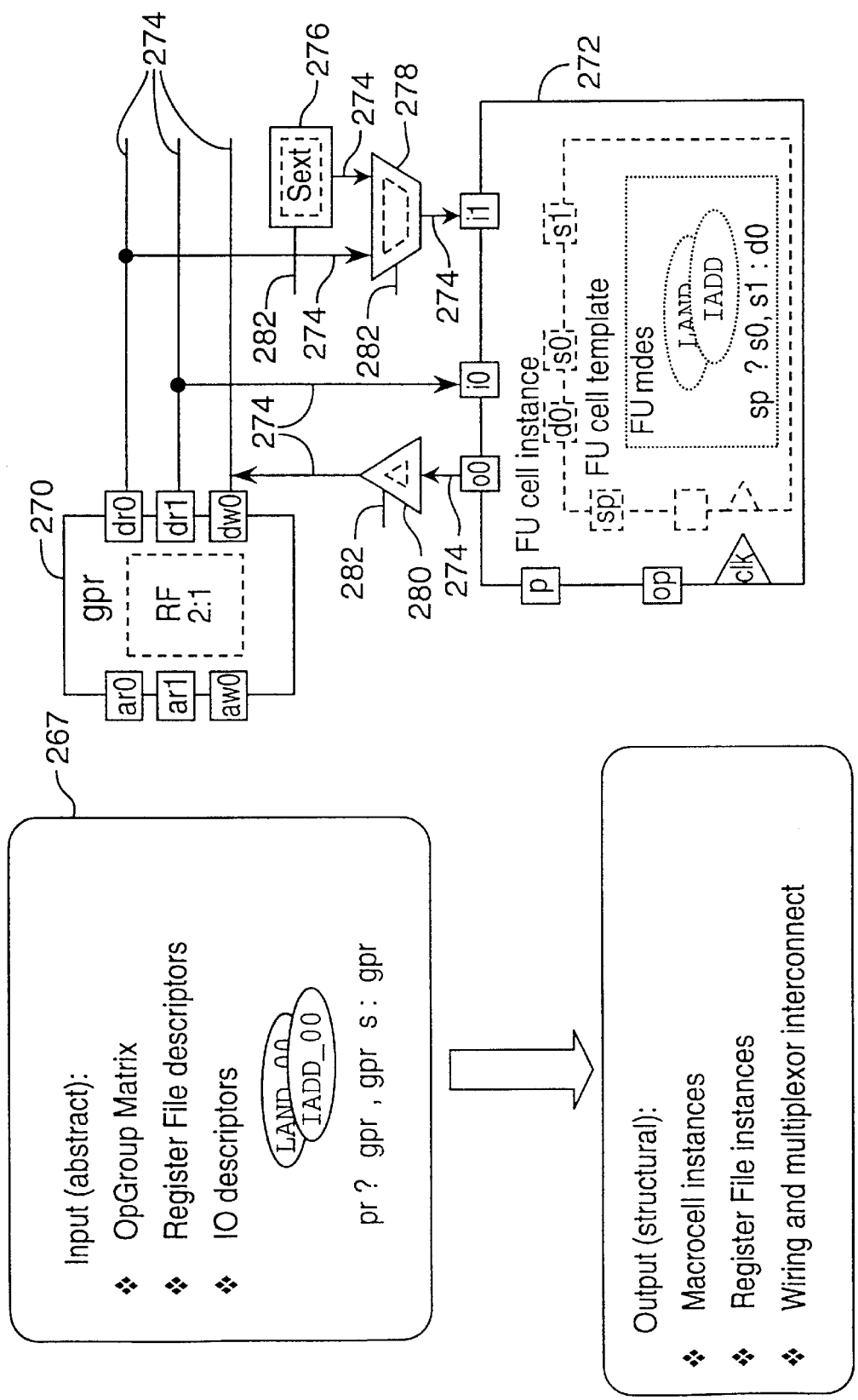
FIG. 5 graphically depicts an input specification and its corresponding datapath design to illustrate that the datapath synthesis process produces a structural description of the datapath from a specification of its operations and the desired instruction level parallelism among them.

The VLIW datapath processing produces a set of C++ classes of functional unit macrocell instances, register file macrocell instances, and interconnect component instances, e.g., wires, muxes, tri-state buffers, etc. FIG. 5 shows an example of the output graphically depicting the datapath synthesis process. In this example, the abstract input 267 specifies operation groups LAND_00 and IADD_00. The "pr ? gpr, gpr s : gpr" entry is the operation format for the two operation groups.

General purpose register (gpr) 270 has three control address line inputs ar0, ar1, and aw0, two data inputs dr0 and dr1, and one data output dw0. The gpr provides input to and receives output from a functional unit 272 through interconnects 274 and periphery circuitry, including sign-extend literal 276, multiplexor 278, and tri-state buffer 280. The control inputs 282, which are undefined at this point, control these components. The functional unit 272 comprises a functional unit cell instance, such as an ALU, selected from a standard or user-specified macrocell database.

While FIG. 5 shows instances of only a single register file (gpr) and functional unit cell instance, the actual output of the datapath extraction will typically comprise a variety of register files and FU cell instances.

5.3 Extraction of an Abstract ISA Spec from a Datapath Spec

As shown in FIG. 1, the system may extract the abstract ISA spec from a datapath specification. This enables the system to perform a variety of design scenarios that are based on the abstract ISA specification, or a combination of the abstract ISA specification and the datapath specification. For example, the system can proceed to generate the VLIW processor's instruction format, extract its MDES, build its control path, and select custom templates after extracting the abstract ISA specification.

Given a VLIW datapath specification, this step extracts the information corresponding to an Abstract ISA Specification. The register file macrocells from the datapath specification directly provide the register file specification for the Abstract ISA Specification. The set of opcodes that can be executed by each Functional Unit (FU) macrocell define the Operation Groups. The I/O Formats for the opcodes are determined by examining the FU macrocells' connectivity to the Register File (RF) macrocells. The ILP constraints, and in particular, the mutual exclusions between the Operation Groups, are calculated by analyzing the sharing of RF ports by the FU macrocells. At this point, all of the information needed by the Abstract ISA Specification is present.

6.0 MDES Extraction

The MDES extractor programmatically generates a description of a processor suitable for re-targeting a compiler. This description includes the operation repertoire of the target machine, the input/output storage resources where the operands of each operation reside, sharing constraints among hardware resources used during execution of an operation such as register file ports and buses and their timing relationships that are expressed as a reservation pattern.

Figure 6:
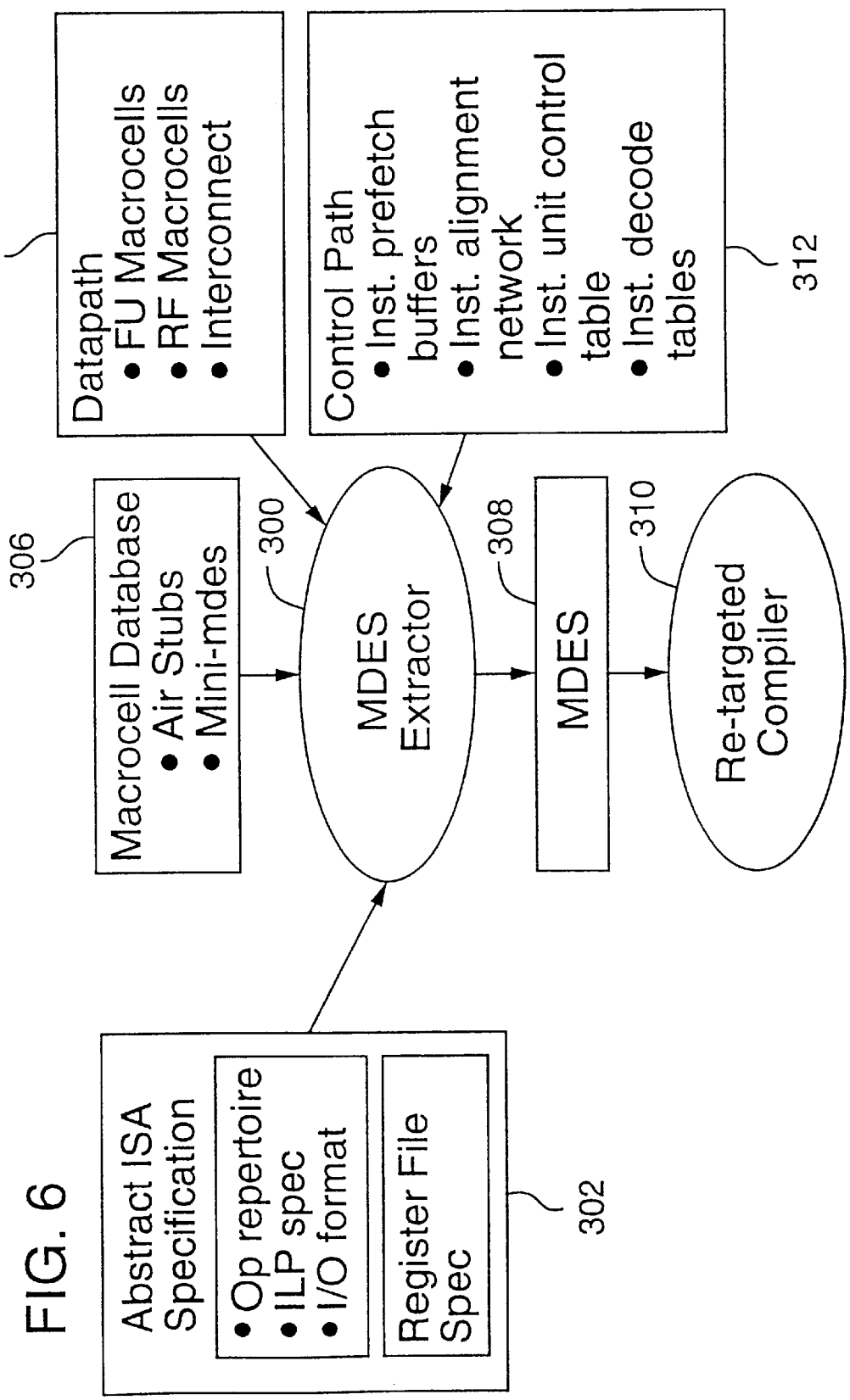
FIG. 6 illustrates an MDES extractor module that extracts a machine description for re-targeting a compiler from an abstract ISA specification and structural datapath specification of a processor.

FIG. 6 illustrates an MDES extractor module that programmatically extracts a machine description for re-targeting a compiler. In the process of extracting an MDES, the extractor 300 may obtain information from an abstract ISA specification 302, a structural datapath specification of a processor 304, and a macrocell database 306. The abstract ISA specification provides the operation repertoire of the target machine, an ILP specification, the I/O format of the operations in the repertoire, and a register file specification. The ILP specification identifies the ILP constraints among the operations in terms of concurrency and/or exclusion sets.

The extractor 300 creates a machine description 308 of a target processor from the structural description of the processor's datapath provided in the datapath specification 304. In the current implementation, the MDES is in the form of a database language called HMDES Version 2 that organizes information into a set of interrelated tables called sections containing rows of records called entries, each of which contain zero or more columns of property values called fields. For more information on this language, see John C. Gyllenhaal, Wen-mei W. Hwu, and B. Ramakrishna Rau. HMDES version 2.0 specification. Technical Report IMPACT-96-3, University of Illinois at Urbana-Champaign, 1996.

The MDES 308 provides information to re-target a compiler 310 to a target processor. The form of HMDES enables the use of a "table driven" compiler that has no detailed assumptions about the structure of the processor built into its program code. Instead, it makes queries to a machine description database containing the MDES of the target processor. For more information about the re-targetable compiler and MDES, see Bantwal Ramakrishna Rau, Vinod Kathail, and Shail Aditya. Machine-description driven compilers for EPIC processors. Technical Report HPL-98-40, Hewlett-Packard Laboratories, September 1998; and Shail Aditya, Vinod Kathail, and Bantwal Ramakrishna Rau. Elcor's Machine Description System: Version 3.0. Technical Report HPL-98-128, Hewlett-Packard Laboratories, October, 1998, which are hereby incorporated by reference.

The datapath specification may be specified manually. However, in the current implementation, the extractor 300 is part of an automated design system that programmatically generates the datapath specification from the abstract ISA specification. The datapath design process uses a textual version of the abstract ISA called the ArchSpec to generate a structural description of the datapath using hardware components from the macrocell database 306. The macrocells are in AIR format and point to actual HDL descriptions. In addition, each macrocell has a corresponding MDES information, referred to as a mini-MDES. The mini-MDES provides the operation repertoire of each macrocell, its latency, internal resource constraints and input/output port usage.

The extractor 300 synthesizes the overall MDES of the target processor by combining the mini-MDES information from each of the functional units during a structural traversal of the datapath specification 304.

For each functional unit macrocell, its mini-MDES from the database is instantiated and added to the target MDES. The actual input/output connectivity of each operation present in the mini-MDES is determined by structurally traversing the corresponding input/output ports of the macrocell until a register file port or a literal port is encountered. For each multiplexor output feeding into an input port of a functional unit, all its input signals are explored as alternatives, and vice versa for the output ports. All shared resources, such as register file ports, that are encountered during the traversal are identified and added as additional columns to the reservation table of the operation with an appropriate time of use. The time of use is determined by taking into account the latency of the operation that is provided in the operation's mini-MDES and any pipeline latches encountered during the structural traversal. In this manner the composite reservation pattern of each alternative of the operation is built by combining information from the mini-MDES and the structural connectivity of the target machine. Finally, additional resource parameters, such as the number of registers in the register files, their widths and presence of speculation tag bits etc. is also recorded in the overall MDES by examining the appropriate components of the target architecture. This completes the target MDES synthesis which can then be used to drive the compiler.

The extractor may also augment the MDES with operation issue conflicts stemming from the instruction format by traversing a structural description of the control path 312.

6.1 Structure of the MDES

Figure 7:
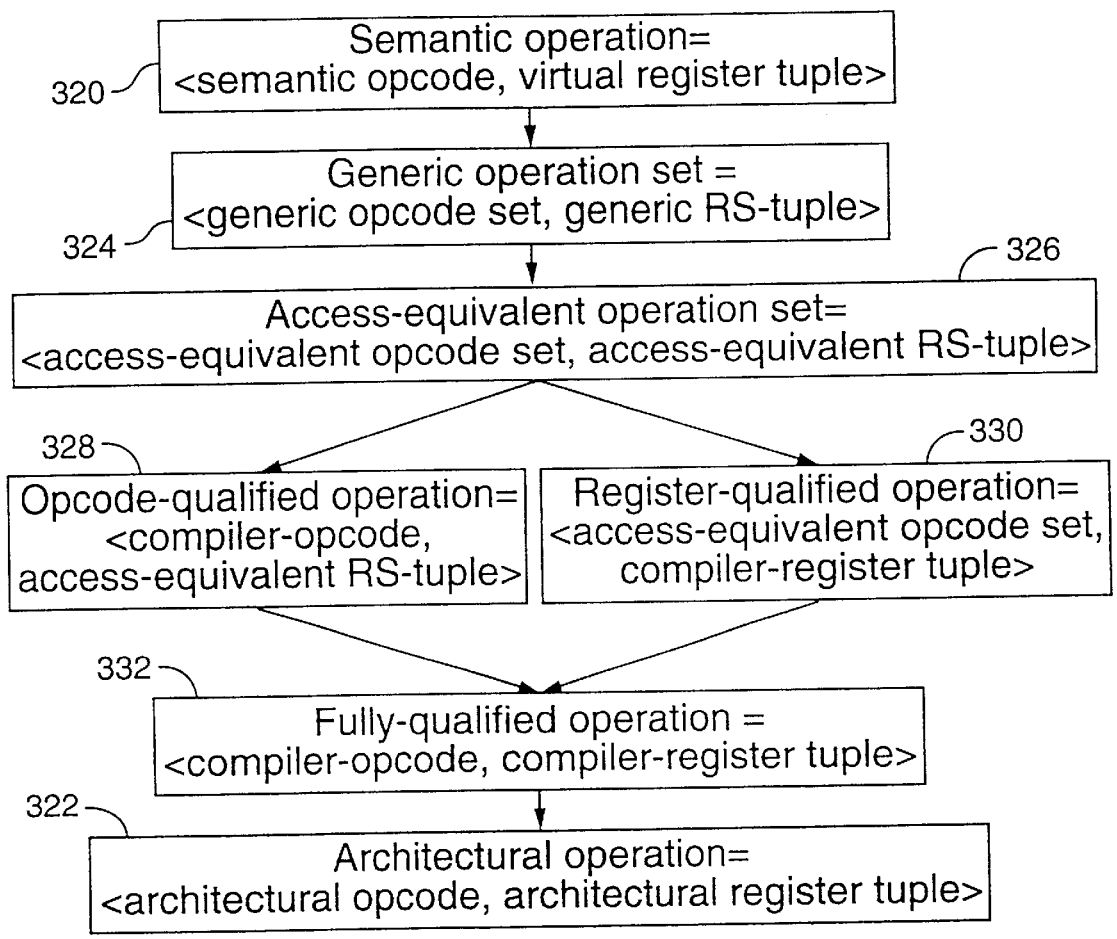
FIG. 7 illustrates an operation hierarchy data structure that a re-targetable compiler uses to bind operations within a program from the semantic level to the architectural level.

In the current implementation, the MDES includes the following information:

Operation Hierarchy—As shown in FIG. 7, the operations visible to the compiler are organized in a hierarchy starting from the semantic operations (320) (present in the program)

consisting of semantic opcodes and virtual registers, down to the architectural operations (322) (implemented by the target machine) consisting of architectural opcodes and physical registers. The intermediate levels include generic operations (324), access-equivalent operations (326), opcode-qualified operations (328), register-qualified operations (330), and fully-qualified operations (332) that are organized in a partial lattice called the Operation Binding Lattice. This hierarchy abstracts the structural aspects of the machine and allows the compiler to successively refine the binding of operations within the program from the semantic level to the architectural level making choices at each level that are legal with respect to the target machine. The terms used in the operation hierarchy are defined as follows:

Architectural Operations—Architectural operations are commands performed by the target processor.

Semantic Operations—Semantic operations are operations present in the source program each with a predefined meaning (e.g., ADD performs the signed binary add operation).

Architectural Registers—Architectural registers are either literals or registers in the target processor.

Virtual Registers—A virtual register is a machine independent representation of a variable present in the source program.

Compiler-Registers—A compiler register is either a single architectural register or a set of architectural registers, with a fixed spatial relationship, that are viewed as a single entity by the compiler.

Generic Register Sets—A generic register set is a maximal set of compiler-registers that have the same storage attributes.

Access Equivalent register sets—In general, the phrase "access equivalent" refers to a set of processor resources that are equivalent with respect to their structural accessibility. Informally, registers are "access equivalent" if they have similar resource usage patterns, latency, and instruction format constraints. To describe how this concept is specifically used in our MDES, it is necessary to explain a few other terms. An "alternative" in this context refers to a triple consisting of a "compiler opcode" (see below), a "latency descriptor" (see below) and a "reservation table" (see below) that are jointly valid for a target processor. A "register set tuple" (RS tuple) is a tuple of register sets, such that each register set is a subset of a single generic register set (i.e. all the registers have the same storage attributes). An "access-equivalent RS tuple" corresponding to a given alternative is a maximal RS tuple, where each register set corresponds to one of the operands of the compiler opcode and every register tuple in the Cartesion product of the register sets is jointly valid with that alternative, taking into account both the connectivity constraints of the processor as well as the instruction format constraints. Each register set in the access-equivalent RS tuple is an "access equivalent register set."

For every choice of the register tuple in the access equivalent RS tuple, along with the compiler opcode of the alternative, the resulting operation has the same latency descriptor and the same resource reservation table, since all of the register tuples are accessible with the same alternative. Consequently, each access equivalent register set contains registers that are interchangeable with respect to that opcode after scheduling has taken place; any register can be used in place of any other without any impact on the correctness of a scheduled piece of code. Also, since all register tuples implied by an access equivalent-tuple are architecturally valid, the compiler register for each operand can be independently selected by a register allocator in the compiler.

Compiler Opcodes—A compiler opcode is an abstraction over architectural opcodes, and is implemented by one or more architectural opcodes. This abstraction provides a more convenient way of representing an operation in the compiler. For example, a register-to-register copy may be implemented in the machine by either adding zero or multiplying by one. It is more convenient to represent this copy operation in the compiler as a single compiler opcode, rather than the specific architectural opcode or a set of opcodes that implement it in the target processor.

Generic Opcode Set—A generic opcode set is the maximal set of compiler opcodes that implement the same function, e.g., integer add.

Access Equivalent Opcode Set—An access equivalent opcode set is the maximal set of compiler-opcodes that are part of the same generic opcode set (i.e. implement the same function) and for each of which there is an alternative that yields the same access equivalent RS-tuple.

Operation Descriptors—Operations at each level of the hierarchy are characterized by several properties that are also recorded within the MDES. These include the following.

Operation Formats—Along with each operation, the MDES records the sets of registers and literals that can source or sink its various input or output operands respectively. A tuple of such sets, one for each operand, is called the operation format. The size of these sets becomes larger as we climb the operation hierarchy, ranging from the exact set of registers accessible from each macrocell port implementing an operation at the architectural level to a set of virtual registers containing all architectural registers at the semantic level.

Latency Descriptors—Each input and output operand of an operation specifies a set of latencies associated with its sample and production times respectively relative to the issue time of the operation. In addition, a few other latencies may be recorded based on the semantics of the operation (e.g., branch latency, or memory latency). These latencies are used during operation scheduling to avoid various kinds of timing hazards.

Resources and Reservation Tables—The various macrocells present in the datapath, the register file ports, and the interconnect between them are hardware resources that various operations share during execution. Other shared resources may include operation issue slots within the instruction register, pipeline stages or output ports within the macrocells. Each operation within the MDES carries a table of resources, called a reservation table, that records the resources it needs at the appropriate cycle times. This table is used during operation scheduling to avoid structural hazards due to sharing of resources.

Opcode Descriptors—The structural and semantic properties of opcodes at each level of the hierarchy are also kept within the MDES. These properties include the number of input and output operands, whether or not the opcode can be speculated and/or predicated, whether or not it is associative, commutative etc.

Register Descriptors—Similarly, several properties of registers and register files are recorded at each level of the operation hierarchy including the bit-width, whether or not speculative execution is supported, whether the register (or register file) is static, rotating, has literals etc.

6.2 Phases of the Re-Targetable Compiler

Before describing MDES extraction in more detail, it is helpful to begin by explaining the compiler's view of the target processor. The compiler needs to know, for each opcode, which registers can be accessed as each of its source and destination operands. Additionally for an EPIC processor, the compiler needs to know the relevant operand latencies and the resource usage of these operations. With the compiler's needs in mind, the MDES serves the following two needs: 1) To assist in the process of binding the operations and variables of the source program to machine operations by presenting an abstract view of the underlying machine connectivity, and 2) to provide the information associated with each operation needed by the various phases of the compiler.

The re-targetable compiler maps the source program's operations to the processor's architectural operations.

The re-targetable compiler used with the current implementation of the MDES extractor performs this mapping in the following phases:

1. code selection;
2. pre-pass operation binding;
3. scheduling;
4. register allocation and spill code insertion;
5. post pass scheduling; and
6 code emission.

Each phase successively refines and narrows down the options available for either opcodes, registers, or both, finally yielding architectural operations that can be executed by the processor. These options are represented in a hierarchical data structure called the operation binding lattice shown in FIG. 2. Note that semantic and architectural operations (320, 322) are shown in the figure, but they are not part of the lattice. They are used to show "implementation relationships"; semantic operations (320) are implemented by generic operation sets (324) and architectural operations implement fully-qualified operations (332).

The following sections describe how the re-targetable compiler uses the MDES to map semantic operations to architectural operations.

Code Selection—The code selection phase maps semantic operations (320) to generic operation sets (324), i.e., it maps semantic opcodes and virtual registers to generic opcode sets and generic register sets, respectively. Note that the mapping from semantic opcodes to generic opcodes is not, in general, one-to-one.

Pre-Pass Operation Binding—At this point, the generic operation sets (324) may contain multiple access-equivalent operation sets (326), each consisting of an access-equivalent opcode set along with its access-equivalent RS-tuple. Such operations need to be further bound down to a single access-equivalent operation set. This is done by the pre-pass operation binding phase. The constraint that must be satisfied is that each operation in the computation graph has to be annotated with an access equivalent operation set in such a way that, for every variable, the intersection of the access-equivalent register sets imposed upon it by all of the operations that access it, called its access-equivalent register option set, must be non-empty.

Scheduling—The scheduling phase is one of the main phases of an EPIC code generator. For each operation, the scheduler decides the time at which the operation is to be initiated. It also determines which compiler-opcode is to be used as well as the reservation table and latency descriptor that are used by the operation, i.e., it picks a specific alternative. In the case of statically scheduled EPIC machines, the scheduling phase refines access-equivalent operation sets (326) to opcode-qualified operation sets (328), i.e., operations in which the possible alternatives have been narrowed down to a particular one, as a consequence of which the opcode options have been narrowed down to a single compiler-opcode, but the register options are unchanged.

Register Allocation—The register allocation phase assigns a specific compiler-register to each of the virtual registers in the computation graph by selecting one of the compiler registers from the corresponding access-equivalent register set. This yields fully-qualified operations (332), i.e., a specific alternative and a specific compiler-register tuple.

The register allocation phase may introduce additional code to spill registers to memory. The spill code is fully-bound as far as the registers are concerned, but it has not been scheduled. Thus, after this phase, the program contains two types of operations. First, it contains operations that have been narrowed down to fully-qualified operations (332). Second, it contains spill operations whose operands are fully bound to compiler-register tuples, but whose opcodes are still at the level of access-equivalent opcode sets. We call such operations register-qualified operation sets (330).

Post-Pass Scheduling—A second pass of scheduling, called post-pass scheduling, is used to schedule the spill code introduced by the register allocator. This phase has a choice for the scheduling of fully-qualified operations (332): it can either keep the opcode bindings selected by the earlier scheduling phase or it can start afresh by reverting all compiler-opcodes back to their original access-equivalent opcode sets thereby converting them to register-qualified operations (330). The latter strategy gives more freedom to the scheduler in accommodating the spill code and yields better schedules. Post-pass scheduling deals with code containing virtual registers that are fully bound to compiler-registers. It is greatly constrained, therefore, by a host of anti- and output dependences. However, since the register assignments were made subsequent to the main scheduling phase, they are already sensitive to achieving a good schedule.

Code Emission—The final phase is the code-emission phase. This phase converts fully-qualified operations to architectural operations. This is a bookkeeping step and no decisions are made by this phase.

6.3 Extracting the MDES 6.3.1 Mini-MDES Components

In order to facilitate MDES extraction directly from the datapath components, each macrocell in the macrocell database carries a mini-MDES which records the MDES-related properties shown above for the architectural opcodes that it implements. The mini-MDES is organized just as described above except that it contains only one level of the operation hierarchy, the architectural level, and that there are no registers and register descriptors. Instead, the operation format of an architectural operation is described in terms of the input/output ports of the macrocell used by each of its operands.

For each operand of a given operation, the mini-MDES also records the internal latency through the macrocell. If the macrocell is a hard macro, the latency may be accurately modeled as absolute time delay (nanoseconds), or in case of soft macros, approximately as the number of clock cycles relative to the start of the execution of the operation.

For each operation, the mini-MDES records any shared internal resources (e.g., output ports, internal buses) and their time of use relative to the start of the execution in an internal reservation table. This table helps in modeling internal resource conflicts and timing hazards between operations. For example, if a macrocell supports multiple operations with different output latencies that are channeled through the same output port, there may be an output port conflict between such operations issued successively to this macrocell. Recording the usage of the output port at the appropriate time for each operation allows the compiler to separate such operations sufficiently in time so as to avoid the port conflict.

Finally, the mini-MDES of a macrocell also reflects whether the macrocell implements speculative and/or predicated execution capability by incorporating such opcodes within itself. The macrocell selection process may choose macrocells based on the presence or absence of such capabilities. Note that a macrocell supporting speculative execution and/or predicated execution may be used in place of one that does not, but its cost may be somewhat higher.

6.3.2 Extracting Global MDES from the Datapath

The MDES extractor extracts a compiler-centric machine description from the datapath of the machine. It collects the information contained in the mini-MDESes of the various functional unit macrocells and the MDES-related properties of the register files present in the datapath into a single global MDES. It then augments the extracted MDES with the topological constraints of the datapath such as connectivity to shared buses and register file ports. A pseudocode listing illustrating the implementation of the process of extracting the MDES from the datapath is provided below.

---
Procedure ExtractMdes (Datapath dpath)
---
```
1:  Mdes globalMdes = nullMdes;
2:  for (component ∈ dpath) do
3:    if (component is a FU macrocell) then
4:      PortAltMap altMap = nullMap;
5:      Mdes miniMdes = conponent.MiniMdes ( );
6:      //accumulate the mini-Mdes operations into the global mdes
7:      for (operation ∈ miniMdes) do
8:        CompilerOpcode opcode = a copy of operation.opcode( );
9:        globalMdes.InstallOpcode(opcode);
10:       for (each input/output operand of operation) do
11:         OperandAlts opdAlts = nullList;
12:         ReservationTable opdResv = nullTable;
13:         OperandLatency lat =
              a copy of operation.OpdLatency(operand);
14:         McellPort port = operation.OperandToMcellPort(operand);
15:         //accumulate mdes properties by traversing
              the datapathfrom this port
16:         if (this port has not been traversed before) then
17:           TraversePort(port, lat, opdResv, opdAlts);
18:           // save operand alternatives for this port
19:           altMap.bind(port, opdAlts);
20:         else
21:           opdAlts = altMap.value(port);
22:         endif
23:         opcode RecordOperandAlternatives (operand. opdAlts);
24:       endfor
25:       //build operation alternatives as a cross product of
            operand alternatives
26:       opcode.BuildOperationAlternatives(operation);
27:     endfor
28:   elseif (component is a register file) then
29:     //accumulate register file properties into the global mdes
30:     globalMdes.InstallRegisterFile(component);
31:   endif
32: endfor
33: //build a hierarchy of operation alternatives for each
      semantic operation
34: BuildOperationHierarchy(globalMdes);
35: return globalMdes;
```

Figure 8:
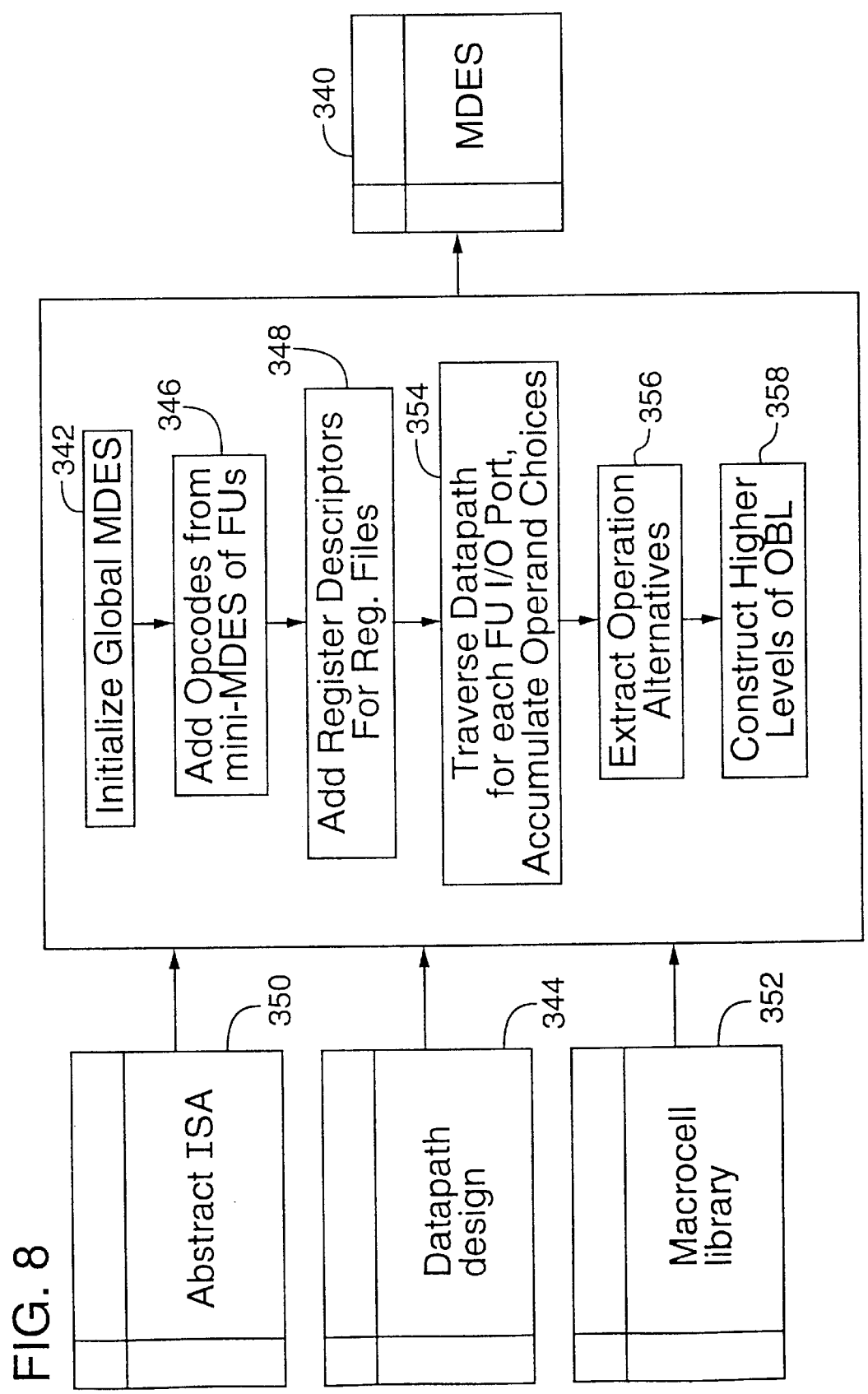
FIG. 8 is flow diagram illustrating the operation of an MDES extractor.

The extraction process starts by initializing the global MDES of the machine to an empty MDES (line 1, FIG. 8, 340). Then, for each component of the datapath (344) that is a functional unit macrocell, the extractor installs its mini-MDES architectural opcodes as compiler opcodes within the global MDES to form the lowest level of the opcode hierarchy (line 9, FIG. 8, 346). Various semantic and structural properties of the opcode including semantic opcode name, commutativity, associativity, number of input and output operands, bit encoding are also copied into the corresponding opcode descriptor.

Likewise, for register file components of the datapath, the extractor installs the various architectural registers as compiler registers into the global MDES to form the lowest level of the register hierarchy along with a register descriptor (line 30, FIG. 8, 348) that records the structural properties of the register file. Most of these properties are determined either from the type of the hardware component used (e.g., whether or not speculative execution and/or rotating registers are supported), or from its structural instance parameters (e.g., the number and bit-width of static and rotating registers). A few remaining properties are carried forward from the archspec (e.g., the virtual file type).

The MDES-related details of the operations implemented by a functional unit macrocell are collected as follows. For each input or output operand of a machine operation, the extractor collects a set of "operand alternatives". This set is obtained by first mapping the operand to its corresponding macrocell port at which it is received or produced (method call OperandToMcellPort at line 14), and then traversing the datapath components connected to that port (procedure call TraversePort at line 17). Operands mapped to the same port share the same alternatives and hence datapath traversal needs to be performed only once per port. The details of this traversal and the generated operand alternatives are provided later.

The sets of operand alternatives so obtained are then combined into "operation alternatives" (method call BuildOperationAlternatives at line 26) (FIG. 8, 356). This is done by taking each tuple in the Cartesian product of the sets of operand alternatives for the given operation and combining its operand properties to form operation properties. The operand field types are concatenated to form an operation format, individual operand latencies are collected to form the complete operation latency descriptor, and the operand reservation tables are unioned together with the internal reservation table of the operation into an overall reservation table for that operation alternative. As described below, the field types of the various operand alternatives partition the compiler registers of the machine into access-equivalent register sets. Therefore, the operation alternatives formed above correspond to an opcode-qualified compiler operation consisting of a compiler opcode and a set of access-equivalent register-set tuples. All such distinct operation alternatives are installed into the global MDES as alternatives for the given compiler opcode.

---
Procedure TraversePort (McellPort thisport, OperandLatency lat, ReservationTable resv, OperandAlts opdAlts)
---
```
1:  //Assume one-to-one connections among ports
2:  if (thisport is INPUT port) then
3:    case (predecessor component connected to thisport) of
4:    multiplexor: //accumulate all field type choices
5:      for (each inputport of the multiplexor) do
6:        TraversePort(inputport, lat, resv, opdAlts);
7:      endfor
8:
9:    e-multiplexor: //add a resource column to reservation table
10:     Resource res = Resource(inputport of the de-multiplexor);
11:     ReservationTable resv' = resv.AddColumn (res,lat);
12:     TraversePort(inputport, lat, resv', opdAlts);
13:
14:   pipeline latch: // add one to latency
15:     Identify inputport of the latch;
16:     ReservationTable resv' = resv.AddRow(lat);
```

-continued

Procedure TraversePort (McellPort thisport, OperandLatency lat,
ReservationTable resv, OperandAlts opdAlts)

```
17:     OperandLatency lat' = lat.AddLatency(1);
18:     TraversePort(inputport, lat', resv, opdAlts);
19:
20: register/literal file: // base case
21:     FieldType ftype = FieldType(file.Registers( ));
22:     Resource res = Resource(outputport of the register file);
23:     ReservationTable resv' = resv.AddColumn(res, lat);
24:     opdAlts.addAlt(ftype, lat, resv');
25: endcase
26: else //thisport is OUTPUT port (symmtric case)
27: ...
28: endif
```

6.4 Datapath traversal

An important aspect of the above MDES extraction scheme is the datapath traversal routine TraversePort shown in pseudocode form above which extracts the operand alternatives associated with a given functional unit macrocell port. We only show the input port traversal since it is symmetric for output ports. For simplicity, we also assume that only one-to-one connections exist between the input and output ports of various datapath components, i.e., multiple sources to an input port are connected via a multiplexor, and multiple sinks from an output port are connected via a de-multiplexor. It is straightforward to extend this to many-to-many connections by treating such connections as multiple sources multiplexed onto a bus that are de-multiplexed to the various sinks.

Each operand alternative is a triple consisting of the following information that characterize the macrocell port and the hardware structures surrounding it:

1. The field type of the operand, which describes a set of compiler registers that are the potential sources of the operand and that are equally accessible from the input port.
2. The operand latency descriptor, which contains the earliest and latest sampling latencies of the operand with respect to the issue time of the operation. This may be different for different sources reaching this port or even for the same sources reachable via different paths.
3. The operand reservation table, which identifies any shared resources used for accessing this operand (e.g., buses and register file ports) and their time of use relative to the issue time of the operation.

The strategy for collecting the operand alternatives for a given macrocell port is as follows. The operand latency of the various alternatives is initialized using the macrocell mini-mdes and their reservation table is set to empty. Starting from the macrocell port, the extractor then traverses the various datapath components connected to it in a depth-first traversal until an operand source such as a register file or literal instruction field is reached. As hardware components such as multiplexors, de-multipelxors, pipeline latches and registers files are encountered during the traversal, their effect is accumulated into the operand latency and the reservation table as described below.

A multiplexor (line 4) at the input port serves to bring various sources of this operand to this port and therefore represents alternate field types and latency paths leading to different operation alternatives. The MDES extractor performs a recursive traversal for each of the inputs of the multiplexor.

The effect of a demultiplexor (line 9) at the input is to distribute data from a shared point (such as a shared input bus) to various macrocell ports. This is modeled by introducing a new resource column in the reservation table corresponding to this shared data source. A check is placed at the current latency row to show that this new resource is used at that latency. The input of the demultiplexor is followed recursively.

A pipeline latch (line 14) encountered during the traversal adds to the sampling latency of the operand as well as affects the operation reservation table by adding a new row at the beginning. The input of the latch is recursively traversed to identify the source of the operand.

Finally, a register file port or a literal instruction field (line 20) is the point where the recursion terminates. All the registers (literals) accessible via the register file port (literal field) form an access equivalent register set and become part of the field type of the operand. The register file port (literal field) itself is recorded as a shared resource being accessed at the current latency by adding a resource column to the current reservation table. The triple consisting of the field type, the operand latency, and the reservation table is accumulated into the list of operand alternatives for this macrocell port.

6.5 Building Operation Hierarchy

The final step in the MDES extraction process is to complete the higher levels of the opcode, register and operation hierarchy within the global MDES (procedure call BuildOperationHierarchy at line 34 of the ExtractMDES pseudocode). This process constructs the higher levels of the operation binding lattice (OBL)(FIG. 8, 358).

The process of constructing operand alternatives shown above already identifies the compiler registers, and the access-equivalent register sets. In order to complete the register hierarchy, all distinct access-equivalent register sets implementing a particular data type (e.g., floating point, integer, and boolean) are collected to form a generic register set which implements the semantic notion of a virtual register in the program.

Next, the corresponding levels in the opcode hierarchy are constructed using the register hierarchy. First, all compiler opcodes implementing the same semantic opcode (as identified by its opcode property) are collected into a generic opcode set which forms the top layer of the opcode hierarchy. Any operation alternative pointed to by a compiler opcode within this generic opcode set is a valid implementation of the corresponding semantic operation. However, not all such alternatives are equivalent in terms of their operand accessibility. Therefore, the set of operation alternatives pointed to by a generic opcode set is then further partitioned into sets of access-equivalent alternatives that use the same access-equivalent register-set tuples. The compiler opcodes present in each such partition form a distinct access-equivalent opcode set which constitutes the middle layer of the opcode hierarchy.

Finally, the missing layers of the operation hierarchy, i.e., generic operation sets, access-equivalent operation sets, and register-qualified operation sets may be built using the corresponding layers of the opcode and the register hierarchies. In the current implementation, these layers are not directly represented, instead they are implicitly referenced via the opcode hierarchy.

6.6 Extracting MDES from the Abstract ISA

The MDES may also be extracted from the abstract ISA specification provided in the ArchSpec. While the ArchSpec does not provide a structural representation of the datapath, it does provide the opcode repertoire, the I/O format of each opcode, and the ILP constraints among the operations. The ILP constraints can be used to extract abstract resource constraints needed to re-target the compiler. For instance, an exclusion set may be thought of as representing an abstract processor resource shared by each opcode in the exclusion set.

Simple pipelined reservation tables may be constructed for each opcode using such shared abstract resources as if they represented a functional unit instance used at cycle 0. An assumed latency is assigned to each operand of an opcode rather than extracting actual latency information from the mini-MDES of a macrocell.

The MDES extracted in this manner is accurate only with respect to the opcode repertoire, the I/O format and the operation issue constraints imposed by the ArchSpec and may only be used as a functional approximation to the complete MDES extracted from the datapath. In particular, it does not model any structural or timing hazards arising from the physical resources of the machine. This is still useful, for example, in application specific processor design where a quick retargeting of the compiler is needed to arrive at a desired abstract instruction set architecture or customized instruction templates, and the final MDES extraction and compilation may be postponed until after the processor datapath has been designed.

Another possibility is to superimpose the MDES extracted from the ArchSpec and the datapath. In this approach, the MDES is constructed in two phases:

1) Phase one extracts the MDES from the ArchSpec, possibly before the datapath is constructed; 2) Phase two augments the MDES produced in phase one with physical resource conflict constraints obtained from a traversal of the structural datapath representation. This has the advantage of taking the issue-time ILP constraints into account as well as derive the physical resource constraints based on actual latencies obtained from the mini-MDES of the macrocells.

6.7 Extracting MDES from the Control Path

Another way to account for the issue-time ILP constraints is to perform a traversal of the structural control path representation. The control path representation reflects issue time ILP constraints because it is constructed based on the instruction format, which in turn, represents the issue time ILP constraints in the instruction templates. The process of extracting the issue-time ILP constraints from the control path is explained further below.

6.8 MDES Extraction Examples

As described above, the MDES extractor prepares the reservation tables by structurally traversing the datapath to identify both internal and external resource sharing constraints. Another example of such a structural traversal is illustrated with reference to a datapath 450 of FIG. 9. The datapath 450 includes structural descriptions of functional units 472A, 472B, a register file 470, and interconnections between the functional units 472A, 472B and the register file 470, as well as other macrocells. The MDES extractor obtains reservation tables for the functional unit macrocell instances from the macrocell library. The MDES extractor then programmatically synthesizes the latency specification. Connections to/from a given functional unit are determined using the structural description for the processor datapath. The connections of the inputs and the outputs of the functional units are traversed along the buses and wires specified in the datapath until a register file port or literal file port is reached. The connectivity of all the functional units is similarly determined by structurally traversing the wire interconnect toward a register file port or a literal file port.

The two functional units 472A, 472B may share a single register file port directly (such as port dr1), or a single function unit input (such as port i1 of 472A) may obtain its input from both a register file port (such as port d0) and a literal file port using a multiplexor (MUX), as selected with a control input (ctrl) 482*b*. Structural traversal of the functional units proceeds through the MUXes to a register file or literal file represented by a sign-extension unit 476. If a MUX output is directed to an input port of a functional unit, all the inputs to the MUX are considered as alternatives. Conversely, for a DEMUX input from an output port of a functional unit, all the outputs of the DEMUX are considered as alternatives and traversed (not shown).

The datapath 450 illustrates several potential resource conflicts and choices. The data inputs of functional units 472A, 472B are connected to output (read) ports dr0, dr1 and the data output is connected to an input (write) port dw0 of the register file 470 via interconnect buses 474*a*–*c*. The opcode repertoire of functional unit 472A includes opcodes LAND, IADD; input data for these opcodes is supplied at functional unit input ports i0, i1. The port i0 receives data from the port dr1 of the register file 470 via the interconnect bus 474*b*. The port i1 receives input data from either the port dr0 or a literal input from a sign-extend macrocell instance 476 as selected by a control input (ctrl) 482*b* to a MUX 478. The output of the functional unit 472A is driven onto the interconnect bus 474*c* by a tristate buffer 480*a* in response to a control input 482*a*.

The opcode repertoire of the functional unit 472B includes the opcode SQRT, (square root) which receives an input at an input port i0 from the port dr1 of the register file 470. The output of the SQRT opcode is delivered to the input port dw0 of the register 470 file through a tristate buffer 480*b* that is controlled by the control input 482*c*. The functional units 472A, 472B both receive data from the port dr1 of the register file 470 and write data to the port dw0 of the register file 470. Therefore, the functional units 472A, 472B share the ports dr1, dw0. The tristate buffers 480*a*, 480*b* are provided to prevent the functional units 472A, 472B from supplying their outputs to the bus 474*c* simultaneously.

Figure 9:
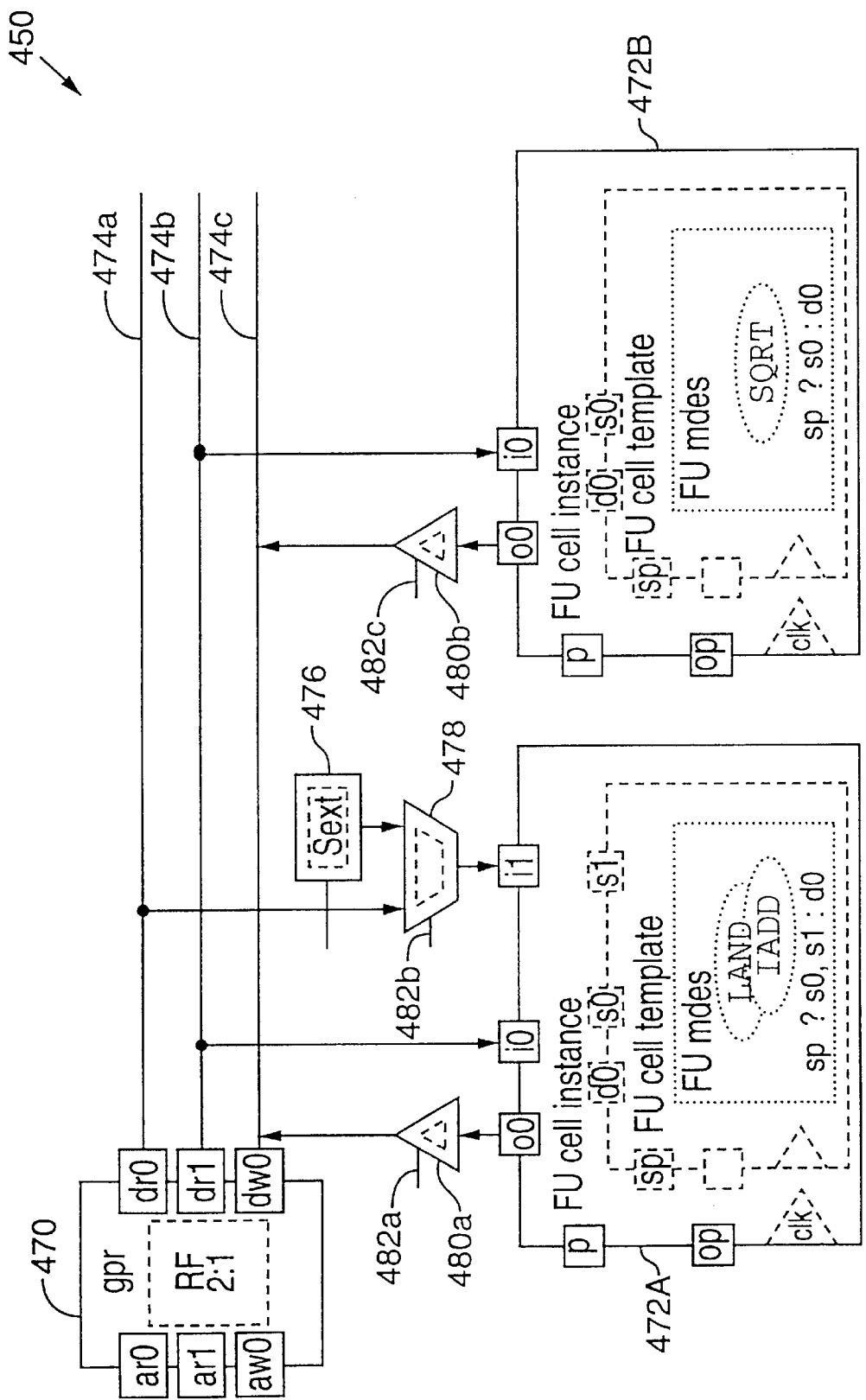
FIG. 9 is an example of a processor datapath.

To begin extraction of the MDES using the datapath shown in FIG. 9, the MDES extractor structurally traverses the interconnections of the functional units 472A, 472B. The operation group mapped to ALU instance 472A contains two operations, LAND (logical and) and IADD (integer add). The operation format for these operations stored within the mini-MDES shows the macrocell ports used for their various operands. The mini-MDES also records the sampling and production times of the various input and output operands that are intrinsic to the macrocell. Let us suppose that it is 0 for each data input s0 and s1, 1 for the predicate input sp, and 2 for the data output d0 (assuming that the macrocell is pipelined). Finally, the mini-MDES records that these operations execute on the same macrocell and share its computation resources. This is represented by an internal reservation table with a shared "ALU" resource for the two opcodes used at cycle 0 assuming that the macrocell is pipelined.

The datapath traversal starts from the actual input and output ports of the macrocell instance 472A. Following input port i0, we find that it is directly connected to the gpr register file port dr1, introducing a shared resource column for that register port to be used at cycle 0, which is the sampling latency of this input operand. The field type accessible via this port is denoted by "gpr" which stands for all the registers contained in the register file gpr 470. This operand alternative is recorded temporarily.

The input port i1 of the macrocell instance is connected via a multiplexor 478 to the gpr register file port dr0 as well as a sign-extender 476 for the short literal instruction field.

This gives rise to two distinct operand alternatives, one with field type "gpr" at latency 0 using the gpr file port dr0, and the other with field type "s" at latency 0 using the literal instruction field connected to the sign-extender. Similarly, the predicate input gives rise to the operand alternative with field type "pr" at latency 1 using the pr file port (not shown), and the destination port o0 gives rise to the operand alternative with field type "gpr" at latency 2 using the gpr file port dw0. The various operand alternatives are combined to form two distinct operation format and reservation table combinations for the ALU macrocell, as shown in FIGS. 10A and 10B.

Note that the overall latencies of the operands are the same as the intrinsic macrocell port usage latencies since there are no external pipeline latches. Also, the ALU resource is marked as being used only at cycle 0 since the macrocell is pipelined and the usage of subsequent stages of the ALU pipeline at subsequent cycles is implicit. The above combinations of operation formats, latencies, and reservation tables apply to both IADD and LAND opcodes, thereby forming two distinct operation alternatives each. These alternatives would be combined with other alternatives from other macrocells to give rise to the complete operation hierarchy for these opcodes.

In its structural traversal, the MDES extractor also prepares a reservation table for the functional unit 472B. This reservation table is illustrated in FIG. 11. An internal reservation table is extracted from the macrocell library. For purposes of illustration, the SQRT unit is assumed to be non-pipelined and have a latency of 4 clock cycles, i.e., an output is produced 4 clock cycles after an input is received. The fact that the unit is non-pipelined is reflected in the internal reservation table by keeping the "SQRT" resource busy for 4 cycles (see the column labeled SQRT in FIG. 11). The structural traversal of the datapath proceeds as before. The input i0 is followed to the register file 470, and a column 893 added to the SQRT reservation table 891. The output o0 is then traversed to the tristate buffer 480b and then to the port dw0. Corresponding column 894 is then added to the SQRT reservation table 891. Structural traversal of the functional unit 472B is complete.

At this point, the reservation tables for the functional units 472A, 472B are complete. The MDES extractor installs the resource conflict data included in the reservation tables on the respective opcodes within the MDES, completing MDES extraction.

Operation issue conflicts stemming from the instruction format may also be added to the above reservation tables in the following way. The MDES extractor repeats the above process after the instruction format for the target machine has been designed and the corresponding controlpath and instruction decode logic has been inserted (described in the Control path Application referenced above). Now, the datapath traversal is carried through the register files back up to the instruction register treating the register files like pipeline latches. The latency of the register files may cause one or more rows to be added at the beginning of the reservation table automatically corresponding to instruction decode and operand fetch cycles. The traversal paths leading towards the same bit positions in the instruction register would end up recording an operation issue conflict.

Alternatively, one may directly represent the operation group exclusions prescribed in the ArchSpec as shared abstract resources that are used at cycle 0 and, therefore, model operation issue conflict for the mutually exclusive operation groups. The current implementation uses this approach since it is simpler than traversing the control path representation, and it de-couples the extraction of the MDES and its use in scheduling application programs from instruction format design and control path design processes.

7.0 Instruction Format Design 7.1 Introduction

Figure 12:
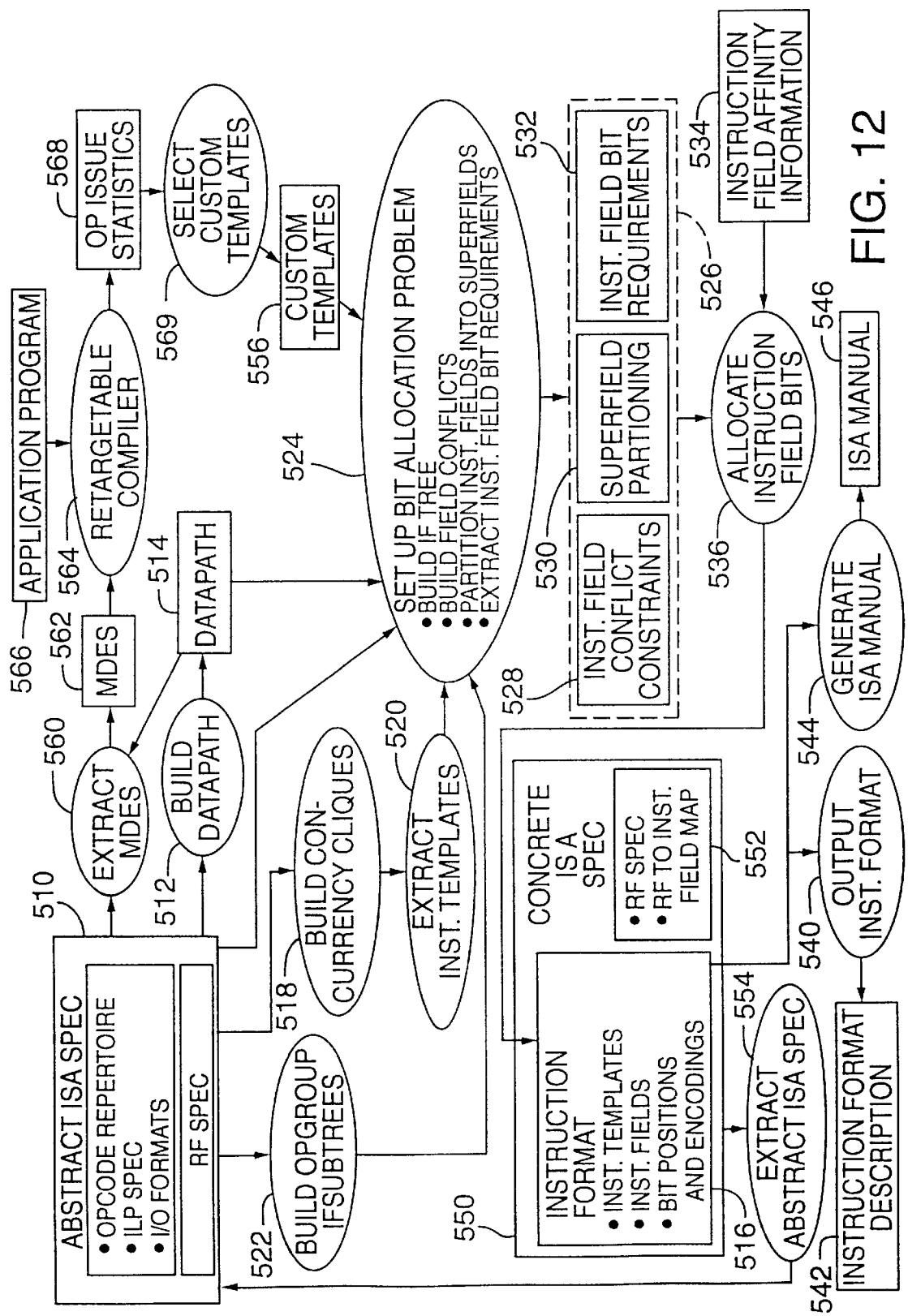
FIG. 12 is a diagram illustrating the instruction format design flow in an implementation of the invention.

FIG. 12 is a flow diagram illustrating the instruction format design flow in an automated processor design system. While this particular system is designed for the synthesis of a VLIW processor and its associated instructions, it also illustrates how a similar design system might be implemented for a single-issue processor. At a high level, the system takes a high-level processor architecture specification 510 as input, and automatically produces a complete hardware description of the target processor design, including a machine instruction set. The system is implemented in a series of program modules. FIG. 12 provides an overview of these modules, and the following description details an implementation of them.

The high-level input specification 510 provides a desired set of machine operations together with an abstract specification of the concurrency and resource sharing constraints between them. A concurrency constraint identifies which operations are allowed to be executed at the same time, while a resource sharing constraint identifies which operations cannot be executed at the same time. To generalize these concepts, we refer to them as instruction-level parallelism (ILP) constraints. The ILP constraints may be specified (1) directly as sets of concurrent operations, (2) as a set of pair-wise exclusions between operations, or (3) as some combination of exclusions and concurrency sets. The ILP constraints specify the amount of instruction level parallelism within the processor directly in terms of which operations are allowed to execute in parallel and which ones may share a processor resource. The input specification may be entered by a user or generated by another program module.

The instruction format design is based in part on the design of the target processor's datapath. Before the instruction format design process begins, a datapath design process 512 generates the datapath design 514 from the input specification 510. The current implementation includes software components that automate the datapath synthesis process. The instruction format design then creates the instruction format based on the high level input 510 and datapath specification.

Based on the high level input 510 and datapath specification, the instruction format (iformat, for short) design process builds a data structure 516 representing the instruction format. The instruction format includes a specification of the different types of instructions supported in the processor, called instruction templates. In the implementation detailed below, the templates define variable-length instructions, but they can also represent fixed-length instructions.

Every instruction template is made up of concatenated instruction fields, which encode one or more operations, each including an opcode, source operand(s) and destination operand(s). In some processor designs, the fields may include additional bit specifiers that control the data path, such as multiplexor selector bits, and an instruction identifier (e.g., a template ID field that identifies the instruction). The iformat system associates the instruction fields with the underlying processor control ports and calculates their bit width requirements.

In addition to enumerating these fields, the instruction format assigns bit positions and encodings to each of them. The bit positions are specific positions that each field occupies in an instruction. The encodings are the binary values associated with the instruction fields. For example, an opcode field is associated with binary values that select a particular opcode.

In the process of designing the instruction format, the iformat system selects a set of templates based on the concurrency relationships from the input specification. Each template consists of one or more operations based on which operations are allowed to be issued in parallel (concurrently) in the architectural specification and which ones are specified to be mutually exclusive. As shown in step 518 in FIG. 12, the iformat system builds concurrency cliques from the ILP specified in the input specification. Each concurrency clique represents a set of mutually concurrent operation groups, such that one of the operations in each operation group in the set may be issued in parallel with one of the operation from each of the other operation groups. The system then extracts instruction templates from the concurrency cliques as shown in step 520.

For each of the operation groups, the iformat system extracts the inputs and outputs for each operation based on their I/O formats in the input specification and adds this information to the iformat data structure as shown in step 522. Using the extracted I/O formats, the iformat system enumerates the instruction fields for each of the operation groups associated with the templates.

Before allocating bit positions to each of the instruction fields, the iformat system sets up a Bit Allocation Problem (BAP) specification as shown in step 524 in FIG. 12. In this process, the iformat system uses the ILP constraints and datapath specification to generate the data structures in the BAP specification 526. The set-up process shown in FIG. 12 includes the following sub-steps: 1) building an instruction format (IF) tree; 2) determining instruction field conflict constraints; 3) partitioning instruction fields into superfields; and 4) extracting instruction field bit requirements from the datapath. The output of the set-up process includes: 1) the instruction field conflict constraints 528; 2) a partitioning of the instruction fields into superfields 530; and 3) the bit width requirements 532.

The conflict constraints identify which fields are mutually exclusive and can be allocated overlapping bit positions and which fields need to be specified concurrently in an instruction and hence cannot overlap. Fields that are needed concurrently in an instruction are said to conflict with each other.

The set-up process 524 assigns instruction fields to control ports specified in the datapath. It then groups each set of instruction fields that map to the same control port into a superfield. These superfields enable the iformat design system to attempt to align these instruction fields at the same bit position in a process referred to as affinity allocation. The need for multiplexing is minimized if fields assigned to the same superfield are assigned to the same bit positions.

The process of partitioning instruction fields into superfields identifies fields that should preferably share bit positions. The iformat system enables a user or another program module to specify fields within a superfield that must share bits through an input data structure shown generally as instruction field affinity information 534 in FIG. 12.

The set-up process 524 extracts bit width requirements by traversing the fields and extracting the bit width requirements and encodings for each field from the datapath specification.

Once the instruction format syntax and instruction field bit width requirements have been determined, the system allocates bit positions to all fields as shown in step 536. Fields are allocated using a heuristic that allows non-conflicting fields to re-use bit positions, resulting in a shorter overall instruction size. Fields are also aligned based on affinity, i.e. fields associated with the same datapath resources are aligned to the same bit positions within the instruction register, resulting in reduced control complexity in hardware.

As shown in FIG. 12, the resulting instruction format includes instruction templates, instruction fields, and the bit positions and encodings of these fields. After bit allocation, the internal iformat data-structure 516 may be output in various forms for use by other modules of the overall processor design system. For example, one program module 540 generates an external file format 542, which is used to drive an assembler. Another module 544 generates a report in the form of an instruction set manual 546.

In some applications, the iformat system may be used to optimize an existing concrete ISA specification. In this scenario, an existing instruction format forms part of a concrete ISA specification 550, and the iformat system uses the concrete ISA along with custom templates to generate an optimized iformat programmatically. In addition to the iformat, the concrete ISA specification contains a register file specification 552, including register files, the number of registers in each file, and a correspondence between each operand instruction field type and a register file type. To optimize the iformat in a concrete ISA specification, the system begins by extracting an abstract ISA specification. As shown in FIG. 12, the system includes a module 554 for extracting an abstract ISA specification from the concrete ISA specification. The system then combines the extracted ISA specification with the additional ILP specification to create the input specification for the iformat design flow. The additional ILP specification provides a list of important concurrency sets and operation group occurrences. These concurrency sets represent statistically important subsets of the concurrency sets that are already present in the concrete ISA's instruction format. For example, this ILP specification may represent custom templates 556, which are generated by hand or programmatically. The output is an optimized instruction format, taking into account the additional ILP specification.

To the extent that the iformat design is based upon an application-specific architecture specification, it is application-specific but "schedule-neutral." The phrase "schedule-neutral" means that statistics detailing the usage of operations in an application program of interest have not been used to optimize the instruction format.

To optimize an iformat design for a particular application program, the iformat system selects custom templates from operation issue statistics obtained from scheduling the program. The iformat system then generates an iformat based on a combination of the custom templates and an abstract ISA specification.

The system uses a re-targetable compiler to generate the operation issues statistics for a particular processor design. As shown in FIG. 12, a module called the MDES extractor 560 generates a machine description in a format called MDES.

This machine description retargets the compiler 564 to the processor design based on its abstract ISA specification 510 and datapath specification 514. The compiler 564 then schedules a given application program 566 and generates operation issue statistics 568 regarding the usage of the operation groups in the instruction format templates. The system then uses the frequency of use of the operations in each template by the application program to compute customized templates as shown in step 569. The customization process is automated in that it selects custom templates by minimizing a cost function that quantifies the static or dynamic code size and the decode cost (e.g., measured in chip area).

The process of selecting instruction templates in the iformat based on scheduling statistics may be conducted as a stand-alone process, or may be conducted in conjunction with the automated iformat design process. In the latter case, it may be used to provide an initial input specification of the desired ILP constraints to the automated iformat design process. Additionally, it may be used to optimize an existing iformat design.

The system may also perform additional optimization by using variable-length field encodings to further reduce the instruction size. These optimized designs can lead to dramatic reductions in code size, as shown in the detailed description below.

7.2 Implementation of the Input Specification

The principal input of the iformat design process is an Abstract Instruction Set Architecture (ISA) specification 510. In the current implementation, the user or another program module may provide this specification as an ArchSpec in textual form.

An ArchSpec reader module converts the textual form of the ArchSpec to an abstract ISA spec data structure, which contains a machine-readable set of tabular parameters and constraints, including register file entries, operation groups, and exclusion/concurrency relationships.

7.3 Instruction Syntax

VLIW processors issue instructions having multiple instruction fields. An instruction field is a set of bit positions intended to be interpreted as an atomic unit within some instruction context. Familiar examples are opcode fields, source and destination register specifier fields, and literal fields. Bits from each of these fields flow from the instruction register to control ports in the data path. For example, opcode bits flow to functional units, and source register bits flow to register file read address ports. Another common type of instruction field is a select field. Select fields encode a choice between disjoint alternatives and communicate this context to the decoder. For example, a select bit may indicate whether an operand field is to be interpreted as a register specifier or as a short literal value.

An operation is the smallest unit of execution; it comprises an opcode, source operands, and destination operands. Each operand may support one or more operand types. A set of possible operand types is called an io-set. A list of io-sets, one per operand, form an operation's io-format. For example, suppose an add operation permits its left source operand to be either an integer register or a short literal value, and suppose its right source and destination operands source and sink from integer registers. The corresponding io-sets are {gpr, s}, {gpr}, {gpr}. The io-format is simply this list of io-sets, which are abbreviated in shorthand notation as follows:

gpr s, gpr : gpr

Closely related operations such as add and subtract often have the same io-format. One reason for this is that related operations may be implemented by a single, multi-function unit (macro-cell). As discussed above, to simplify the instruction format design process, related operations are grouped into operation groups.

The instruction format assigns sets of op groups (called super groups) to slots of an instruction. The processor issues operations within an instruction from these slots concurrently. To fully specify an operation, the instruction format specifies both an op-group and an opcode (specific to that opgroup). In effect, this organization factors a flat opcode name space into a multi-tier encoding. In rare cases, this factorization may increase the encoding length by one bit per level. However, it should be noted that this approach does not preclude a flat encoding space: placing each operation in its own op-group eliminates the factorization. More importantly, hierarchical encoding often gives the same benefits as variable-length field encoding, but is simpler to implement.

7.4 The Instruction Format Tree

In a flat, horizontal instruction format, all instruction fields are encoded in disjoint positions within a single, wide instruction. A hierarchical instruction format allows exclusive instruction fields (those that are not used simultaneously in any instruction) to be encoded in overlapping bit positions, thereby reducing the overall instruction width. In the instruction format design system shown in FIG. 12, the hierarchical relationship between instruction fields is represented by an instruction format tree (if-tree). The leaves of an if-tree are instruction fields; where each leaf points to a control port in the data path, such as a register file address port, or an opcode input of a FU.

Figure 13:
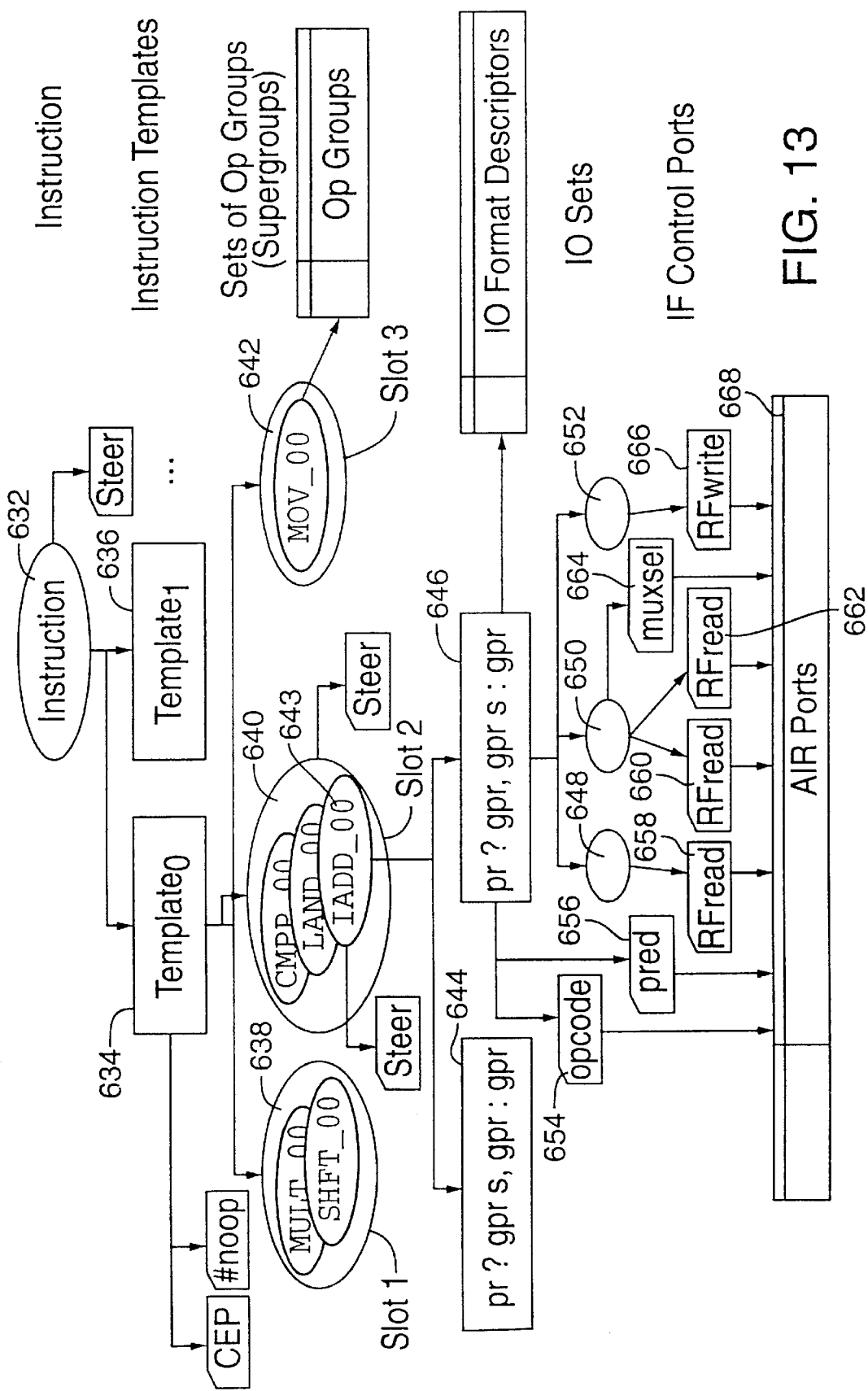
FIG. 13 is a diagram of an instruction format data structure.

FIG. 13 illustrates the structure of an if-tree used in the current implementation. The overall structure of the tree defines how each instruction is built. Each part of the tree represents a node, with the lowest nodes (the cut-off-box-shaped nodes) forming the tree's leaves. The oval-shaped nodes are "OR" nodes, while the boxed-shaped nodes are "AND" nodes. The OR nodes denote a selection between the children of the node such that only one choice (one branch) extends to the next level. Conversely, an AND node allows all of the components of the node to form new branches. Stated another way, each level of the tree is either a conjunction (AND) or disjunction (OR) of the subtrees at the lower level.

The root node 632 of the tree is the overall machine instruction. This is an OR node representing a choice of instruction templates. A template select field (template ID) is used to identify the particular template. This select field is illustrated as the leaf node labeled "steer" connected to the instruction node 632.

Individual instructions are based on instruction templates, which are the AND-type child nodes of the root node (See, e.g., templates 634 and 636). The templates each encode the sets of operations that issue concurrently. Since the number of combinations of operations that may issue concurrently is astronomical, it is necessary to impose some structure on the encoding within each template. Hence, each template is partitioned into one or more operation issue slots. Every combination of operations assigned to these slots may be issued concurrently.

In addition, each template has a consume to end-of-packet bit field (CEP) that indicates whether the next instruction directly follows the current instruction or it starts at the next packet boundary. This capability is used to align certain instructions (e.g. branch targets) to known address boundaries. Each template also specifies the number of spare bits that may be used to encode the number of no-op cycle to follow the current instruction. These spare bits may arise due to a need for packet alignment or quantized allocation.

The next level of the tree defines each of the concurrent issue slots. Each slot is an OR node supporting a set of operation groups, called a super group (i.e., nodes 638, 640, 642), that are all mutually exclusive and have the same concurrency pattern. A select field chooses among the various operation groups within a super group. Again, this select field is illustrated as the leaf node labeled "steer" connected to super group 640.

Below each super group lie operation groups as defined in the input specification as described above. Each operation group (e.g., operation group 643) is an OR node that has a select field ("steer") to choose among the various operation formats supported by operation group. FIG. 13 shows this situation where one operation format allows a literal field on the left port, while the other allows it on the right port.

Each operation format (e.g., IO format descriptors 644, 646) is an AND node consisting of the opcode field 654, the predicate field (if any) 656, and a sequence of source and destination field types (shown as IO sets 648, 650, 652). The traditional three-address operation encoding is defined at this level.

Each IO set is an OR node consisting of a singleton or a set of instruction fields that identify the exact kind and location of the operand. sets with multiple choices (e.g., 650) have a select field to identify which instruction field is intended. For example, one of the IO set nodes 650 represents a selection between instruction fields 660, 662, which is controlled via a multiplexor select field 664. The other IO sets each have only one kind of field, and thus, have a single child node representing that field (nodes 658, 666). The instruction fields point to the datapath control ports 668.

In implementing an instruction format, one principal design choice is whether to use a single, fixed-length instruction format, or allow variable-length instructions. The iformat design system supports both fixed and variable length instructions. The use of variable-length instructions produces more-compact code but increases decode complexity. The trade-off between code size and instruction decode complexity is a primary design consideration. A single, fixed-length instruction format simplifies decode logic and the data path for dispersal of operations to functional units, but it often results in poor code density, since the single format must accommodate the worst-case (longest) instruction. For example, if the longest instruction in a fixed-length instruction format is 128 bits long, then all of the instructions in the instruction set must be 128 bits long. In order to maintain a constant instruction length, many instructions will require the use of wasted bits whose sole purpose is to fill in unused space in the instructions. These wasted bits lead to increased code size. Conversely, variable-length instructions can accommodate both wide and compact, restricted instruction formats without wasting bits, which results in a reduction in code size. By using variable-length instructions, the instruction format can accommodate the widest instructions where necessary, and make use of compact, restricted instruction formats, such as instructions that do not encode long literals.

Figure 14:
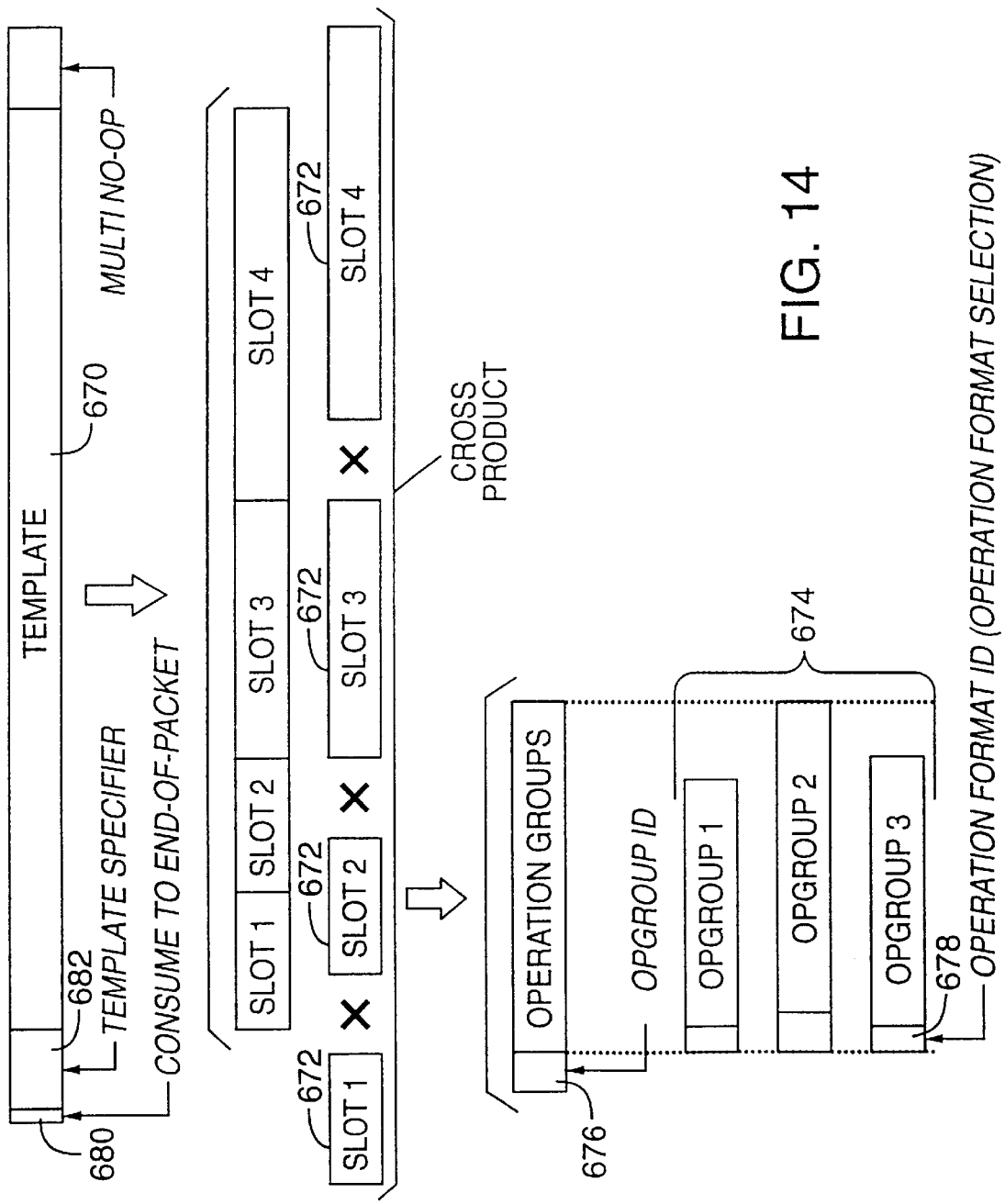
FIG. 14 is a diagram illustrating an example of an instruction template, which represents a possible VLIW instruction format.

FIG. 14 shows the format of an instruction and its building blocks. At the heart of the instruction is an instruction template 670. An instruction template encodes sets of operations that issue concurrently. Each template includes multiple concurrent slots 672, where each slot comprises a set of exclusive operation groups 674. Since all of the operations in an operation group are exclusive, all of the operations in each slot are also exclusive. Each template encodes the cross-product of the operations in each of its slots.

The length of each template is variable, depending in part on the length and number of the slots in the template. For example, some templates might have two slots, while other templates might have three or four slots. Furthermore, the width of each slot will depend on the width of the widest operation group within that slot, plus overhead, as shown in the lower portion of FIG. 14. There is considerable similarity and overlap among the opcodes within an operation group by construction, so very little encoding space is wasted within the operation group. But the opcode field now must be split into an operation group selection field 676 and an opcode selection field 678 within the operation group. With logarithmic encoding, this requires at most one additional bit for encoding the opcode. For example, 15 opcodes may be encoded in 4 bits, while splitting them into 3 operation groups of 5 opcodes each requires $[\log_2(3)]+[\log_2(5)]=5$ bits. In addition, every slot has a reserved no-op encoding.

In cases where an op group has alternative operation formats, there is yet another select field to select the operation format.

Each instruction also includes a consume to end-of-packet bit 680, and a template specifier 682. The template specifier identifies the template. An instruction format having t templates will need $[\log_2(t)]$ bits to encode the template specifier. This template specifier is in a fixed position within every instruction, and from its value, the instruction sequencer in the processor's control path determines the overall instruction length, and thus the address of the subsequent instruction.

In the current implementation, the length of the instruction is variable, but each length is a multiple of a predetermined number of bits called a quantum. For instance, if the quantum is 8 bits, the length of the instruction could be any number equal to or above some minimum value (say 32 bits) that is divisible by 8, such as 64 bits, 72 bits, 80 bits, etc. One or more dummy bits may be placed as appropriate within the instruction to ensure that the length of the instruction falls on a quantum boundary.

The iformat system builds the levels of the if-tree in an incremental fashion. It constructs the top three levels, consisting of the instruction, the templates, and the super groups from the abstract ISA specification, and optionally, custom templates. It constructs the middle layers, including the operation groups, the operation formats, and the field types from the abstract ISA specification. Finally, it constructs the instruction fields from the contents of the various field types in the abstract ISA specification and the individual control ports in the datapath that each field is supposed to control.

7.5 Instruction Templates

A primary objective of the instruction format design system is to produce a set of instruction templates that support the encoding of all of the sets of operation groups that can be issued concurrently. To initiate the template design process, the instruction format design system starts out with the architecture specification, which defines the exclusion and concurrency constraints for a particular design. In one implementation, the architecture specification directly provides the exclusion relationships between operation groups. However, the iformat design process needs to know which opcodes can be issued concurrently, i.e., the concurrency relationship, rather than which opcodes must be exclusive.

In such an implementation, the concurrency relationship is taken to be the complement of the exclusion relationship. One way of determining the concurrency relation is to take the complement of the exclusion relations among opcodes implied by the architecture specification and treat each set of concurrent opcodes as a potential candidate for becoming an instruction template. While this provides an excellent starting point, it unfortunately does not lead to a practical solution, since the number of combinations of operations that may issue concurrently quickly becomes intractable. For example, a typical VLIW machine specification may include 2 integer ALUs, 1 floating point ALU and 1 memory unit, with 50 opcodes each. In such a machine the total number of distinct 4-issue instructions is $50^2 \times 50 \times 50 = 6,250,000$. Specializing instructions to 1, 2, and 3-issue templates would add many more. It is therefore necessary to impose some structure on the encoding within each template.

Our current implementation uses several mechanisms to reduce the complexity of the problem. These mechanisms represent iformat design decisions and affect the final instruction format layout and size. In most cases there may also be a tradeoff between the simplicity and orthogonality of the field layout (and hence the decode hardware) and the size of the instruction template. These tradeoffs will be described as the design process is detailed below.

As a first axiom, all templates must satisfy an exclusion constraint between two opcodes, i.e. these opcodes must never occupy separate slots in any template. This is because these opcodes may share hardware resources during execution, and therefore, the scheduler should never put these opcodes together within the same instruction. On the other hand, a concurrency constraint between two opcodes implies that the scheduler is free to issue these opcodes together in a single instruction and therefore there should be some template in which these two opcodes are allowed to occur together. In particular, that template may contain additional slots that can be filled with noops, if necessary. Therefore, it is unnecessary to generate a special template for each concurrency constraint, but rather all that is needed is a set of templates that can effectively cover all possible sets of concurrently scheduled opcodes.

The problem becomes greatly simplified when the concurrency of operation groups is considered instead of individual opcodes. As introduced above, operation groups are defined as sets of opcode instances that are generally similar in nature in terms of their latency and connectivity to physical register files and are expected to be mutually exclusive with respect to operation issue. All opcodes within an operation group must be mutually exclusive by definition. Furthermore, the instruction format is designed so that all opcodes within an operation group share the same instruction fields. Thus, the operation group is an obvious choice for the primary building block for creating templates.

Figure 15:
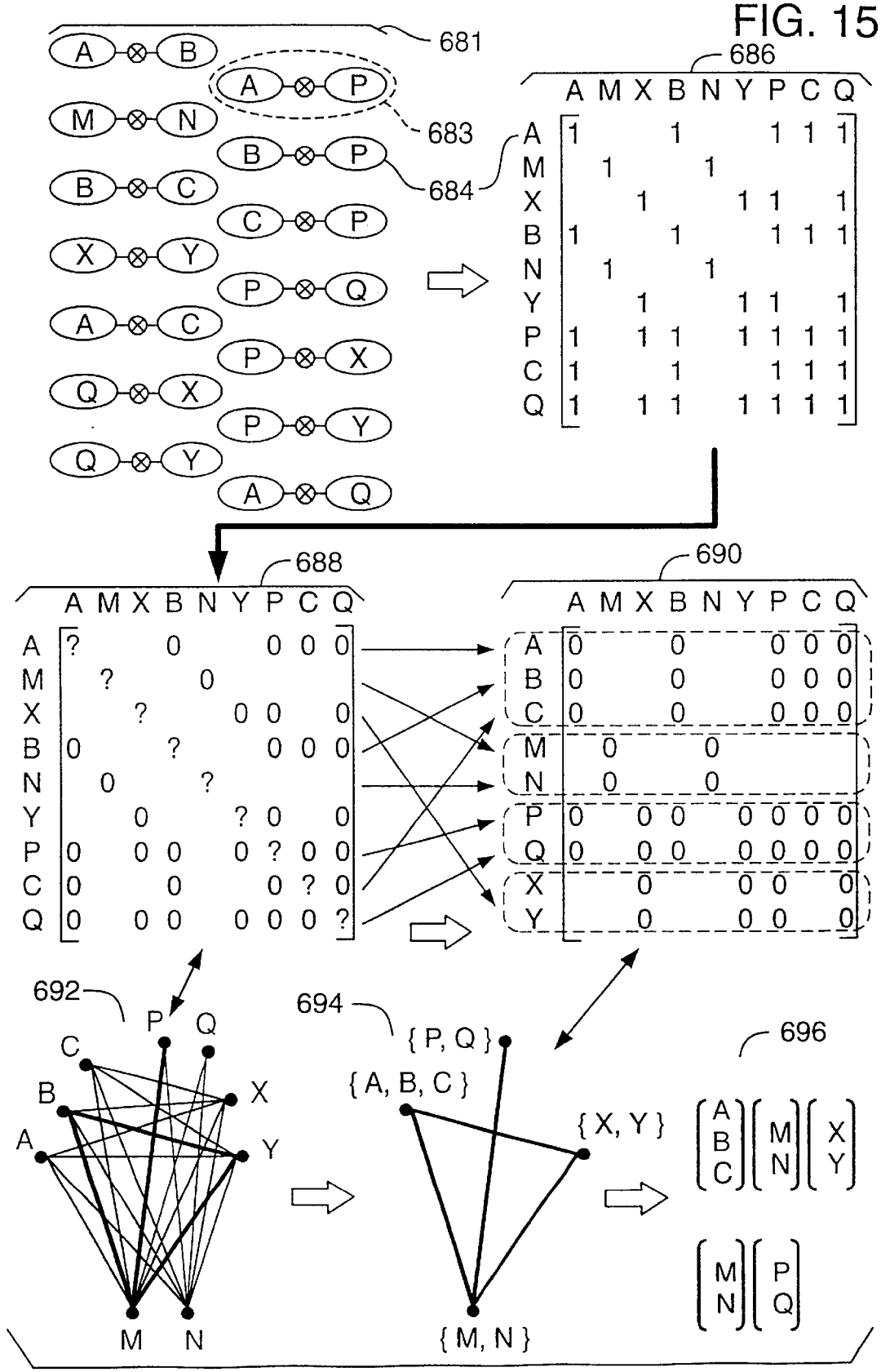
FIG. 15 shows an example illustrating how the instruction format design system uses the ILP constraints on operations to build a concurrency matrix data structure and then select instruction templates based on the concurrency relationships expressed in the data structure.

Another simplification involves classifying mutually-exclusive operation groups into equivalence classes called super groups based on the constraints provided in the architecture specification. FIG. 15 illustrates an example that shows how the operation groups (shown as letters) and exclusion relations are used in the template selection process. The process starts with the ILP constraints 681, which define a set of exclusion relationships 683 between operation groups 684. From these exclusion relationships, the iformat design system builds a boolean exclusion matrix 686. In the exclusion matrix 686, the rows and columns are matched up with respective operation groups, e.g., "A" corresponds to the operation group A, "B" corresponds to the operation group B, etc. The 1's in the matrix indicate an exclusion relationship, while a blank indicates that the corresponding operation groups may be issued concurrently. (The blanks are actually 0's in the real matrix—blanks are used here for clarity). The system then builds a concurrency matrix 688 from the exclusion matrix 686. The concurrency matrix 688 is the complement of the exclusion matrix 686. The "?"s along the diagonal of the concurrency matrix 688 can be interpreted as either a 1 or 0.

The rows in the concurrency matrix determine a set of concurrency neighbors for each operation group. A graphical representation of the relationships defined by the concurrency matrix 688 is shown in concurrency graph 692. Each node represents an operation group, while each connecting "edge" represents a concurrency relation. A clique is a set of nodes from a graph where every pair of nodes is connected by an edge. For instance, there are 16 cliques in the concurrency graph 692.

After the concurrency matrix is generated, the system compares the rows in the concurrency matrix to identify equivalent operation groups. The super groups are formed from the equivalent operation groups. Two operation groups are said to be equivalent if they have the same set of concurrency neighbors. Note that two mutually exclusive operation groups that have the same set of concurrency neighbors can replace each other in any template without violating any exclusion constraint and therefore can be treated equivalently. Similarly, two concurrent operation groups that have the same set of concurrency neighbors (other than themselves) can always be placed together in a template without violating any exclusion constraints and therefore can be treated equivalently.

An example of pseudocode for performing equivalence checking and partitioning into super groups is illustrated below.

```
ProcedureFindSuperGroups (BitMatrix concur)
1:   // "concur" is a (numNodes x numNodes) boolean matrix
2:   //First, initialize supergroup hash table and id counter
3:   HashMap;BitVector, int; SGmap
4:   int Sgcount = 0;
5:   for (i = 0 to numNodes-1) do
6:      //extract each node's vector of neighbors w/ and w/o self
7:      BitVector AND-group = concur.row(i) .set_bit(i);
8:      BitVector OR-group = concur.row(i) .reset_bit(i);
9:      //Check for existing AND-style supergroup for this node
10:     if (SGmap(AND-group) is already bound) then
11:        SGkind(i) = SG-AND;
12:        SGid(i) = SGmap(AND-group);
13:     //Check for existing OR-style supergroup for this node
14:     else if (SGmap(OR-group) is already bound) then
15:        SGkind(i) = SG-OR
16:        SGid(i) = SGmap(OR-group);
17:     //If neither neighbor relation is present, start a new
18:     //supergroup with the new neighbor relations
19:     else
20:        SGid(i) = SGcount;
21:        SGmap(AND-group) = SGmap(OR-group) = SGcount;
22:        SGcount = SGcount + 1;
23:     endif
24:  endfor
```

The equivalence check and the partitioning can be performed quickly by employing the pigeon-hole principle. The algorithm hashes each operation group using its set of neighbors in the concurrency matrix as the key. The neighbor relations (neighbor keys) for each operation group (each row) are converted to bitvectors. The algorithm hashes in two ways: once by treating each operation group as concurrent with itself (AND-style) thereby finding equivalent concurrent operation groups, and the second time by treating each operation group as exclusive with itself (OR-style) thereby finding equivalent exclusive operation groups. This hashing approach results in two bitvectors for each operation group—one with the "?" entry changed to a 1 (AND-style), and one with the "?" entry changed to a 0 (OR-style).

Bitvectors (operation groups) that hash to the same bucket necessarily have the same concurrency neighbors and therefore become part of the same super group. For example in FIG. 15, operation groups A, B, and C have the same concurrency neighbors and thus form the super group {A, B, C}. The other super groups, {P, Q}, {X, Y}, and {M, N}, are similarly formed. The set of all distinct super groups is defined by all the distinct neighbor keys. This partitioning leads to a reduced-concurrency (super group) graph 694, comprising the super groups and their concurrency relations. Instruction templates 696 are obtained from the reduced concurrency graph, as described below.

Each operation group identifies whether it is an AND-type or OR-type super group. This information is used in the final template expansion, where each operation group from an AND-type super group is given a separate slot, while all operation groups from an OR-type super group are put into the same slot.

In the concurrency matrix 690 shown in FIG. 15, the "?" entries of the "A", "B", and "C" operation group bitvectors have been changed to 0's so that their corresponding bitvectors are identical. Thus, "A", "B", and "C" form an OR-type super group {A, B, C}, and each operation group is placed in the same slot.

Figure 16:
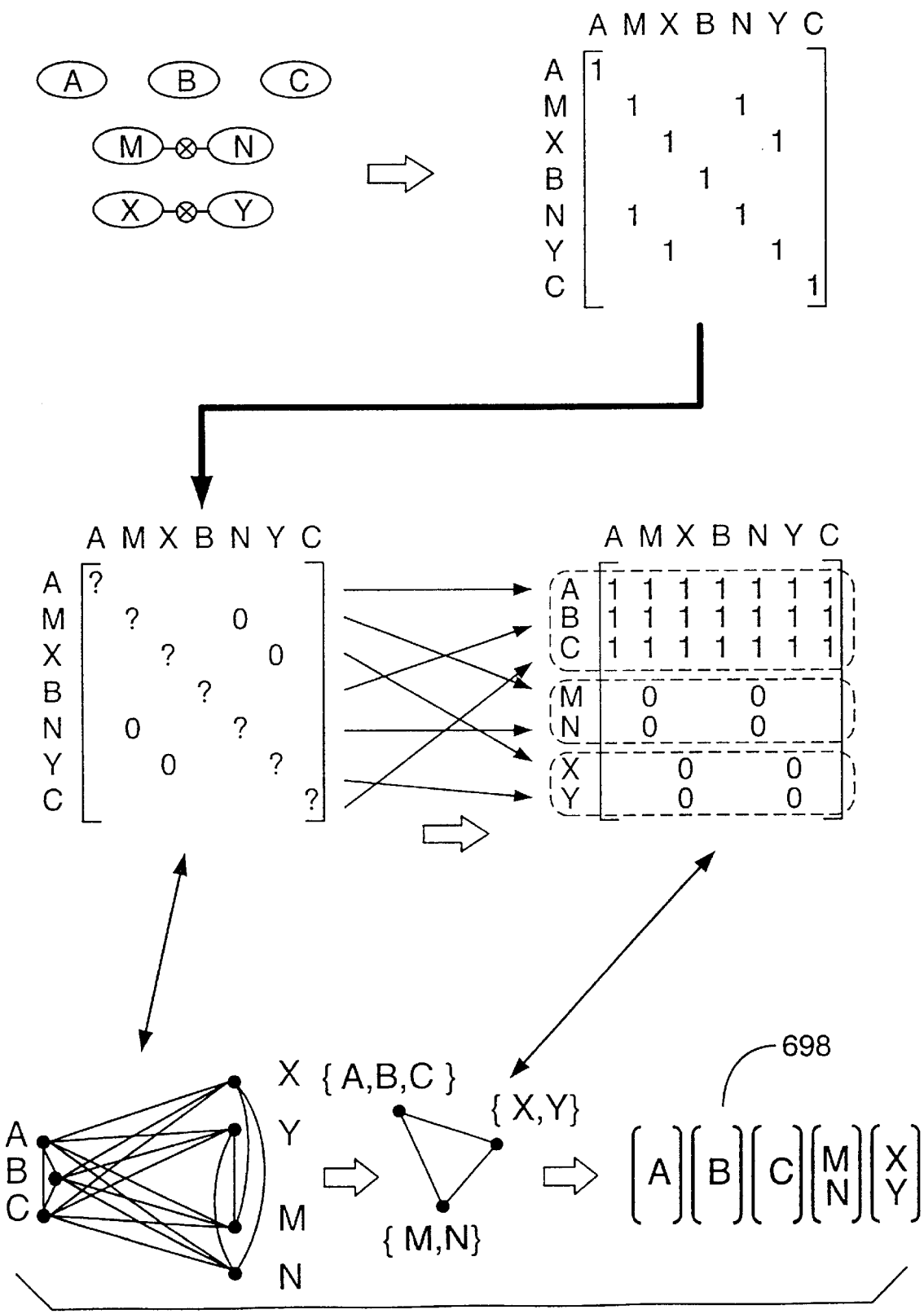
FIG. 16 is a diagram illustrating another example of how the instruction format design system uses ILP constraints specified in the input to organize the operations into VLIW instruction templates.

FIG. 16 shows a case with an AND-type and an OR-type super group. In order to obtain identical bitvectors, the "A", "B", and "C" operation groups are treated as being concurrent with themselves. As a result, they form an AND-type super group and are placed in separate template slots. In contrast, the "M", "N", "X", and "Y" operation groups are treated as exclusive with themselves and form two different sets of OR-type super groups {M,N} and {X,Y}, which each occupy a single slot.

For a homogenous VLIW-style machine with multiple, orthogonal functional units this process yields tremendous savings by reducing the complexity of the problem to just a few independent super groups. The resulting instruction templates closely match super groups to independent issue slots for each functional unit. For a more heterogeneous machine with shared resources, the resulting number of templates may be larger and the decoding is more complex but partitioning the operation groups into super groups still reduces the complexity of the problem significantly.

7.6 Concurrency Cliques and Templates

Once the super groups have been determined, each clique in the reduced concurrency graph is a candidate for an instruction template since it denotes a set of super groups that may be issued in parallel by the scheduler. A clique is a subgraph in which every node is a neighbor of every other node. Clearly, enumerating all cliques would lead to a large number of templates. On the other hand, unless the concurrency among super groups is restricted in some other way, it is necessary to choose a set of templates that cover all possible cliques of the super group graph to ensure that the scheduler is not restricted in any way other than that specified in the ArchSpec.

As an example, suppose super groups A, B and C only have pairwise concurrency constraints, i.e., {AB}, {AC}, and {BC}. These pairwise concurrencies can be covered in one of two ways. First, the pairwise concurrency constraints can be treated as three independent templates AB, AC, and BC, each requiring two issue slots. A second possibility is to treat the pairwise concurrencies as being simultaneously concurrent, thereby requiring only one template (ABC) with three issue slots. Strictly speaking, this allows more parallelism than what was intended. If the compiler never scheduled all three operations simultaneously, the second design would end up carrying one noop in every instruction thereby wasting one-third of the program space. On the other hand, the first design requires additional decoding logic to select among the three templates and more complex dispersal of the instruction bits to the various functional units.

In the present scheme, this tradeoff is made towards initially choosing a reduced number of possibly longer templates. This is partly due to the fact that the ArchSpec does not directly specify concurrency in most instances, but rather specifies exclusion relations among operation groups that are then complemented to obtain concurrency relations. During the initial template design phase, choosing the maximally concurrent templates covers all possible concurrency relations with as few templates as possible.

The maximally concurrent templates may be determined by finding the cliques of the super group graph. An example of a simple reduced super group concurrency graph is shown in FIG. 17. The graph comprises super groups 1–7, and their interconnecting edges. The maximal cliques for such a simple graph can be determined by hand by simply identifying sets of nodes that are completely connected—that is each node in a clique must connect to the remaining nodes in the clique. For instance, {1, 3, 7} is a clique, while {2, 4, 5, 6} is not (nodes 5 and 6 are not connected). In the supergraph of FIG. 6, there are seven maximal cliques, and thus seven maximally concurrent templates.

It is necessary to use computational means to calculate the cliques for more complex super group graphs. The instruction format designer uses the same approach for finding cliques as the datapath synthesizer described above.

7.7 Set-Up of Bit Allocation Problem

Once the templates are selected, the iformat system constructs the lower levels of the IF tree. The templates form the upper level of the tree. For each of the operation groups in a template, the system extracts the inputs and outputs for each operation based on their I/O formats in the abstract ISA specification and adds this information to the IF tree. Using the extracted I/O formats, the system enumerates the instruction fields for each of the operation groups associated with the templates. Next, it builds field conflicts, partitions instruction fields into superfields, and extracts bit width requirements.

7.7.1 Instruction Fields

As shown in FIG. 13, the instruction fields form the leaves of the if-tree. Each instruction field corresponds to a datapath control port such as register file read/write address ports, predicate and opcode ports of functional units, and selector ports of multiplexors. Each field reserves a certain number of instruction bits to control the corresponding control port.

The iformat designer assigns each field to a control port by traversing the if tree to find the operation group associated with the field, and then extracting the functional unit assigned to the operation group in the datapath specification.

Figure 20:
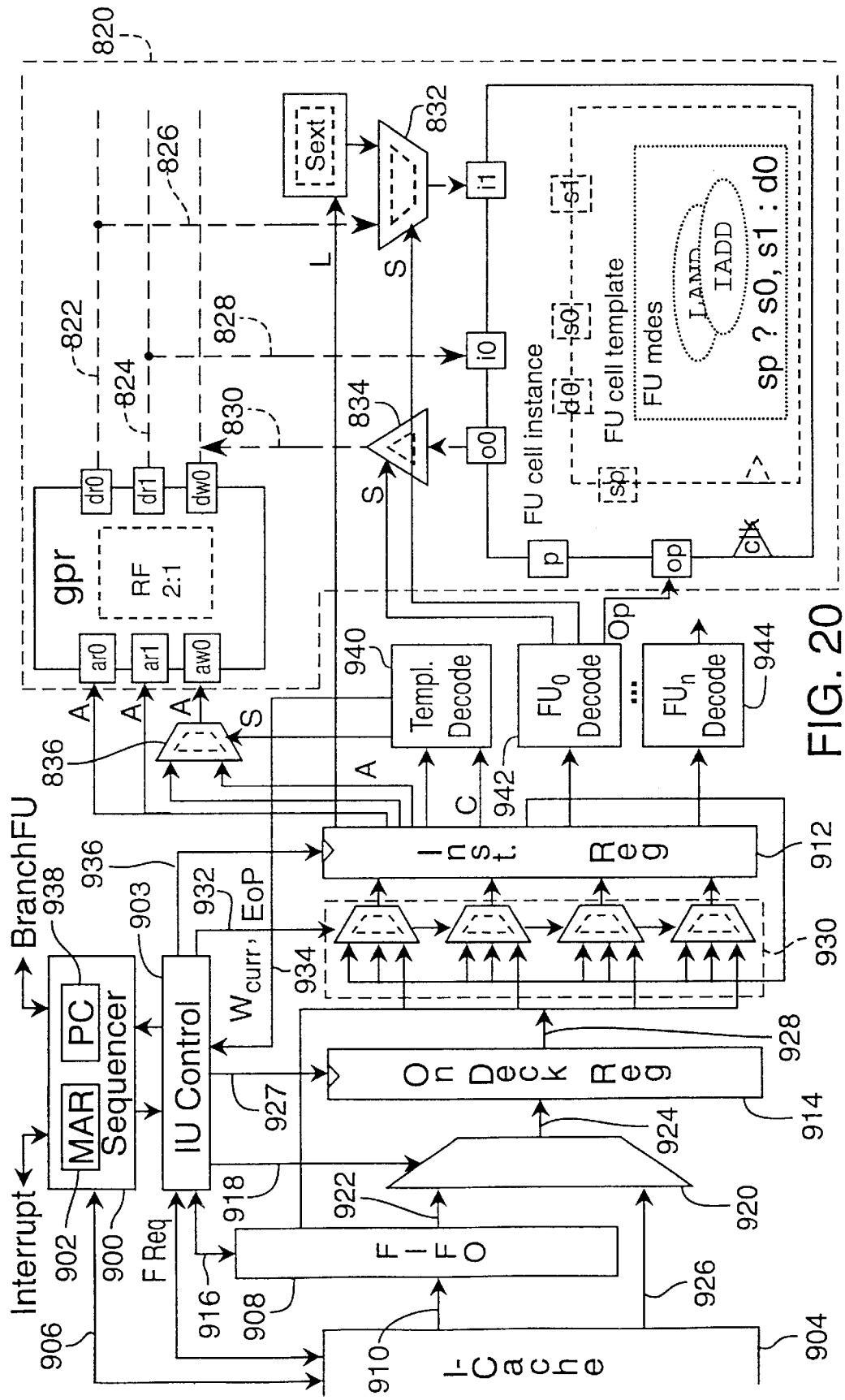
FIG. 20 illustrates an example of a processor control path and data path.

The following sub-sections describe various kinds of instruction fields. FIG. 20 is annotated with letters S, A, L, op and C to illustrate examples of the information flowing from these fields in the instruction register to the control ports in the data path.

Select fields (S). At each level of the if-tree that is an OR node, there is a select field that chooses among the various alternatives. The number of alternatives is given by the number of children, n, of the OR node in the if-tree. Assuming a simple binary encoding, the bit requirement of the select field is then $\log_2(n)$ bits.

Different select fields are used to control different aspects of the datapath. The root of the if-tree has a template select field that is routed directly to the instruction unit control logic in order to determine the template width. It also specifies where the supergroup select fields are positioned. Therefore, this field must be allocated at a fixed position within the instruction. Together with the template select fields, the select fields at super group and operation group levels determine how to interpret the remaining bits of the template and therefore are routed to the instruction decode logic for the datapath. The select fields at the level of field types (IO sets) are used to control the multiplexors and tristate drivers at the input and output ports of the individual functional units to which that operation group is mapped. These fields select among the various register and literal file alternatives for each source or destination operand.

Register Address Fields (A). The read/write ports of various register files in the datapath need to be provided address bits to select the register to be read or written. The number of bits needed for these fields depends on the number of registers in the corresponding register file.

Literal Fields (L). Some operation formats specify an immediate literal operand that is encoded within the instruction. The width of these literals is specified externally in the ArchSpec. Dense ranges of integer literals may be represented directly within the literal field, for example, an integer range of −512 to 511 requires a 10-bit literal field in 2's complement representation. On the other hand, a few individual program constants, such as 3.14159, may be encoded in a ROM or a PLA table whose address encoding is then provided in the literal field. In either case, the exact set of literals and their encodings must be specified in the ArchSpec.

Opcode Fields (OP). The opcode field bits are used to provide the opcodes to the functional unit to which an operation group is assigned. It is possible to use the internal hardware encoding of opcodes in the functional unit directly as the encoding of the opcode field, in which case the width of the opcode field is the same as the width of the opcode port of the corresponding functional unit and the bits are steered directly to it. This mechanism may be used when all the opcodes supported by a functional unit are present in the same operation group or the same super group.

Under some templates, however, the functional unit assigned to a given operation group may have many more opcodes than those present within the operation group. In this case, opcode field bits may be saved by encoding the hardware opcodes in a smaller set of bits determined by the number of opcodes in that operation group and then decoding these bits before supplying to the functional unit. In this case, the template and opgroup specifier bits are used to provide the context for the decoding logic.

Miscellaneous Control Fields (C). Some additional control fields are present at the instruction level that help in proper sequencing of instructions. These consists of the consume to end-of-packet bit (Eop) and the field that encodes the number of no-op cycles following the current instruction.

7.7.2 Computing Field Conflicts

Before performing graph coloring, the system computes the pairwise conflict relation between instruction fields, which are represented as an undirected conflict graph.

In the if-tree, two leaf nodes (instruction fields) conflict if and only if their least-common ancestor is an AND node. The system computes pairwise conflict relations using a bottom-up data flow analysis of the if-tree. The procedure in the implementation maintains a field set, F, and a conflict relation, R. Set $F_n$ is the set of instruction fields in the subtree rooted at node n. Relation $R_n$ is the conflict relation for the subtree rooted at node n.

The procedure processes nodes in bottom-up order as follows:

leaf Node: At a leaf node, I the field set is initialized to contain the leaf node, and the conflict relation is empty.

Or-node: At an OR-node, the field set is the union of field sets for the node's children. Since an OR-node creates no new conflicts between fields, the conflict set is the union of conflict sets for the node's children.

And-node: At an AND-node, the field set is the union of field sets for the node's children. An AND-node creates a new conflict between any pair of fields for which this node is the least-common ancestor; i.e. there is a new conflict between any two fields that come from distinct subtrees of the AND-node. Formally, $$C_n = \bigcup_{i \in succ} C_i \cup \{\langle x, y \rangle \mid x \in C_j, y \in C_k, j \neq k\}$$

This method can be implemented very efficiently, by noting that the sets can be implemented as linked lists. Because the field sets are guaranteed to be disjoint, each union can be performed in constant time by simply linking the children's lists (each union is charged to the child). Similarly, the initial union of children's conflict sets can be done in constant time (charged to each child). Finally, forming the cross-product conflicts between fields of distinct and-node children can be done in time proportional to the number of conflicts. Since each conflict is considered only once, the total cost is equal to the total number of conflicts, which is at most $n^2$. For an if-tree with n nodes and E conflicts, the overall complexity is $O(n + E)$ time.

7.7.3 Assigning Field Affinities

As introduced above, the iformat system is capable of aligning instruction fields that correspond to the same control port to the same bit position in a process called affinity allocation. Such alignment may simplify the multiplexing and decoding logic required to control the corresponding datapath control ports since the same instruction bits are used under different templates. On the other hand, such alignment may waste some bits in the template thereby increasing its width.

In order to make use of affinity allocation, the iformat designer groups instruction fields that point to the same datapath control port into a superfield. All instruction fields within a superfield are guaranteed not to conflict with each other since they use the same hardware resource and therefore must be mutually exclusive.

The superfield partitioning only identifies instruction fields that should preferably share instruction bits. However, sometimes it is deemed essential that certain instruction fields must share the same bits. For example, if the address bits of a register read port are aligned to the same bit positions under all templates, then these address bits may be steered directly from the instruction register to the register file without requiring any control logic to select the right set of bits. This forced sharing of bit positions can avoid the need for a multiplexor in the critical path of reading operands out of a register file, thereby enhancing performance.

To handle such a constraint, the iformat system allows a user or other program module to specify a subset of fields within a superfield that must share bits. One way to specify this is in the form of a level mask that identifies the levels of the if-tree below which all instruction fields that are in the same superfield must share bit positions. This mask is a parameter to the bit allocation process described in the next section.

7.8 Resource Allocation

Once the instruction fields have been assigned to the leaves and the pairwise conflicts have been determined, we are ready to begin allocating bit positions to the instruction fields. In this problem, instruction fields are thought of as resource requesters. Bit positions in the instruction format are resources, which may be reused by mutually exclusive instruction fields. Fields required concurrently in an instruction must be allocated different bit positions, and are said to conflict. The resource allocation problem is to assign resources to requesters using a minimum number of resources, while guaranteeing that conflicting requestors are assigned different resources. The current implementation of resource allocation uses a variation of graph coloring.

Once the if-tree and instruction field conflict graph are built, the iformat system can allocate bit positions in the instruction format to instruction fields. Pseudocode for the resource allocation is shown below:

---

ResourceAlloc (nodeRequests, conflictGraph)

```
// compute resource request for each node + neighbors
foreach (node ∈ conflictGraph)
    Mark (node) = FALSE;
    TotalRequest (node) = Request(node) +
    Request (NeighborsOf(node));
// sort nodes by increasing remaining total resource request
// compute upper-bound on resources needed by allocation
resNeeded = 0; Stack = EMPTY;
for (k from 0 to NumNodes(conflictGraph))
    find (minNode ∈ unmarked nodes) such that
    TotalRequest(minNode) is minimum;
    Mark (minNode) = TRUE;
    push (minNode, Stack);
    resNeeded = max(resNeeded, TotalRequest(minNode));
    foreach (nhbr ∈ NeighborsOf(minNode))
        TotalRequest (nhbr) -= Request (minNode);
// process nodes in reverse order (i.e., decreasing total
request)
while (Stack is not EMPTY)
    node = pop(Stack);
    AllResources = {0 . . . resNeeded-1};
    // available bits are those not already allocated to any
    neighbor
    AvailableRes (node) = AllResources -
    AllocatedRes (NeighborsOf(node));
    // select requested number of bits from available positions
    // according to one of several heuristics
    AllocatedRes(node) = Choose Request(node) resources from
    AvailableRes (node)
    ☒ H1: Contiguous Allocation
    ☒ H2: Affinity Allocation
return resNeeded
```

---

In the above pseudocode, the total resource request for a node and its neighbors is computed by the first loop. The heuristic repeatedly reduces the graph by eliminating the node with the current lowest total resource request (node plus remaining neighbors). At each reduction step, we keep track of the worst-case resource limit needed to extend the coloring. If the minimum total resources required exceed the current value of k, we increase k so that the reduction process can continue. The graph reduction is performed by the second loop. Nodes are pushed onto a stack as they are removed from the graph. Once the graph is reduced to a single node, we begin allocating bit positions (resources) to nodes. Nodes are processed in stack order, i.e. reverse reduction order. At each step, a node is popped from the stack and added to the current conflict graph so that it conflicts with any neighbor from the original graph that is present in the current conflict graph. The existing allocation is extended by assigning bit positions to satisfy the current node's request, using bit positions disjoint from bit positions assigned to the current node's neighbors.

7.8.1 Allocation Heuristics

During bit allocation, the current node's request can be satisfied using any bit positions disjoint from positions allocated to the node's neighbors in the current conflict graph. The current implementation applies several heuristics to guide the selection of bits.

Left-Most Allocation. The number of required bit positions computed during graph reduction is the number needed to guarantee an allocation. In practice, the final allocation often uses fewer bits. By allocating requested bits using the left-most available positions, we can often achieve a shorter instruction format.

Contiguous Allocation. Since bit positions requested by an instruction field generally flow to a common control point in the data path, we can simplify the interconnect layout by allocating requested bits to contiguous positions.

Affinity Allocation. Non-conflicting instruction fields may have affinity, meaning there is an advantage to assigning them the same bit positions. For example, consider two non-conflicting fields that map to the same register file read address port. By assigning a single set of bit positions to the two fields, we reduce the interconnect complexity and avoid muxing at the read address port. As discussed earlier, each node has a set of affinity siblings. During allocation, we attempt to allocate the same bit positions to affinity siblings. This heuristic works as follows. When a node is first allocated, its allocation is also tentatively assigned to the node's affinity siblings. When a tentatively allocated node is processed, we make the tentative allocation permanent provided it does not conflict with the node's neighbors' allocations. If the tentative allocation fails, we allocate available bits to the current node using the previous heuristics, and we then attempt to re-allocate all previously allocated affinity siblings to make use of the current node's allocated bits. Because nodes are processed in decreasing order of conflict, tentative allocations often succeed.

A heuristics diagram for the resource allocation is as follows:

---

```
if node is tentatively allocated then
    make tentative allocation permanent, if possible
if node is (still) not allocated then
    try to use a sibling allocation
if node is (still) not allocated then {
    allocate either contiguously, or left-most available
    for each sibling of node {
        if sibling is allocated then
            try to use node's allocation in place of existing
allocation
        else
            tentatively allocate sibling, using node's allocation
    } // for
}
```

---

7.9 Template-based Assembly

Once the complete structure of the instruction templates has been determined, we can proceed to assemble the code. All subsequent discussion is essentially to improve the quality of the templates. In this section, we briefly outline the process of assembly with a given set of templates.

A program that has been scheduled and register-allocated consists of a sequence of operations each of which has been assigned a time of issue. Multiple operations scheduled within the same cycle need to be assembled into a single instruction. Any instruction template that covers all the operations of an instruction may be used to assemble that instruction. Clearly, the shortest template is preferred to avoid increasing the codesize unnecessarily since longer templates would have to be filled with noops in the slots for which there are no operations in the current instruction.

The process of template selection for an instruction has the following steps. First, the specific compiler-opcode of each scheduled operation in the instruction is mapped back to its operation group. Each operation group keeps a record of the set of templates that it can be a part of. Finally, the intersection of all such sets corresponding to the operation groups present in the current instruction gives the set of templates that may be used to encode the current instruction. The shortest template from this set is chosen for assembly. The exact opcode and register bits are determined by mapping the compiler mnemonics to their machine encodings by consulting the if-tree.

7.10 Design of Application-specific Instruction Formats

As discussed above, the initial design produces a minimal set of maximally concurrent instruction templates that cover all possible concurrency relations implied by the ArchSpec. In practice, this tends to produce a few long templates since the processor designs we are interested in have quite a bit of expressible instruction-level parallelism (ILP). But not all that parallelism is used at all times by the scheduler. If we assemble programs using only these long templates, a lot of noops would have to be inserted in the low ILP parts of the code.

One fix to this problem is to customize the templates to the program being compiled. There are several aspects to such customization:

(1) Identify the most frequently used combinations of operations in the program and design shorter templates for them which allow fewer concurrent operations in them. An extension of this view also takes into account the most frequently used operation formats and creates new opgroups that incorporate just those.

(2) Use variable length encoding wherever there is a need to select one out of many choices in the instruction format. We may use variable length template selection bits according to the frequency of use of each template. Likewise, different operation groups within a slot and different opcodes within an operation group may be given a variable length encoding according to their frequency of use. There is, of course, a tradeoff between the codesize reduction and the increase in decode complexity.

(3) Sometimes, the decode complexity may be improved dramatically by doing affinity-based allocation of similar instruction fields across templates. This reduces the degree of multiplexing needed to route the same information represented at different positions in different templates. This amounts to reordering the positions of various operation groups within these templates.

(4) The instruction fetch and decode hardware is usually designed with a certain quantum of instruction information in mind. A quantum is a unit of data (e.g., an integer multiple of bytes) used to specify the width of the data path in the instruction fetch and decode hardware. Rounding the instruction templates up to the next quantum usually frees up extra bit space. One or more of the above strategies can then take advantage of this extra bit space without increasing the width of the instruction.

7.11 Schedule-based Template Customization

The instruction format information is not needed until the program is ready to be assembled. The compiler is driven by a machine-description that only depends on the specified ArchSpec and the structure of the datapath. This implies that the exact schedule of the program may be used to customize the various available templates. To customize templates for a particular application program, the iformat system uses operation issue statistics from a scheduled version of the program to determine the frequency of use of the various combinations of operations. It then selects frequently used combinations of operations as possible candidates for new templates. Finally, it performs a cost/benefit analysis to select new "custom" templates.

Figure 18:
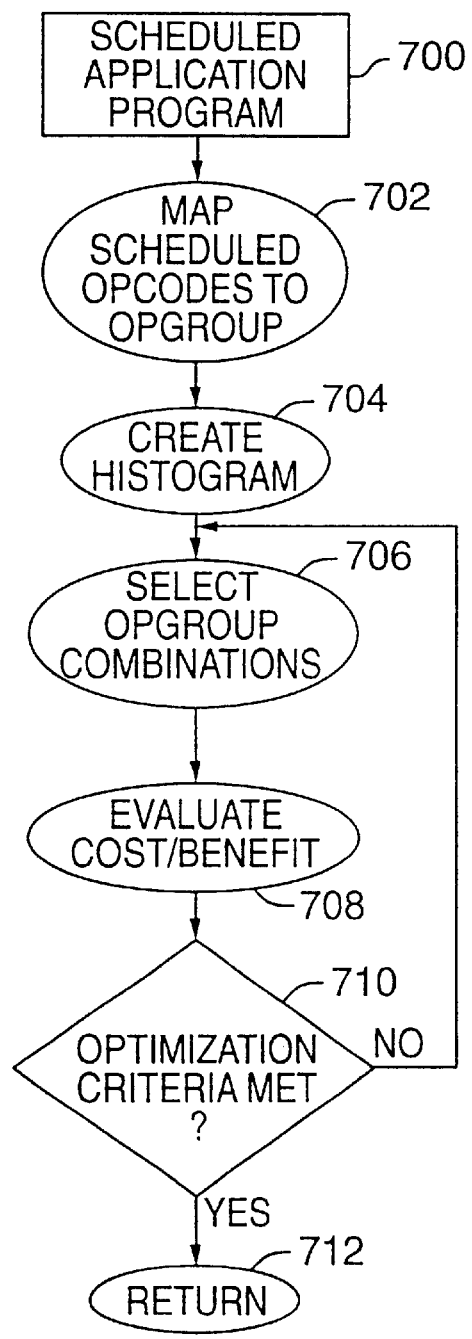
FIG. 18 is a flow diagram illustrating a process of selecting custom instruction templates from operation issue statistics generated from a compiler.

FIG. 18 is a flow diagram illustrating a process of selecting custom templates from operation issue statistics. The process begins by extracting usage statistics from a scheduled application program 700. This is done by mapping the scheduled opcodes of an instruction back to their operation groups as shown in step 702. The process then generates a histogram of combinations of operation groups from the program as shown in step 704.

A static histogram records the frequency of static occurrences of each combination within the program and may be used to optimize the static codesize. A dynamic histogram weights each operation group combination with its dynamic execution frequency and may be used to improve the instruction cache performance by giving preference to the most frequently executed sections of the code. One implementation uses the static histogram in the optimization to give preference to the overall static code size. In alternative implementations, the dynamic histogram or both the dynamic and static histograms may be used to optimize the dynamic code size of the combined dynamic/static code size, respectively.

Based on the frequency of use data in the histogram, the customization process selects combinations of opgroups as potential candidates for templates (706) and evaluates their cost/benefit (708) in terms of code size/decode complexity, which is quantified in a cost function. The process iteratively selects a set of templates, evaluates their cost/benefit, and ultimately returns a set of custom templates that meet a predetermined optimization criteria (710, 712). As noted above, the criteria may include, for example, a minimized static or dynamic code size or a minimized code size and decode complexity. An example of this criteria is discussed below.

In the current implementation, the problem of determining custom templates is formulated as follows. Let us assume that $T_1, \ldots, T_n$ are the instruction templates that are required to conform with the ArchSpec. Suppose $C_1, \ldots, C_m$ are distinct combinations of operation groups occurring in the program. Let the width of each combination be $w_i$ and its frequency of occurrence be $f_i$. Also, in case of unoptimized assembly, suppose each combination $C_i$ maps to an initial template $T_i$ with width $v_i$. Assuming that variable length encoding is not used for the template selection field, the initial size of the program is, $$W = \sum_{i=1}^{m} f_i \cdot (v_i + \lceil \log_2 n \rceil)$$

Now suppose we include $C_i$ as a custom template. This is taken to be in addition to the initial set of templates since those must be retained to cover other possible concurrency relations of the machine as specified in the ArchSpec. The additional template has a smaller width $w_i$ but it increases the size of the template selection field (and hence the decode logic). The other significant increase in decode cost is due to the fact that now the same operation may be represented in two different ways in the instruction format and hence the instruction bits from these two positions would have to be multiplexed based on the template selected. This cost may be partially or completely reduced by performing affinity allocation as discussed above.

If $X_i$ represents a 1/0 variable denoting whether combination $C_i$ is included or not, the optimized length of the program is denoted by, $$W_{cust} = \sum_{i=1}^{m} f_i \cdot \left(X_i \cdot w_i + (1 - X_i) \cdot v_i + \lceil \log_2(n + \sum X_i) \rceil\right)$$

$$= \sum_{i=1}^{m} f_i \cdot \left(v_i - X_i \cdot (v_i - w_i) + \lceil \log_2(n + \sum X_i) \rceil\right)$$

It is clear that we should customize all those operation group combinations into additional templates that provide the largest weighted benefit until the cost of encoding additional templates and their decoding cost outweigh the total benefits. One possible strategy is to pick the k most beneficial combinations where k is a small fixed number (e.g. k<16). The decode complexity directly impacts chip area needed for decode logic. With an increase in the number of templates, the complexity of the decode logic tends to grow, unless affinity constraints are used to align operation group occurrences from different templates to the same template slots. The chip area occupied by selection logic may be quantified as another component of the cost function.

7.12 Variable Length Field Encodings

Variable length field encoding is an important technique for reducing the overall instruction format bit length. The simplest use of variable length fields is in encoding a steering field that selects one of a set of exclusive fields of differing lengths. For example, the instruction formats have an opgroup steering field to select one of many opgroups available within a single issue slot. Suppose we have 32 opgroups available within a particular issue slot, and that the opgroups' encodings require lengths from 12 to 29 bits. With fixed-length encodings, we require an additional 5 bits to encode the opgroup selection, bringing the overall size of the issue slot to 34 bits. Using a variable-length encoding, we can allocate short encodings to opgroups having the greatest overall width, while using longer encodings for opgroups having smaller width. Provided there is enough "slack" in the shorter opgroups to accommodate longer encodings, the overall bit requirement can be reduced significantly. In our example, we may be able to achieve a 30 bit encoding for the issue slot.

One approach to designing variable-length encodings uses entropy coding, and in particular, a variant of Huffman encoding. Entropy coding is a coding technique typically used for data compression where an input symbol of some input length in bits is converted to a variable length code, with potentially a different length depending on the frequency of occurrence of the input symbol. Entropy coding assigns shorter codes to symbols that occur more frequently and assigns longer codes to less frequent codes such that the total space consumed of the coded symbols is less than that of the input symbols.

Let F be a set of exclusive bit fields, and let $w_i$ denote the bit length of field $i \in F$. An encoding for the steering field for F is represented as a labeled binary tree, where each element of F is a tree leaf. The edge labels (zero or one) on the path from the root to a leaf i denotes the binary code for selecting i. A fixed-length steering code is represented by a balanced tree in which every leaf is at the same depth. Variable-length encodings are represented by asymmetric trees.

For a tree T representing a code for F, we define $d_T(x)$ to be the depth of x, i.e., the code length for choice x. The total cost of encoding a choice x is the sum of the bit requirement for x and the code length for x:

$$cost_T(x) = d_T(x) + W(x)$$

The overall cost for encoding the set of fields F together with its steering field is equal to the worst-case single field cost:

$$C(T) = \max_{x \in \Im}\{cost_T(x)\}$$

The goal is to find a code T of minimal cost. This problem is solved by the algorithm shown below:

| Huffman (Set C, Weights W) |
| --- |
| 1:      N = \|C\|; |
| 2:      //insert elements of C into priority queue |
| 3:      for x ∈ C do |
| 4:          enqueue (x, Q); |
| 5:      endif |
| 6:      for i = 1 to n−1 do |
| 7:          z - new node; |
| 8:          x - extract_min (Q); |
| 9:          y - extract_min (Q); |
| 10:        z.left = x; z.right = y; |
| 11:        W(z) = max {W(x), W(y)} + 1; |
| 12:        enqueue (z,Q); |
| 13:      endif |
| 14:      return extract_min (Q); |

7.13 Extracting an Abstract ISA Specification from a Concrete ISA Specification As outlined above, the iformat design process may be used to generate an instruction format specification from a datapath specification and an abstract ISA specification. In an alternative design scenario, the iformat design process may be used to generate optimized concrete ISA specification programmatically from an initial concrete ISA specification and a list of frequently occurring combinations of operation group occurrences and ILP constraints. The initial concrete ISA specification includes an instruction format specification and a register file specification and mapping. The register file specification and mapping provides: 1) the register file types; 2) the number of registers in each file; and 3) a correspondence between each type of operand instruction field in the instruction format and a register file.

In order to optimize the instruction format in this scenario (and thereby the concrete ISA specification), the iformat design process programmatically extracts an abstract ISA specification from the concrete ISA specification (see step 554 in FIG. 12). it then proceeds to generate the bit allocation problem specification, and allocate bit positions programmatically as explained in detail above. The operation group occurrences and ILP constraints (e.g., concurrency sets of the operation group occurrences) may be provided as input from the user (e.g., starting with a custom template specification at block 556 in FIG. 12), or may be generated programmatically from operation issue statistics 568 in step 569 shown in FIG. 12 and described above.

Given a Concrete ISA Specification, this step extracts the information corresponding to an Abstract ISA Specification. The Instruction Format, which is part of the Concrete ISA Specification, consists of a set on Instruction Templates, each of which specifies sets of mutually exclusive opcodes that can be issued in parallel. From this information one can define the corresponding Operation Group Occurrences and a Concurrency Set consisting of these Operation Group Occurrences. All of the Instruction Templates, together, define the opcode repertoire, the Operation Groups and the ILP specification that form part of the Abstract ISA Specification. The Instruction Format Specification directly provides the I/O Format for each opcode as needed by the Abstract ISA Specification. The Register File Specification in the Concrete ISA Specification directly provides the Register File Specification that completes the Abstract ISA Specification.

8.0 Overview of Control Path Design System

The control path design system is a programmatic system that extracts values for control path parameters from an instruction format and data path specification and creates a control path specification in a hardware description language, such as AIR.

Figure 19:
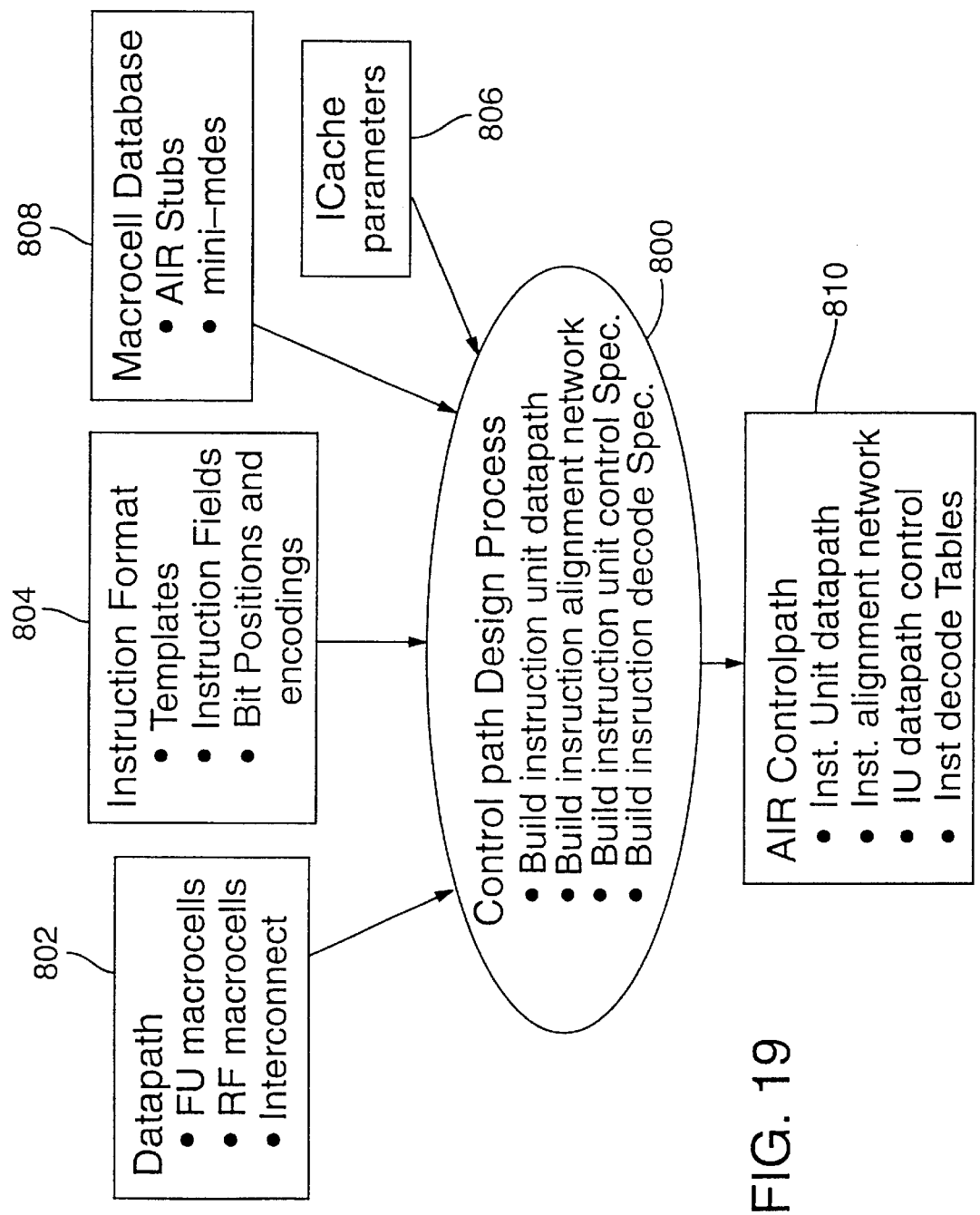
FIG. 19 illustrates a control path design system.

FIG. 19 is a block diagram illustrating a general overview of the control path design system. The inputs to the control path design synthesizer (CP synthesizer) 800 include a data path specification 802, an instruction format specification 804, and ICache parameters 806. The CP synthesizer selects the hardware components for the control path design from a macrocell database 808 that includes generic macrocells for a sequencer, registers, multiplexors, wiring buses, etc. in AIR format. The macrocell database also includes a machine description of certain macrocells, referred to as mini MDES. The mini-mdes of a functional unit macrocell, for example, includes the functional unit opcode repertoire (i.e., the opcodes executable by the functional unit and their binary encoding), a latency specification, internal resource usage, and input/output port usage.

Implemented as a set of program routines, the CP synthesizer extracts parameters from the data path, the instruction format, and instruction cache specifications and synthesizes the control path including the IUdatapath, control logic for controlling the IUdatapath, and decode logic for decoding the instructions in the instruction register.

The CP synthesizer builds the IUdatapath based on the instruction width requirements extracted from the instruction format specification. It instantiates macrocells in the IUdatapath by computing their parameters from the maximum and minimum instruction sizes and the instruction cache access time.

It then constructs the control logic for controlling the IUdatapath based on the computed IUdatapath parameters and the ICache parameters. The ICache parameters provide basic information about the instruction cache needed to construct the instruction fetch logic. These parameters include the cache access time and the width of the instruction packet, which is the unit of cache access.

The control path design process synthesizes the decode logic for decoding the instruction in the instruction register by scanning the instruction format and data path control ports. It also determines the interconnect between the bit positions in the instruction register and the control ports in the data path.

The CP synthesizer is programmed to optimize the design of the instruction unit for a pre-determined control path protocol. As part of this process, it may optimize the instruction pipeline (the IUdatapath) by selecting macrocells that achieve a desired instruction issue rate, such as one instruction to the decode logic per cycle, and by minimizing the area occupied by the macrocells. It also minimizes the area of the control logic, such as the area that the IU control logic and decode logic occupies.

The output of the control path design process is a data structure that specifies the control path hardware design in the AIR format 810. The AIR representation of the IUdatapath includes the macrocells for each of the components in the IUdatapth. This may include, for example, a prefetch buffer for covering the latency of sequential instruction fetching, and other registers used to store instructions before issuing them to the decode logic. The AIR representation includes a macrocell representing the sequencer and the control logic specification (e.g., a synthesizable behavioral description, control logic tables, etc.) representing the control logic for each of the components in the IUdatapath. Finally, the AIR representation includes a decode logic specification (e.g., decode logic tables) representing the instruction decode logic and the interconnection of this decode logic between the instruction register and the control ports enumerated in the data path specification. Conventional synthesis tools may be used to generate the physical logic (such as a PLA, ROM or discrete logic gates) from the control and decode logic specifications.

8.1 The Relationship between the Control Path and the Control Ports in the Data Path Before describing aspects of the control path in more detail, it is instructive to consider the state of the processor design before the CP synthesizer is executed. As noted above, one input of the control path design process is the data path specification. Provided in the AIR format, the data path input 802 specifies instances of the functional unit macrocells and register file macrocells in the data path. It also specifies instances of the macrocells representing the wiring that interconnects the read/write data ports of the register files with input and output data ports of the functional units. At this phase in the design of the processor, the control ports in the data path are enumerated, but are not connected to other components. For example, the opcode input of the functional units and the address inputs of the register files are enumerated, but are not connected to the control path hardware.

FIG. 20 illustrates an example of a processor design, showing the relationship between the data path (in dashed box 820) and the control path. The data path includes a register file instance, gpr, a functional unit (FU) cell instance, and an interconnect between the gpr and functional unit. The interconnect comprises data buses 822–830 that carry data between the FU and gpr, a multiplexor 832 that selects between input sources (e.g., gpr and literal pseudo-register Sext), and tri-state buffer 834 that drives output data from the FU onto a data bus 830. The data read ports of the gpr, dr0 and dr1, provide data to the data input ports of the FU, i0 and i1, via buses 822–828 and multiplexor 832. The output port of the FU, o0, provides data to the data write port, dw0, via tri-state buffer 834 and data bus 830.

The control ports that are enumerated, yet remain unconnected before the control path design, include the read and write address ports of the gpr, ar0, ar1 and aw0, and the opcode input port, op, of the FU. Some data ports in a FU or gpr may map to more than one data port in the gpr or FU, respectively. This sharing may be controlled via control ports of a multiplexor 832 or tri-state buffer 834.

Also, a control port of the gpr or FU may map to more than one bit position in the instruction. This type of sharing may be controlled via control ports of a multiplexor 836, for example. However, the hardware logic to control this sharing is left to be specified in the control path design process.

The mapping between the instruction fields in an instruction and the control ports in the data path is specified in the instruction format specification. The datapath specification enumerates the control ports in the data path and provides the information needed to map these control ports to the instruction fields. The instruction format specification specifies the specific bit positions and encodings of the fields in the instruction fields.

The following sections describe in more detail how an implementation of the control path design process generates the control path.

8.2 The Control Path Protocol

The control path design process synthesizes a specific control path design based on a predefined control path protocol. In the current implementation, the control path protocol defines a method for fetching instructions from an instruction cache and dispatching them sequentially to an instruction register that interfaces with the processor's decode logic. It also defines the type of macrocells that the control path will be constructed from and enumerates their parameters. The CP synthesizer program then selects the macrocells and computes specific values for their parameters based on information extracted from the instruction format and datapath.

The example in FIG. 20 helps to illustrate the control path protocol used in the current implementation. It is important to note that a number of design choices are made in defining the protocol, and these design choices will vary with the implementation. The illustrated protocol represents only one possible example.

To get a general understanding of the control path protocol, consider the flow of an instruction through the control path in FIG. 20. The sequencer 900 initiates the fetching of instructions into the IUdatapath. The MAR 902 in the sequencer stores the address of the next instruction to be fetched from the instruction cache 904. Using the contents of the MAR, the sequencer initiates the fetching of instructions from the cache for both a sequential mode and a branch mode.

In order to specify values for the widths of components in the IUdatapath, the CP synthesizer extracts information about the instruction widths from the instruction format specification. The protocol specifies the types of parameters that need to be extracted from this information.

The parameters extracted from the instruction format include:

$Q_1$ // quantum (bytes) (greatest common denominator of all possible instruction widths, fetch widths)
$W_{imin}$ // minimum instruction width (quanta)
$W_{imax}$ // maximum instruction width (quanta)

The parameter, $Q_1$, is a unit of data used to express the size of instruction and fetch widths in an integer multiple of bytes and is referred to as a quantum. This parameter is not critical to the invention, but it does tend to simplify the design of other components such as the alignment network because it is easier to control shifting in units of quanta rather than individual bits. The parameters to be extracted also include, $W_{imin}$, the minimum instruction width in quanta, and $W_{imax}$, the maximum instruction width in quanta.

The protocol also defines parameters relating to the instruction cache (ICache) as follows:

$W_A$ // instruction packet width (quanta) ($W_A \geq W_{imax}$, $W_A = 2^m$)
$W_L$ // cache line size (quanta) ($W_L \geq W_A$, $W_L = 2^n$)
$T_A$ // cache access time (cycles)

The instruction packet defines the amount of data that the control path fetches from the ICache with each fetch operation. In the protocol of the current implementation, the size of the instruction packet is defined to be at least as large as the widest instruction and is expressed as a number of quanta that must be a power of two. However, the packet need not be that large if the widest instruction is infrequent. In instruction format designs where the widest instruction is infrequent, the size of the control path can be reduced because the extra cycles needed to fetch instructions larger than the packet size will rarely be incurred. The computation of the packet size can be optimized by finding the smallest packet size that will provide a desired fetch performance for a particular application or a set of application programs.

The protocol specifies the method for fetching instructions from the ICache and the types of components in the IUdatapath. In the current implementation, the protocol includes a prefetch packet buffer, an On Deck Register (OnDeckReg or ODR) and an instruction register (IR). As shown in FIG. 20, the sequencer 900 is connected to the instruction cache 904 via control lines 906. These control lines include ICache address lines used to specify the next instruction to be fetched into the IUdatapath. Through these control lines, the sequencer 900 selects the packet and initiates the transfer of each packet of instructions from the instruction cache to a First-In, First-Out (FIFO) buffer 908.

The cache access time $T_A$ is an ICache parameter provided as input to the control path design process. It is the time taken in cycles between the point when an address is presented to the address port of the ICache and when the corresponding data is available on its data port for reading. The cache line size parameter defines the width of a cache line in quanta. The control path design process selects a cache line size that is greater or equal to the packet size and is expressed as a number of quanta that must be a power of two. Although not necessary, this implies that in our current implementation a cache line contains an integral number of instruction packets.

The IUdatapath begins at the ICache and flows into the FIFO 908 via data lines 910. The number of data lines is defined as the instruction packet size in quanta. The FIFO 908 temporarily stores packets of instructions on their way to the instruction register 912. The objective in designing the FIFO is to make it deep enough to cover the latency of sequential instruction fetching from the instruction cache. The control path must be able to issue instructions to the instruction register to satisfy a desired performance criterion. In this case, the protocol defines the performance criterion as a rate of one instruction issue per clock cycle of the processor. Note, one instruction may contain several operations that are issued concurrently.

The IU Control 903 is responsible for controlling the flow of instruction packets from the FIFO 908 to a register that holds the next packet of instructions to be issued to the instruction register, called the ODR 914. In the example shown in FIG. 20, the IU Control 903 controls the flow of instruction packets from the FIFO to the ODR 914 through control lines 916 to the FIFO 908, and control lines 918 to a multiplexor 920. The control lines 916 from the IU Control to the FIFO are used to accept new instruction packets from the ICache and to instruct the FIFO to transfer the next instruction packet to the ODR via data lines 922 from the FIFO to the multiplexor 920 and data lines 924 from the multiplexor to the ODR. As explained above, the size of this data path is defined via the instruction packet size parameter.

The IU Control 903 issues control signals 918 to the multiplexor 920 to select an instruction packet either from the FIFO 908 or directly from the instruction cache 904. The data path 926 is useful in cases where the FIFO has been cleared, such as when the processor has executed a branch instruction and needs to load the instruction packet containing the target of the branch into the ODR as quickly as possible.

The size of the FIFO (in packets) is another parameter in the control path protocol. The size of the FIFO depends upon the maximum and minimum instruction widths of instructions in the instruction format as well as the ICache access time. The width of an instruction may be as large as the maximum instruction width, and may be as small as the minimum instruction width in the instruction format specification. This constraint is merely a design choice in the current implementation, and is not necessary. The minimum instruction width plays an important role in determining the size of the FIFO because, in an extreme case, the ODR may be filled entirely with instructions of minimum size. In this case, the FIFO needs to be large enough to be filled with instruction packets already in flight from the ICaches as each of the instructions is issued sequentially from the ODR. The maximum instruction width also has an impact on the size of the FIFO because, in the opposite extreme, the ODR may contain a single instruction. In this case, the FIFO must be able to supply an instruction packet to the ODR at the desired performance rate, namely, once per clock cycle, while hiding the ICache access latency.

The parameters associated with the instruction fetch process include the size of the FIFO and the branch latency. These parameters are computed as shown below. The necessary FIFO size can be computed based on IUdatapath parameters and the instruction fetch policy. In case the policy does not allow for stalling the processor due to interrupts, then the FIFO size can be reduced further.

$N_{FIFO}$ // size of prefetch FIFO (packets) ($N_{FIFO} = \lfloor T_A * W_{imax}/W_A \rfloor$)
$T_B$ // branch latency ($T_B = T_{dpath} + T_A + 1$)

The IU Control 903 controls the transfer of each instruction from the ODR 914 to the instruction register 912. The IU Control provides control signals via control lines 927 to the ODR, which in turn transfers the next instruction to the instruction register 912 via data lines 928 and an alignment network 930. The alignment network is responsible for ensuring that each instruction is left aligned in the instruction register 912. In the example shown in FIG. 20, the alignment network is comprised of a multiplexor for each quantum in the instruction register. Each of these multiplexors indicates where the next quantum of data will originate from in the ODR 914 or the IR 912. The IU Control 903 provides multiplexor select controls via control lines 932 based on parameters fed back from the decode logic via control lines 934.

Figure 21:
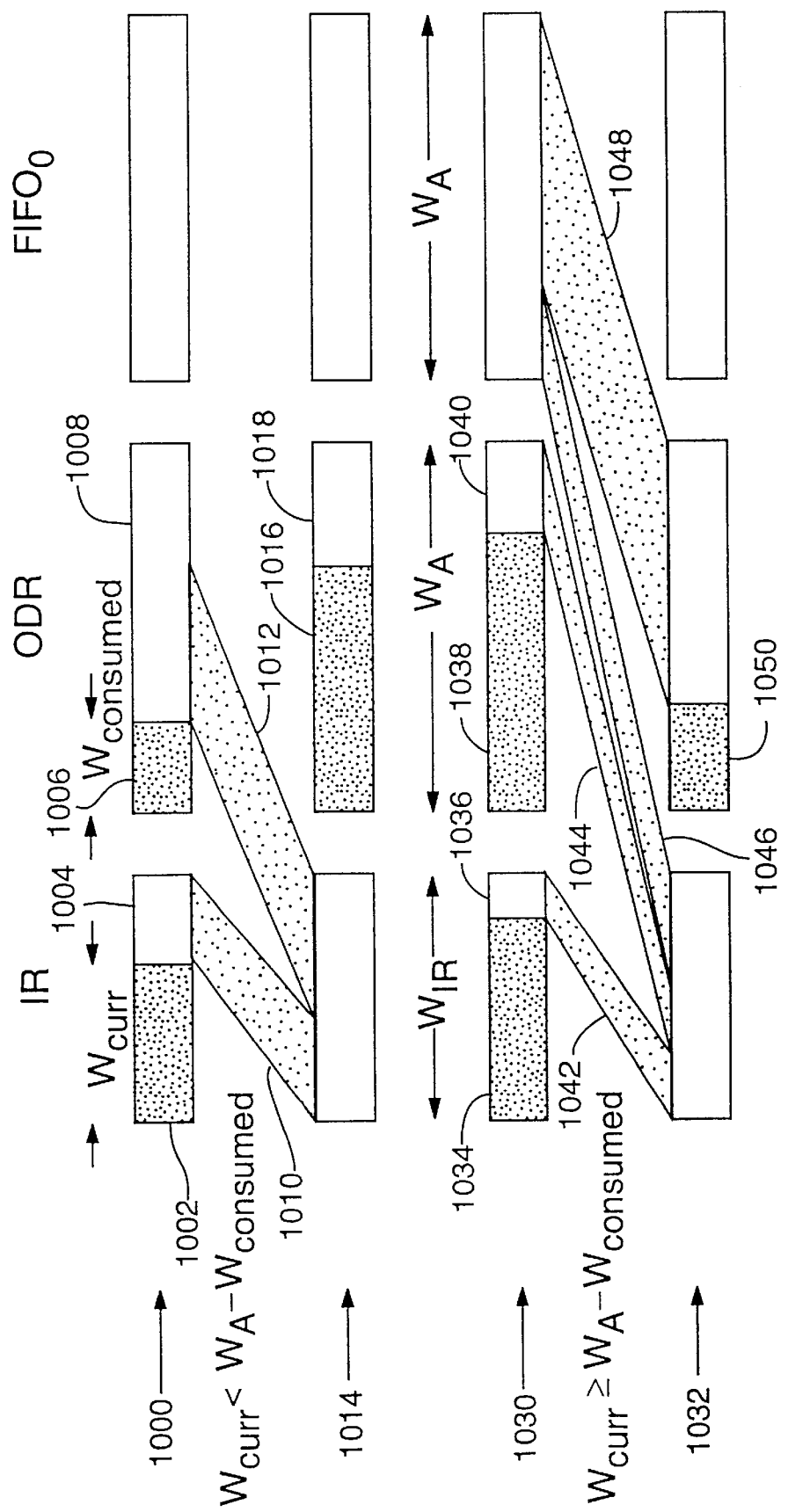
FIG. 21 illustrates the operation of a shift network for the control path design of FIG. 20 for sequential instruction fetching.
Figure 22:
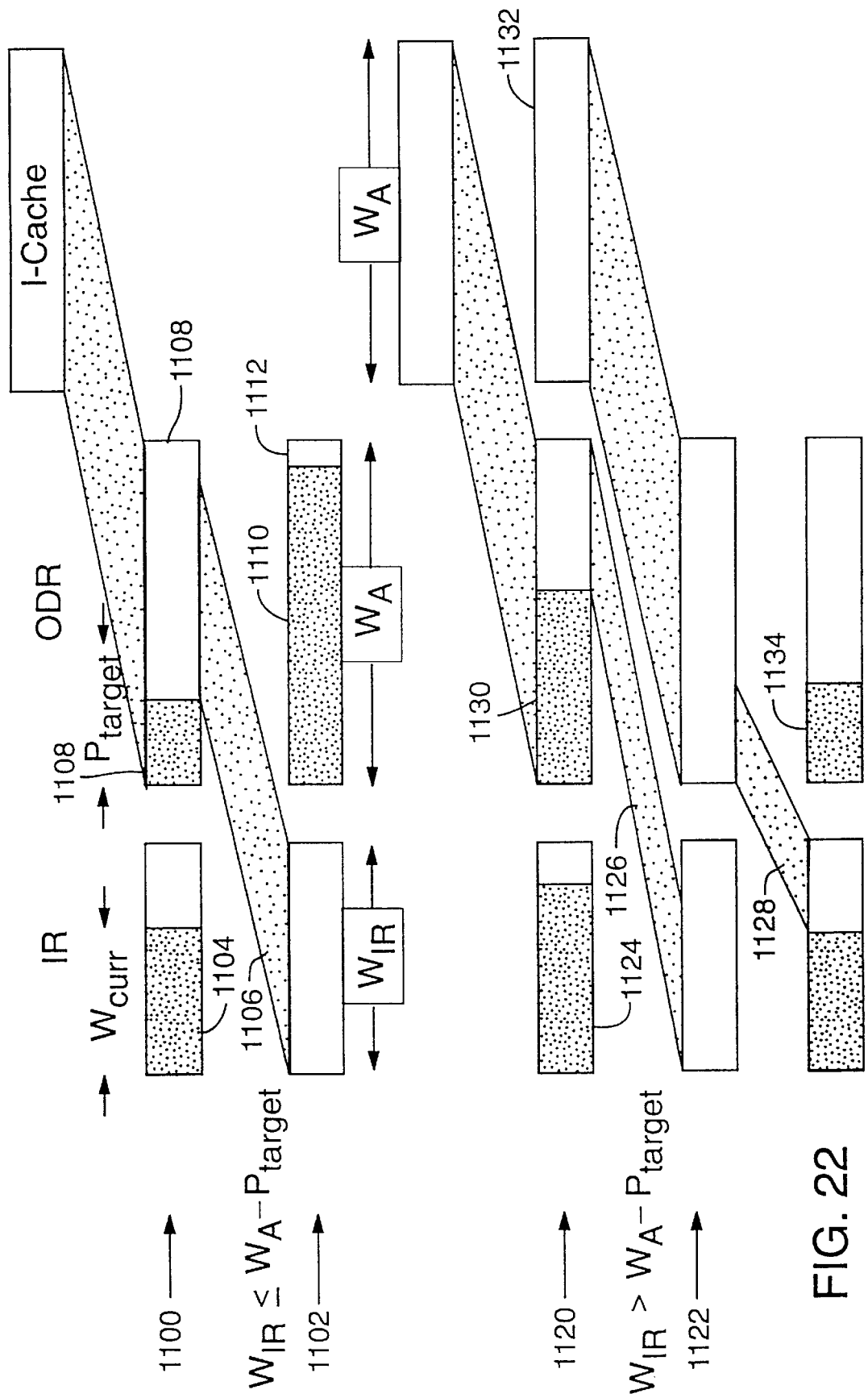
FIG. 22 illustrates the operation of the shift network for branch target instruction fetching.

The control path protocol outlines the operation of the alignment network. There are two principle modes of operation that the protocol of the alignment network must address: sequential instruction fetch mode; and branch target instruction fetch mode. FIG. 21 illustrates the operation of the shift network protocol for sequential instruction fetching, and FIG. 22 illustrates the operation of the shift network for branch target instruction fetching. Before describing the operation of the shift network in more detail, we begin by describing the relevant parameters associated with the shift network. The parameters in the current implementation are as follows:

$W_{IR}$ // width of instruction register (quanta) ($W_{IR} = W_{imax}$)
$W_{curr}$ // width of current instruction (quanta)
$W_{consumed}$ // width of already used part in ODR (quanta)
$P_{target}$ // position of branch target in ODR (quanta)

As noted previously, the shift network controls where each bit of data in the instruction register comes from. This data may come from the IR, the ODR, or in some cases, from both the ODR and the top instruction packet in the FIFO. With each cycle, the shift network ensures that the next instruction to be executed is left aligned in the instruction register. In doing so, it may shift unused bits within the instruction register itself, it may transfer bits from the ODR, and finally it may also transfer bits from the top of the FIFO. In particular, if the instruction register contains unused bits from the previous cycle representing part of the next instruction, it shifts these unused bits over to the left, and then fills in the rest of the instruction register with the next group of bits sufficient to fully load the register.

As noted above, the FIFO transfers instructions to the OnDeck register in packets. A packet remains in the ODR, and is incrementally consumed as the alignment network transfers portions of the bits in the ODR into the instruction register. The IU Control supplies control signals via control lines 936 to the instruction register 912 to issue the current instruction to the decode logic. The PC 938 in the sequencer specifies the memory address of the instruction currently being issued for execution.

8.2.1 The Alignment Network Protocol

FIG. 21 illustrates the two principle cases that occur in the shift network protocol for sequential instruction fetching. The first case is where the width of the current instruction in the instruction register, $W_{curr}$, is less than the remaining, unconsumed portion of the ODR, $W_A - W_{consumed}$. FIG. 21 illustrates an example of this scenario by showing the transition of the state of the instruction register, ODR, and FIFO from one cycle to the next. In the first cycle 1000, the current instruction occupies the left-most section (see section 1002) of the instruction register, while a part of the next instruction occupies the remaining section 1004. Also, a portion 1006 of the ODR is already consumed, and the remaining section 1008 contains valid data. In this case, the shift network shifts the unused portion 1004 to the left of the instruction register (see section 1010 representing the transfer of the bits from the right of the instruction register to the left-most position). In addition, the shift network transfers enough bits to fill in the remainder of the instruction register (see section 1012) from the left-most valid data portion 1008 in the ODR.

In the next cycle 1014, the instruction register contains the current instruction, aligned to the left, and a portion of the next instruction. The length of the current instruction becomes known only after decoding. The ODR contains a consumed portion 1016, which includes portions that the shift network already transferred in previous cycles. It also contains a remaining valid data portion 1018. The FIFO remains unchanged in this case.

The bottom diagrams 1030, 1032 in FIG. 21 illustrate the case where the width of the current instruction is greater than the valid data portion ($W_A - W_{consumed}$). In this case, the current instruction occupies a relatively large section 1034 of the instruction register and the remaining portion 1036 contains part of the next instruction. The consumed portion 1038 of the ODR is relatively large compared to the remaining valid data portion 1040. As a result, the shift register needs to transfer data from three sources: the unused portion 1036 of the instruction register (shown being transferred in graphic 1042), the entire valid data portion remaining in the ODR 1040 (shown being transferred in graphic 1044), and finally, a portion in the top packet of the FIFO that is needed to fill in the rest of the instruction register (shown being transferred in graphic 1046). Since the ODR is fully consumed, the top packet of the FIFO needs to be advanced to the ODR. However, this example shows that a portion of the packet in the top of the FIFO is already consumed when the packet is transferred into the ODR (see section 1048 being transferred into the ODR), which leaves a consumed portion 1050 in the OnDeck register.

FIG. 22 illustrates the two principle cases that occur in the shift network protocol for branch target instruction fetching. When the processor executes a branch instruction, the control path should load the instruction containing the target of the branch as quickly as possible. There are a variety of schemes to accomplish this objective. Even within the specific protocol described and illustrated thus far, there are alternative ways to define the target fetch operation. In the example shown in FIG. 22, the target of a branch is allowed to reside anywhere in an instruction packet. This may result in the case where the next portion of valid data to be loaded into the instruction register (the target data) spans two instruction packets. One way to avoid this case is to require the application program compiler to align branch targets at the beginning of instruction packets. However, the example shown in FIG. 22 is more general and handles the case where the target data spans instruction packets.

The top diagrams 1100, 1102 illustrate the case where the target data is entirely within an instruction packet. This case is defined as a packet where the width of the instruction register, $W_{IR}$, is less than or equal to the width of a packet, $W_A$, less the position of the target instruction relative to the start of the packet, $P_{target}$. In the first cycle 1100, the current instruction occupies the left-most portion 1104 of the instruction register. In the shift operation, the entire contents of the instruction register are considered invalid. As such, the shift network fills the instruction register with new bits sufficient to fill it entirely (as shown in graphic 1106. The starting bit in the ODR for this shift operation is identified by $P_{target}$ (see invalid portion 1108 in the ODR, which has a width $P_{target}$). Since the width of the instruction register plus $P_{target}$ is still less than or equal to $W_A$, all of the new data comes from the ODR. After the shift, the consumed portion of the ODR occupies the left-most portion 1110 and some valid data for the next instruction may reside in the remaining portion 1112.

The bottom two diagrams 1120, 1122 show the case where the target data spans an instruction packet. This case is defined as a packet where the width of the instruction register, $W_{IR}$, is greater than the width of a packet, $W_A$, less the width of the offset to the target instruction inside the packet, $P_{target}$. In the first diagram 1120, the current instruction occupies the left-most portion 1124 of the instruction register. In the shift operation, the entire contents of the instruction register are considered invalid. As such, the shift network fills the instruction register with new bits sufficient to fill it entirely, but to do so, it must take bits from the ODR and the next packet from the ICache (as shown in graphics 1126 and 1128). The starting bit in the ODR for this shift operation is identified by $P_{target}$ (see invalid portion 1130 in the ODR, which has a width $P_{target}$). Since the width of the instruction register plus $P_{target}$ is greater than $W_A$, some of the new data comes from the ODR and some comes from the next packet from the ICache. To get the target data into the instruction register, the control path may require two cycles. The shift network transfers valid bits from the ODR (as identified by $P_{target}$) to the IR and transfers the next packet (1132) from the ICache into the ODR. It then transfers valid bits from the ODR (1128) sufficient to fill the IR. This leaves a portion of the bits in the ODR 1134 ($W_{IR}-(W_A-P_{target})$) invalid.

The shift network protocol outlined above specifies how the IU Control logic controls the select ports of the multiplexors in the shift network in order to make the selection of the appropriate quanta in the IR, ODR, and FIFO. Further details about the synthesis of the shift network are provided below.

The final aspect of the control path protocol is the decode logic. Referring again to the example in FIG. 20, the decode logic (e.g., decode units 940–944) interfaces with the instruction register, decodes the current instruction, and dispatches control signals to the control ports in the data path. The CP synthesizer computes decode tables from the instruction format design as explained below.

8.3 Control Path Design

Figure 23:
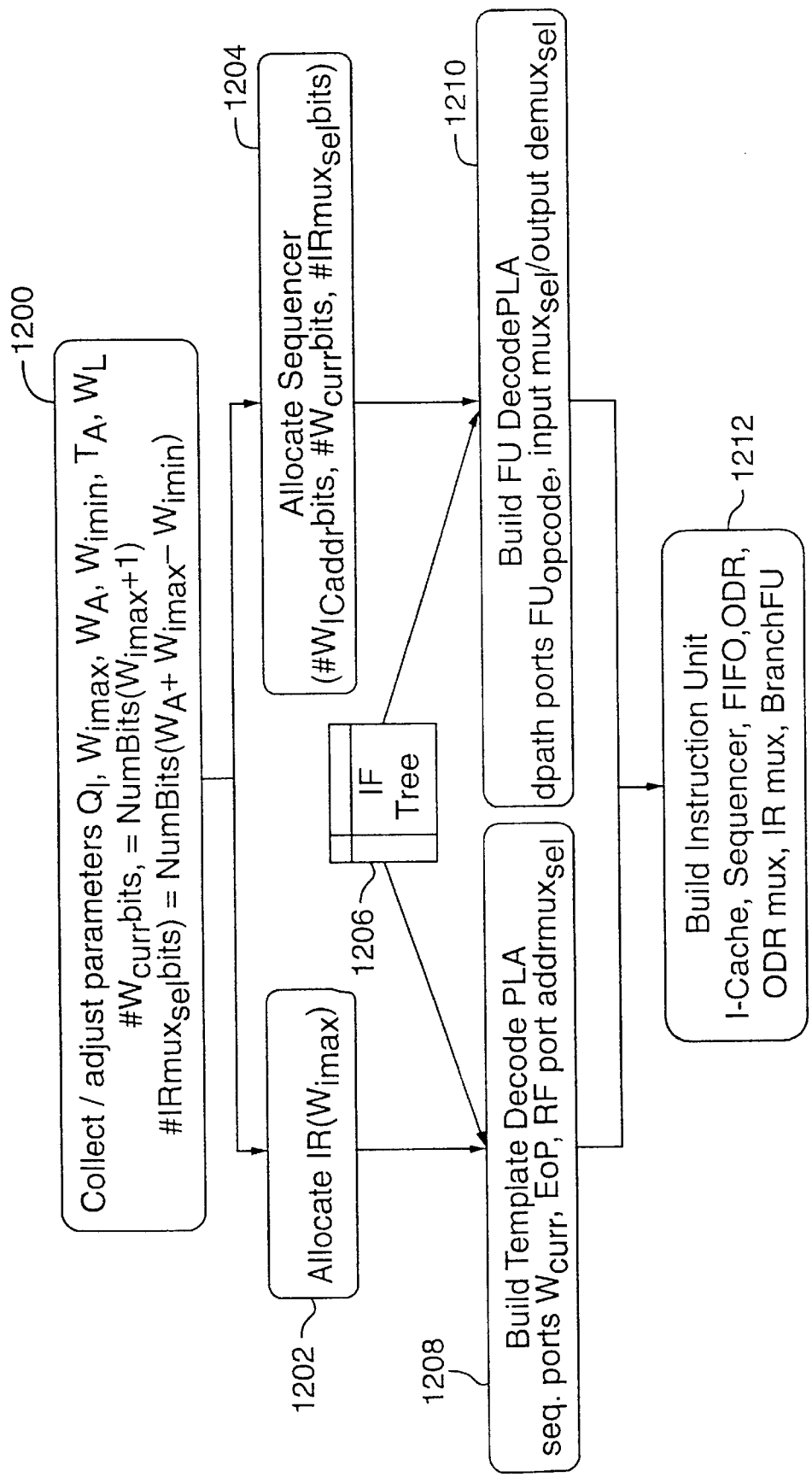
FIG. 23 is a flow diagram illustrating the operation of a software implemented control path design system.

FIG. 23 is a flow diagram illustrating the operation of a software implementation of the CP synthesizer illustrated in FIG. 19. The CP synthesizer is implemented in the C++ programming language. While the software may be ported to a variety of computer architectures, the current implementation executes on a PA-RISC workstation or server running under the HP-UX 10.20 operating system. The functions of the CP synthesizer software illustrated in FIG. 23 are described in more detail below.

8.3.1 Collecting Parameter Values

The CP synthesizer begins by collecting and adjusting input parameters, $Q_I$, $W_{imax}$, $W_{imin}$, $W_A$, $T_A$, and $W_L$ as shown in step 1200. It calculates $Q_I$ as the greatest common denominator of all possible instruction widths and fetch widths. It extracts $W_{imax}$, $W_{imin}$ from the instruction format, and derives $W_A$ and possibly adjusts $W_L$ as defined above. The ICache access time $T_A$ is one of the ICache input parameters to the control path design.

The CP synthesizer computes #$W_{curr}$bits, a parameter that defines the number of bits needed to represent the length of the current instruction in quanta. The length of the current instruction may be zero or as large as $W_{imax}$. Therefore, $W_{curr}$bits is computed as $\lceil \log_2(W_{imax}+1) \rceil$. The IU Control receives $W_{curr}$ from the decode logic (See lines 934 in FIG. 20) and uses it to compute the appropriate shift amount for the shift and align network. The sequencer also uses this number to update the PC with the address of the next instruction to execute. The CP synthesizer determines the number of instruction register multiplexor selection bits #IRmux$_{sel}$bits as shown in step 1200, from the following expression: #IRmux$_{sel}$bits=$\lceil \log_2(W_A+W_{imax}-W_{imin}) \rceil$ in bits. This is the number of bits needed to select between ($W_A+W_{imax}-W_{imin}$) input quanta choices for each quantum multiplexor placed before the instruction register.

8.3.2 Allocating the Instruction Register and Sequencer

Next, the CP synthesizer selects an instruction register from the macrocell database as shown in step 1202, and sets the width of the instruction register equal to $W_{imax}$.

The CP synthesizer also selects a sequencer from the macrocell database in step 1204. The sequencer includes logic to process the branch addressing, logic to handle interrupts and exceptions and logic to issue instruction fetching from the ICache. The choice of the sequencer depends on the architectural requirements specified during the design of the datapath and the instruction format, i.e., whether the processor needs to handle interrupts and exceptions, branch prediction, and control and data speculation. It is independent of the design of the instruction unit data path itself. Therefore, we assume that we have a set of predesigned sequencer macrocells available in the macrocell database from which one is selected that matches the architectural parameters of the datapath and the instruction format.

8.3.3 Building the Instruction Decode Logic

The CP synthesizer generates decode logic from the instruction format specification, which is provided in the IF tree 1206. This section describes how the CP synthesizer generates the decide tables programmatically.

The CP synthesizer generates the decode logic by creating decode tables that specify the inputs and outputs of the decode logic. In building a decode table, the CP synthesizer specifies the input bit positions in the instruction register, the input values for these bit positions, the corresponding control ports, and finally, the output values to be provided at these control ports in response to the input values. There are two general cases: 1) creating decode table entries for select fields (e.g., bits that control multiplexors and tri-state drivers); and 2) creating decode table entries for logic that converts opcodes. In the first case, the CP synthesizer generates the address selection logic needed to map bit positions in the instruction register with shared address control ports in the data path. It also generates the appropriate select values based on the select field encoding in the instruction template. In the second case, the CP synthesizer generates the opcode input values needed to select a particular opcode in a functional unit based on the opcode field encoding in the instruction template. Both of these cases are described further below.

The implementation divides the decode logic into two types of components: the template decode logic (synthesized in step 1208) and the FU decode logic, one per FU macrocell (synthesized in step 1210). The template decode logic is responsible for decoding all the information that is relevant for the entire instruction including the template width, the end-of-packet bit and the position of register file address port bits. The FU decode logic decodes all the information that is relevant for one FU macrocell including its opcode and the select ports of the data multiplexors and tri-state drivers. In step 1208, the CP synthesizer constructs a decode table for a template decode programmable logic array (PLA). As shown in the example FIG. 20, the template decode PLA provides information ($W_{curr}$ and EoP parameter values) to the IU Control to drive the instruction shifting network. It converts the template ID into $W_{curr}$ and feeds this information to the IU Control. It also provides the consume to end-of-packet (EoP) bit to the IU Control.

Based on the template ID, the template decoder also generates the mux select inputs in cases where instruction fields from different templates map to the same control ports in the datapath. For example, it computes select values for the mux select ports of register file address port multiplexors (RF port addrmux$_{sel}$; see, e.g., multiplexor 836 in FIG. 20).

To illustrate decode logic generation for select fields, consider the example of the RF address port multiplexors. The CP synthesizer builds a decode table for the address port multiplexors by traversing the IF tree to find the template specifier fields. The template specifier in the instruction identifies the template to the decode logic. This is significant because a number of different bit positions may map to the same register file address port depending on the instruction template. The Table 1 shows an example of this scenario.

TABLE 1

| Template | Bit Positions | Mux Inputs | Mux select |
|---|---|---|---|
| T1 | 0–3 | I1 | 00 |
| T2 | 10–13 | I2 | 01 |
| T3 | 1–3, 10 | I3 | 10 |
| T4 | 10–13 | I4 | 11 |

In the example shown above, four different sets of bit positions map to the same register file address ports, depending on the instruction template. The decode logic, therefore, needs to generate the appropriate mux select signal to map the appropriate bit positions in the instruction to the register file address ports depending on the template specifier bits.

For each template, the CP synthesizer traverses the IF tree to the template specifier field and adds the bit encoding to the decode table as an input. It finds the corresponding bit positions from different templates that map to the same register file address ports and assigns them to the input ports of a multiplexor. Finally, it assigns mux select values so that the decode logic instructs the mux to select the appropriate mux inputs depending on the template specifier.

To illustrate decode logic generation for opcode fields, consider an example where the bits used to encode the opcode field in the instruction do not match the number of bits used to encode the opcode on the functional unit macrocell. The CP synthesizer functional unit constructs the FU decode PLA in step 1210 in a similar fashion as the template decode PLA. In particular, it builds a decode table that maps instruction register bits to data path control ports of the functional units in the data path. It traverses the IF tree to find the fields for the FU opcode fields. The CP synthesizer finds the instruction register ports that these fields have been assigned, and maps them to the opcode control ports.

The opcode field in the IF tree identifies the desired operations in an operation group and the corresponding functional unit to the decode logic. The opcode in the instruction field may need to be translated into a different form so that it selects the proper operation in the functional unit. Table 2 shows am example of this scenario.

TABLE 2

| Opcode encoding | FU input |
|---|---|
| 00 | 0000 |
| 01 | 1011 |
| 10 | 1100 |
| 11 | 0010 |

In the above example, the instruction selects one of four different operations to be executed on a given functional unit in the data path. The functional unit, however, supports more operations, and thus, uses a four bit input code to select an operation. In this case, the CP synthesizer generates a decode table for decode logic that will select the proper operation based on the opcode encoding in the instruction register. To accomplish this, it traverses the IF tree to find the opcode field, and the corresponding bit encoding, control port assignment, and bit position for this field. the opcode field in the IF tree is annotated with information that maps a bit encoding in the instruction to a particular input encoding for a functional unit in the data path. The CP synthesizer assigns the inputs of the decode logic to the bit positions of the opcode field, and assigns the outputs of the decode logic to the opcode control ports of the functional unit.

The FU decode logic for the control ports of the muxes and tri-states in the interconnect between the functional units and register files is generated based on the select fields at the 10 set level in the IF tree in a similar fashion as described above for the RF address MUXes.

Once the decode logic tables are created, a variety of conventional logic synthesizer tools may be used to create hardware specific decode logic from the decode tables which is not necessarily restricted to a PLA-based design.

8.3.4 Assembling the Instruction Unit

In step 1212, the CP synthesizer builds the remainder of the instruction unit, including the IUdatapath and the control logic between the IUdatapath and sequencer. In this step, the CP synthesizer allocates the FIFO, ODR, and alignment network by selecting AIR macrocells from the macrocell database and instantiating them. It maps the control ports of these components in the IUdatapath to the control outputs of the IU Control logic. The IU Control logic controls the behavior of the IUdatapath at each cycle by providing specific bit values for each of the control ports of the IUdatapath components. The logic may be specified as a behavioral description of a finite state machine (FSM). From this description, conventional logic synthesis may be used to generate the FSM logic that forms the IUdatapath control logic.

When it allocates the sequencer macrocell, the CP synthesizer allocates the sequencer ports responsible for ICache control and addressing and connects it to the corresponding ICache ports (see, e.g., 906, FIG. 20). The number of address lines depends on $\#W_{ICaddr}$ bits, the number of ICache address bits. The memory address register (MAR) 902 drives the address port of the ICache while a fetch request bit (FReq) generated by the IU Control logic controls when new instruction packet fetches are initiated.

The CP synthesizer allocates the FIFO (908, FIG. 20) by computing the size of the FIFO as described above and constructing a macrocell instance from the macrocell database with $N_{FIFO}$ packet registers of width $W_A$ and a number of control and data ports. The data output of the ICache is connected to the data input of the FIFO. The various FIFO control ports are driven by the corresponding ports of the IU Control logic (916, FIG. 20).

The CP synthesizer also allocates the ODR (914, FIG. 20) by constructing a macrocell instance of a register having a width $W_A$ and having corresponding control and data ports. It synthesizes the ODR's input side multiplexor (920, FIG. 20) by constructing a multiplexor from the macrocell database having a width $W_A$. The two inputs of the multiplexor 920 are connected to the FIFO and the ICache respectively. The selection control and the ODR load control ports are driven by the corresponding ports from the IU Control logic (918, 926, FIG. 20).

The CP synthesizer additionally synthesizes the branch FU control and address lines to interconnect the branch control ports of the sequencer with control ports of the branch FU.

Figure 24:
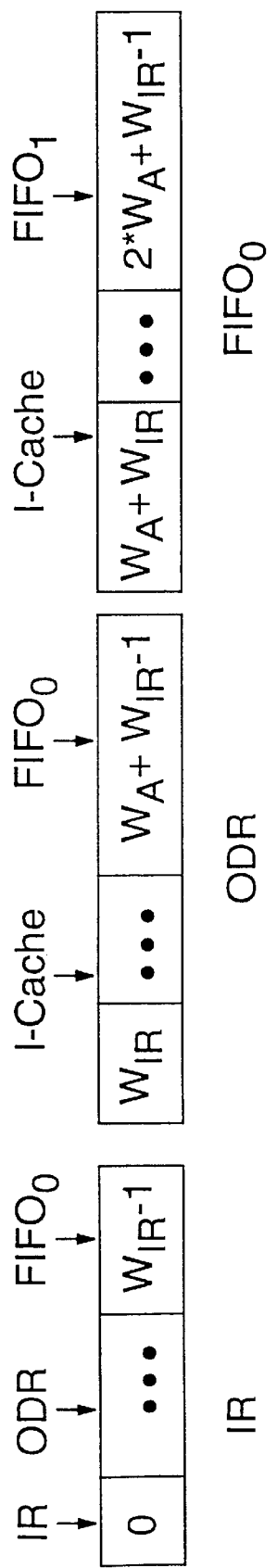
FIG. 24 is a diagram illustrating aspects of the design of an instruction register shift network.

It further allocates the instruction register shift network (930, FIG. 20), and connects its control ports to the IU Control logic (932, FIG. 20). FIG. 24 illustrates aspects of the IUdatapath to illustrate how the CP synthesizer allocates the shift network. In what follows, we assume that the various quanta in the IR, the ODR, the FIFO, and the cache are logically numbered sequentially starting from 0 as shown in FIG. 24.

As explained above, the shift network has a multiplexor for each quantum in the instruction register numbered 0 through $W_{IR}-1$. In the following discussion, k represents the number of a given multiplexor ($0 \leq k \leq W_{IR}-1$).

Each quantum multiplexor k selects among all quanta between the following two extremes:

1) $k+W_{imin}$ (last inst. was minimum size); and
2) $k+W_A+W_{IR}-1$ (last inst. was maximum size and all of ODR was consumed).

The CP synthesizer creates instances for each multiplexor with enough input ports to select among the number of quanta reflected above. This number is $(k+W_A+W_{IR}-1)-(k+W_{imin})+1 = W_A+W_{IR}-W_{imin}$.

The choices for IU selection control for a quantum mux k is given by:

1) $k+W_{curr}$ (sequential access and $k+W_{curr}<W_{IR}$);
2) $k+W_{curr}+W_{consumed}$ from ODR/FIFO (sequential access and $k+W_{curr} \geq W_{IR}$); and
3) $k+W_{IR}+P_{target}$ from ODR/FIFO (branch target access).

The choices for IU selection control for ODR/FIFO quantum k is given by:

1) $k+W_A$ from FIFO (advance FIFO by a full packet);
2) $(k-W_{IR}) \% W_A$ from I-Cache output (load directly from I-Cache); and
3) no shift (disable ODR load/FIFO advance).

The CP Synthesizer generates the IU Control logic to control the shift network according to the constraints given above. The design of the IU Control logic is discussed below.

8.3.5 Building IU Control Logic

The instruction fetch protocol described above is implemented in control logic that keeps track of the packet inventory—the packets in flight, packets in the prefetch buffer, and the unconsumed part of the ODR. It also issues instruction cache fetch requests, FIFO load and advance requests, and an ODR load request at the appropriate times, and provides the appropriate selection control for the shift and align network and other multiplexors in the instruction pipeline. Finally, the control logic is also responsible for flushing or stalling the pipeline upon request from the sequencer due to a branch or an interrupt.

The control logic is expressed in the following pseudocode.

Pseudocode for IU Control Logic

Module IU Control (cachePktRdy, flushPipe, EOP: in boolean; $W_{Curr}$: in integer)
```
1:   // Design time constants: pktSize (W_A), invSize
        (⌈T_A * W_imax/W_A⌉)
2:   // Internal state: numFIFOPkts(0), numCachePkts(0),
        W_consumed(W_A)
3:       if (numFIFOPkts + numCachePkts<invSize) then
4:           Request I-Cache fetch;              //launch fetches to keep
5:           numCachePkts++;                     inventory constant
6:       endif
7:       if (cachePktRdy) then                   //packets are ready T_A
8:           numCachePkts- -;                    cycles later
9:           if (W_consumed ≧ W_A && numFIFOPkts > 0) then
10:              Load cachePkt into ODR;         //put pkt directly into
11:              W_consumed = 0;                 ODR, if empty
12:          else                                //otherwise, save pkt in
13:              Load cachePkt into FIFO;        FIFO
```

-continued

Pseudocode for IU Control Logic

```
14:             numFIFOPkts+ +;
15:         endif
16:     endif
17:     if (W_consumed ≧ W_A && numFIFOPkts>0) then      //draw next pkt from FIFO
18:         Load FIFOPkt into ODR;
19:         W_consumed -= W_A;
20:         advance FIFO;
21:         numFIFOPkts- -;
22:     endif
23:     if (flushPipe) then                              //branch or interrupt
24:         flush I-cache and FIFO;                      processing
25:         numCachePkts=0;
26:         numFIFOPkts =0;
27:         W_consumed = W_A
28:     elseif (EOP) then                                // skip to end-of-packet
29:         Shift IR to align to next pack boundary;
30:         W_consumed = W_A;
31:     else                                             // shift to next
32:         Shift IR by W_curr;                          instruction
33:         adjust W_consumed'
34:     endif
```

The control logic is expressed as pseudocode that consists of a sequence of conditions and various actions to be performed under those conditions. The logic keeps track of the inventory of packets internally including those in flight in the instruction cache pipeline (numCachePkts) and those sitting in the prefetch buffer (numFIFOPkts). This is used to issue a fetch request whenever the inventory size falls below the threshold (line 3). The corresponding instruction packet is ready to be read at the output of the cache $T_A$ cycles after the fetch is initiated (line 7). This packet may be loaded directly into the ODR if the rest of the pipeline is empty (line 9), or it may be saved in the FIFO (line 12). These packets are later loaded into the ODR as needed (line 17).

Upon encountering a taken branch signal or an interrupt signal from the sequencer (flushPipe), the control logic flushes the instruction pipeline by resetting the internal state (line 23). This enables the pipeline to start fetching instructions from the new address from the next cycle. Otherwise, the next instruction in sequence needs to be aligned into the instruction register (line 28). If the end-of-packet (EOP) bit is set, the current packet residing in the ODR is considered to be fully consumed and the IR is shifted to the next packet available. Otherwise, the IR is shifted by the width of the current instruction. In either case, the multiplexors of the shift and alignment network in front of the IR are provided with the appropriate selection control as described above.

The control logic shown above may be synthesized into a finite-state machine (FSM) using standard synthesis tools that translate a functional description such as that given above and produce a concrete implementation in terms of gates or PLA logic along with control registers to keep track of the sequential state.

While we have illustrated a specific control path protocol, it is important to note that the control path synthesizer program can be adapted for a variety of different protocols. Both the structural and procedural aspects of the protocol may vary. The protocol may specify that the alignment network is positioned between the instruction register and the decode logic. In this protocol, for example, the instruction register has a wider width (e.g., a width of one packet) and the alignment network routes varying width instructions from the instruction register to the decode logic. This protocol is based on a procedural model of "in-place" decoding, where instructions are not aligned in the IR, but rather, fall into varying locations in the IR. The protocol procedure defines a methodology to determine the start of the next instruction to be issued from the IR.

The procedural model may be based on a statistical policy where the width of the control path pipeline is optimized based on the width of the templates in the instruction format. In this approach, the control path designer minimizes the width of the pipeline within some performance constraint. For example, the width is allowed to be smaller than the widest instruction or instructions as long as the stall cycles needed to issue these instructions do not adversely impact overall performance. When the width of the pipeline is less than the widest instruction, one or more stall cycles may be necessary to issue the instruction to the decode logic. Performance is estimated based on the time required to issue each instruction and the corresponding frequency of the instruction's issuance.

9.0 Generating a Structural Description

The system produces a structural description of the processor hardware at the RTL-level in a standard hardware description language such as VHDL. This description can be linked with the respective HDL component libraries pointed to by the macrocell database and processed further for hardware synthesis and simulation.

Conclusion

While the invention is described in the context of a specific implementation, the scope of the invention is not limited to this implementation. A number of design variations are possible.

One possible variation is the manner in which the ILP constraints are specified. As noted above, the ILP constraints may be specified as exclusion sets, concurrency sets, or some combination of both. The form of other input data structures, such as the register file specification and macrocell library may vary as well. These data structures may be provided in an external file form, such as a textual file (e.g., the ArchSpec which is in a tabular form using the HMDES database language) or in an internal form (e.g., a separate user interface to specify register file data structures and a component-level interface to the standard HDL macrocell databases). The above description provides a number of constructs for specifying an opcode repertoire, the I/O formats of the opcodes and the desired ILP among the operations. However, these constructs are not critical to the implementation of the invention.

The AIR form of the datapath represents only one possible way to specify the output of the datapath design process. Other types of hardware description languages may be used as well, such as VHDL or Verilog. Indeed, the AIR form can be easily translated to one of these external textual formats. The current implementation produces VHDL output.

In view of the many possible implementations of the invention, it should be recognized that the implementations described above are only examples of the invention and should not be taken as a limitation on the scope of the invention. Rather, the scope of the invention is defined by the following claims. We therefore claim as our invention all that comes within the scope and spirit of these claims.

We claim:

1. A method for programmatic design of a VLIW processor from an input specification including specified processor operations, I/O formats for the specified operations, instruction level parallelism constraints among the specified operations, and a register file specification of the processor, the method comprising:

based on the specified processor operations, and the instruction level parallelism constraints, programmatically generating a datapath description of the processor from a macrocell library, the datapath description including functional unit instances, register file instances, an interconnect between the functional unit and register file instances, and control ports of the register file instances and functional unit instances; and programmatically creating control logic for issuing control signals to control ports of the functional unit and register file instances.

2. The method of claim 1 wherein the control logic is a finite state machine synthesized, at least in part, from a scheduled application program.

3. The method according to claim 2 wherein the control logic comprises hard-wired logic.

4. The method according to claim 2 wherein the control logic comprises reconfigurable logic.

5. The method of claim 1 wherein said programmatically generating the control logic comprises generating a control path description with components from the macrocell library, where the control path description includes a hardware description of an instruction unit data path for transferring instructions from an instruction cache to an instruction register, a description of control logic for coupling an instruction sequencer to the instruction unit data path, and a description of decode logic for decoding instructions in the instruction register and issuing the instructions to control ports in the datapath.

6. The method according to claim 1 wherein said control logic is program counter-based.

7. The method according to claim 1 wherein inputs to said step of programmatically creating control logic comprise the data path description, an instruction format specification and parameters for an instruction cache.

8. The method according to claim 7 further comprising programmatically extracting values for parameters from the instruction format specification and the data path description.

9. The method according to claim 7 wherein said instruction format specification comprises instruction width requirements.

10. The method according to claim 7 wherein said data path description enumerates control ports to which instruction fields are to be mapped.

11. The method according to claim 7 wherein said parameters for the instruction cache comprise a cache access time and an instruction packet width.

12. The method according to claim 1 wherein said programmatically creating the control logic is performed using a predefined control path protocol.

13. The method according to claim 12 wherein said control path protocol includes a definition of macrocell types for the control logic.

14. The method according to claim 13 wherein said programmatically creating the control logic comprises selecting macrocells based on information programmatically extracted from an instruction format specification and from the data path description.

15. The method according to claim 12 wherein said control path protocol includes parameters for an instruction cache.

16. The method according to claim 1 wherein said control logic comprises a buffer for temporarily storing packets of instructions.

17. The method according to claim 16 wherein said control logic further comprises an instruction register for receiving instructions from the buffer.

18. The method according to claim 17 wherein said control logic further comprises an alignment network for aligning instructions with the instruction register.

19. The method according to claim 17 wherein said control logic further comprises decode logic for decoding instructions.

20. The method according to claim 19 wherein said control logic further comprises an alignment network for aligning instructions with the decode logic.

21. The method according to claim 19 wherein said decode logic generates output values for controlling said control ports said data path description.

22. The method according to claim 21 wherein said programmatically creating the control logic comprises programmatically generating the decode logic based on decode tables that specify the inputs to the decode logic and the outputs of the decode logic.

* * * * *